(12) United States Patent
Chou et al.

(10) Patent No.: US 10,972,641 B2
(45) Date of Patent: Apr. 6, 2021

(54) OPTICS, DEVICE, AND SYSTEM FOR ASSAYING

(71) Applicant: Essenlix Corporation, Monmouth Junction, NJ (US)

(72) Inventors: Stephen Y. Chou, Princeton, NJ (US); Wei Ding, East Windsor, NJ (US); Yufan Zhang, Monmouth Junction, NJ (US); Ji Qi, Hillsborough, NJ (US); Jun Tian, Belle Mead, NJ (US); Wei Dong, Monmouth Junction, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

(21) Appl. No.: 16/483,700

(22) PCT Filed: Feb. 8, 2018

(86) PCT No.: PCT/US2018/017504
§ 371 (c)(1),
(2) Date: Aug. 5, 2019

(87) PCT Pub. No.: WO2018/148471
PCT Pub. Date: Aug. 16, 2018

(65) Prior Publication Data
US 2020/0106932 A1 Apr. 2, 2020

Related U.S. Application Data

(60) Provisional application No. 62/460,062, filed on Feb. 16, 2017, provisional application No. 62/460,075, filed on Feb. 16, 2017, provisional application No. 62/459,554, filed on Feb. 15, 2017, provisional application No. 62/457,133, filed on Feb. 9, 2017, provisional application No. 62/456,504, filed on Feb. 8, 2017, provisional application No. 62/456,590, filed on Feb. 8, 2017.

(51) Int. Cl.
*H04N 5/225* (2006.01)
*G01N 21/84* (2006.01)

(52) U.S. Cl.
CPC ....... *H04N 5/2252* (2013.01); *G01N 21/8483* (2013.01); *H04N 5/2254* (2013.01); *H04N 5/2256* (2013.01); *H04N 5/2257* (2013.01)

(58) Field of Classification Search
CPC .. H04N 5/2252; H04N 5/2254; H04N 5/2257; H04N 5/2256; G01N 21/8483
See application file for complete search history.

(56) References Cited

U.S. PATENT DOCUMENTS

| | | | |
|---|---|---|---|
| 2004/0009098 A1* | 1/2004 | Torre-Bueno | G01N 1/31 422/63 |
| 2005/0036667 A1 | 2/2005 | So et al. | |
| 2006/0011860 A1 | 1/2006 | Hecht et al. | |
| 2009/0079978 A1 | 3/2009 | Kimura | |
| 2011/0009163 A1 | 1/2011 | Fletcher et al. | |
| 2012/0157160 A1 | 6/2012 | Ozcan et al. | |
| 2013/0300919 A1 | 11/2013 | Fletcher et al. | |
| 2016/0004057 A1 | 1/2016 | Lin et al. | |

* cited by examiner

*Primary Examiner* — Yogesh K Aggarwal

(57) ABSTRACT

The present invention provides, among other thing, devices and methods for simple, fast, and sensitive assaying, including imaging.

98 Claims, 13 Drawing Sheets

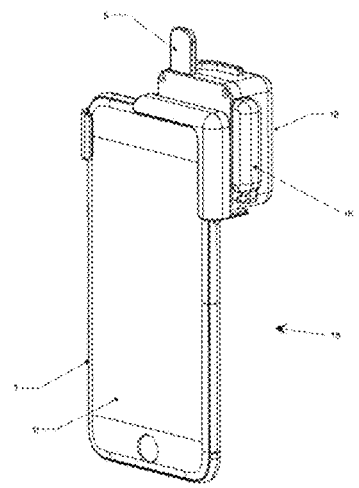
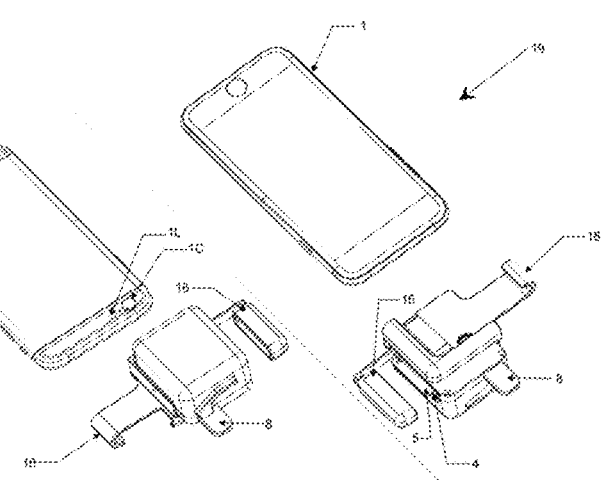
FIG.1-A    FIG. 1-B    FIG. 1-C
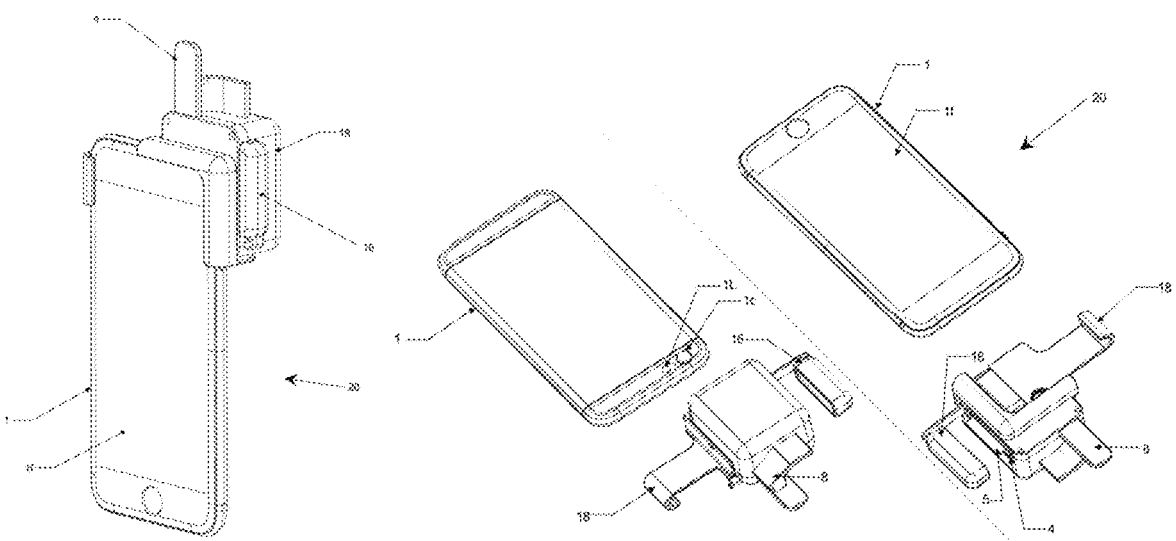
FIG.2-A    FIG. 2-B    FIG.2-C

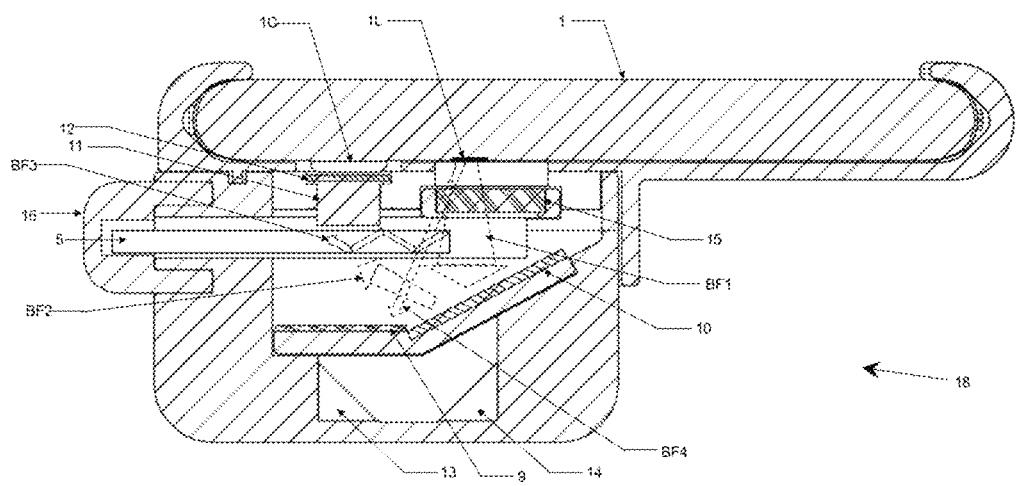
FIG. 5
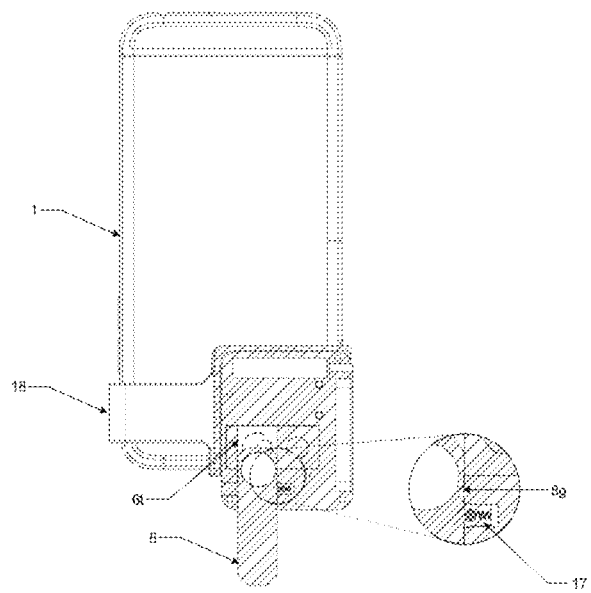
FIG.6-A
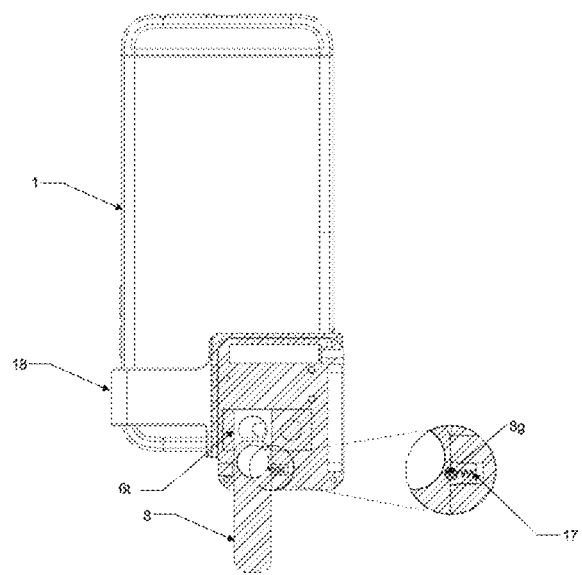
FIG.6-B

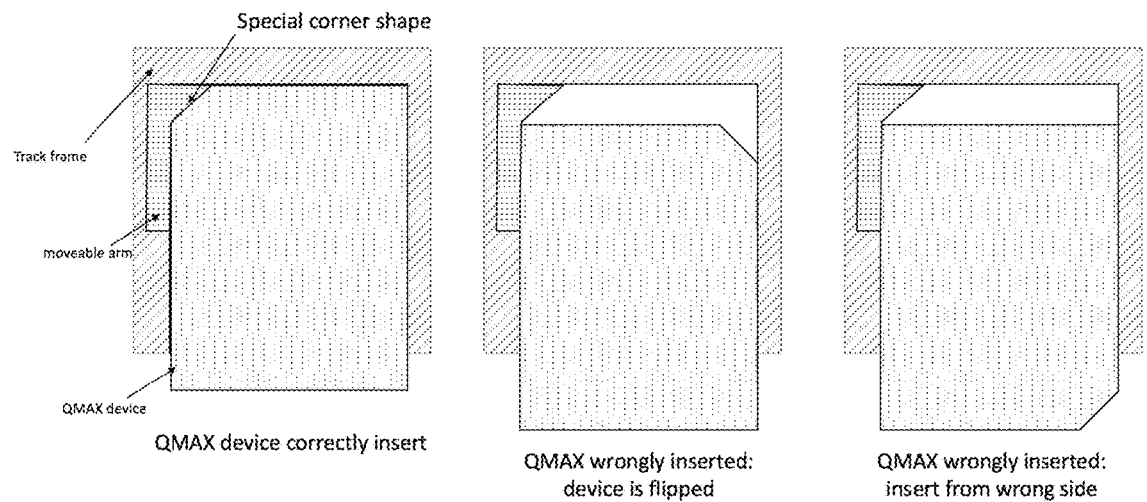
FIG. 9
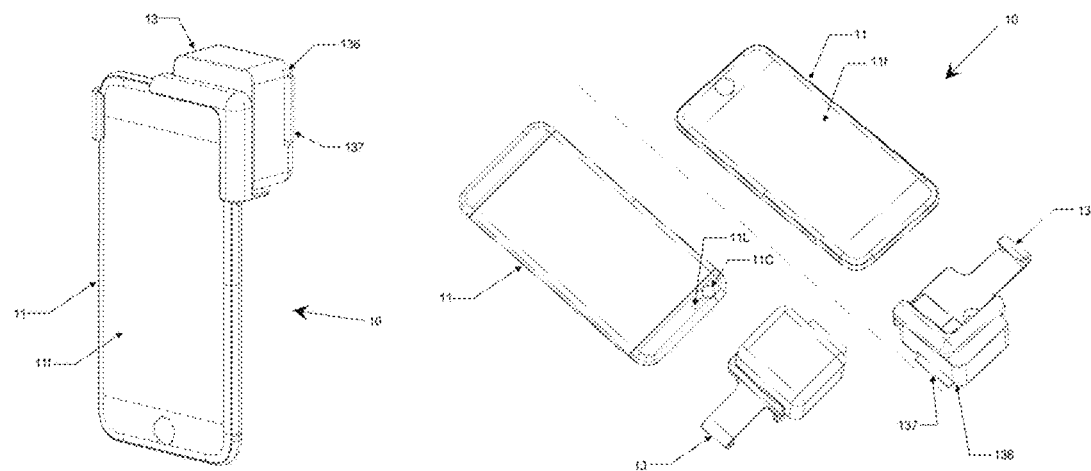
FIG.10-A     FIG. 10-B     FIG.10-C

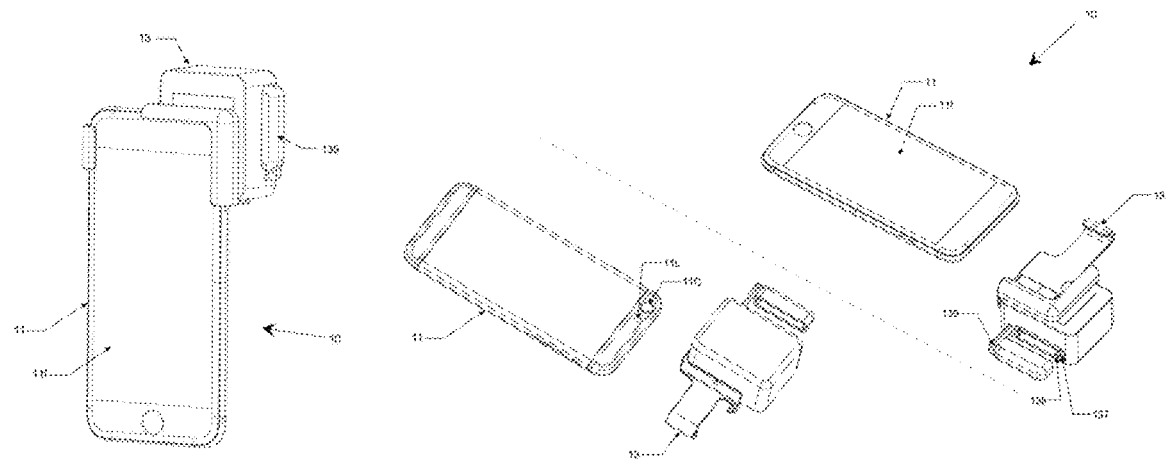
FIG.13-A  FIG. 13-B  FIG.13-C
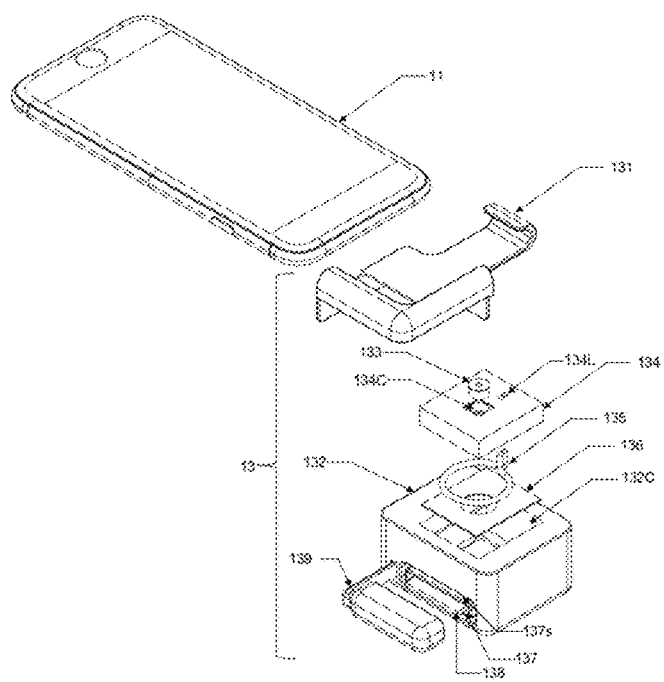
FIG.14

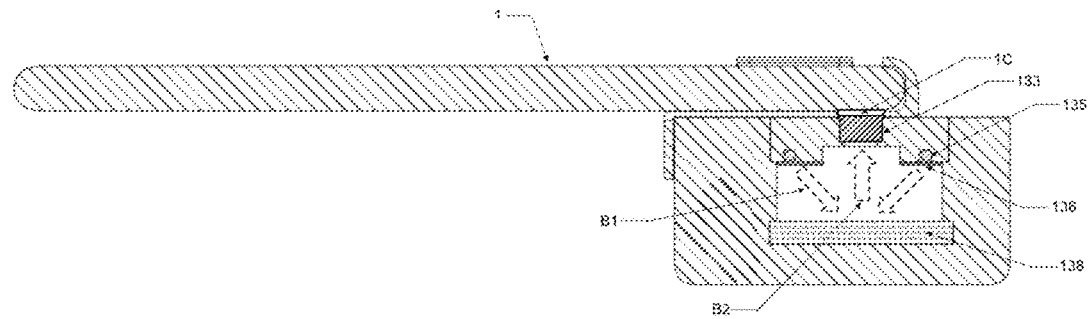
FIG. 15-A
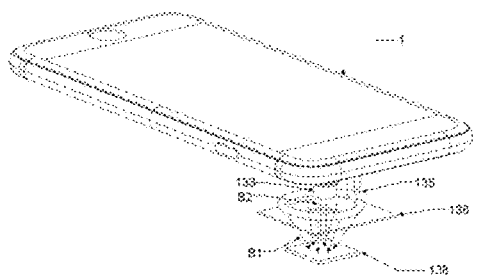
FIG.15-B
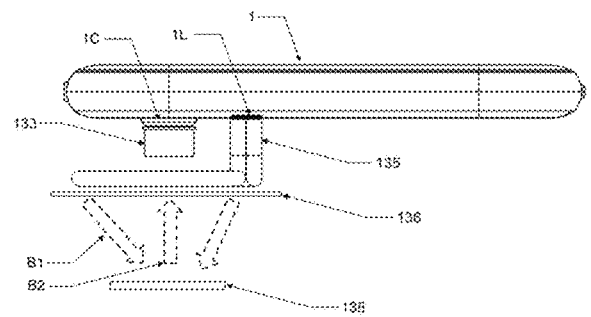
FIG.15-C
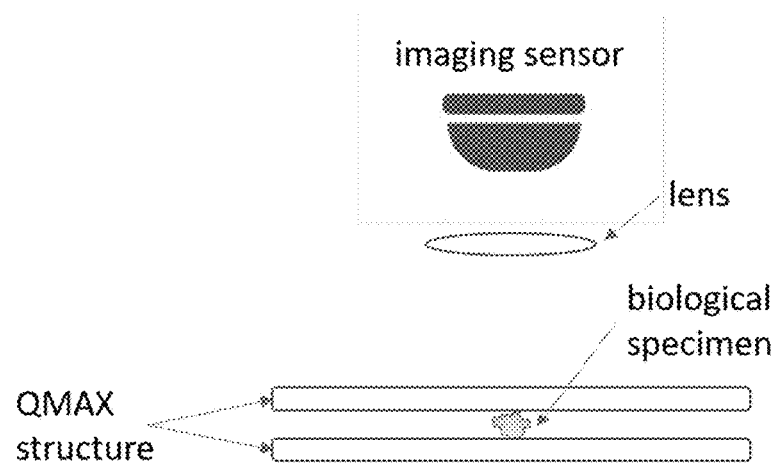
Fig. 16-A

```
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
```
Fig. 16-B
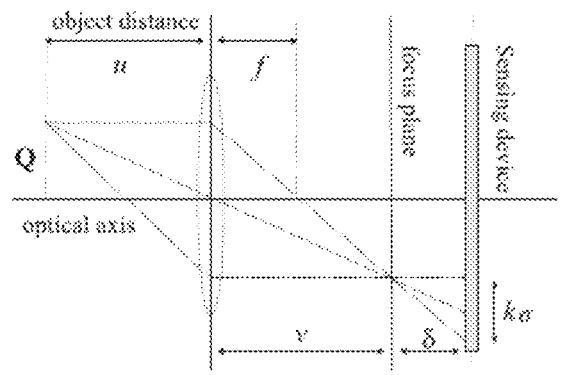
Fig. 16-C
```
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
E E E E E E E E E E E
```
Fig. 16-D

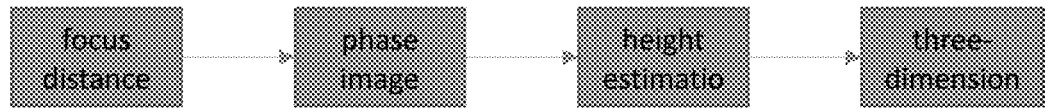
Fig. 16-E
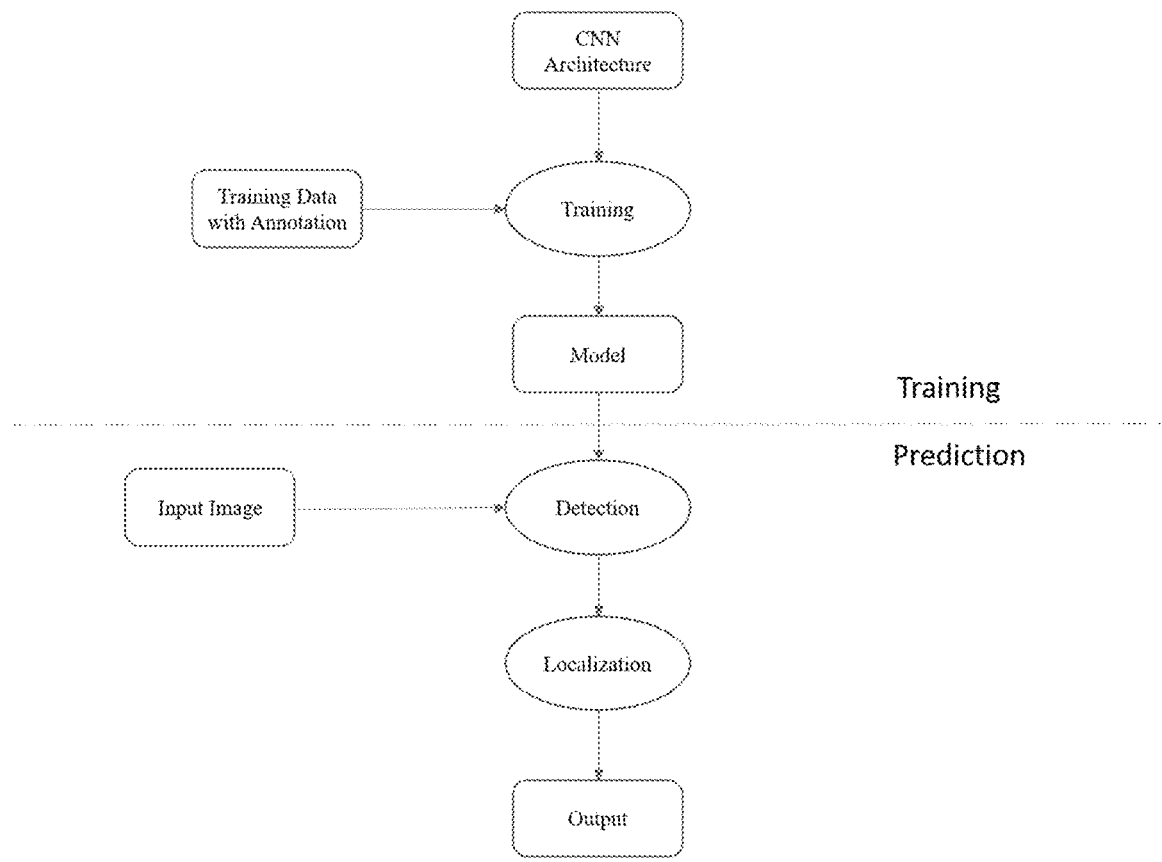
Fig. 17-A

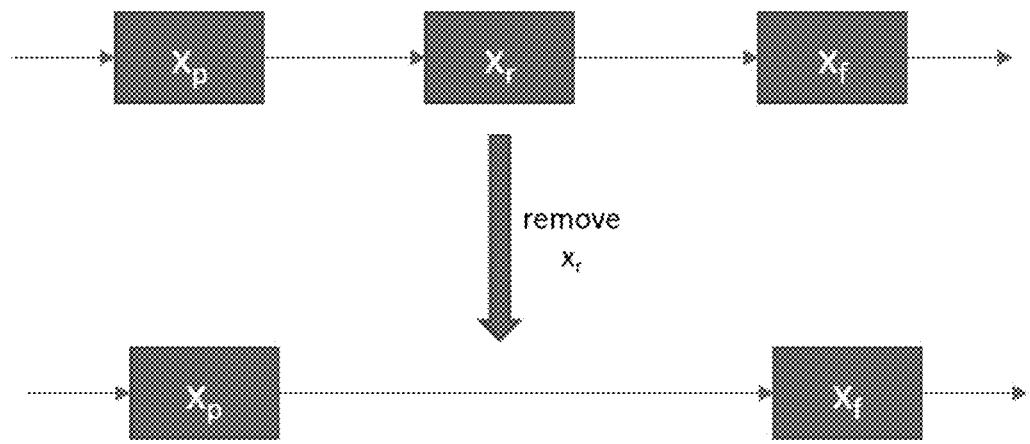
Fig. 17-B
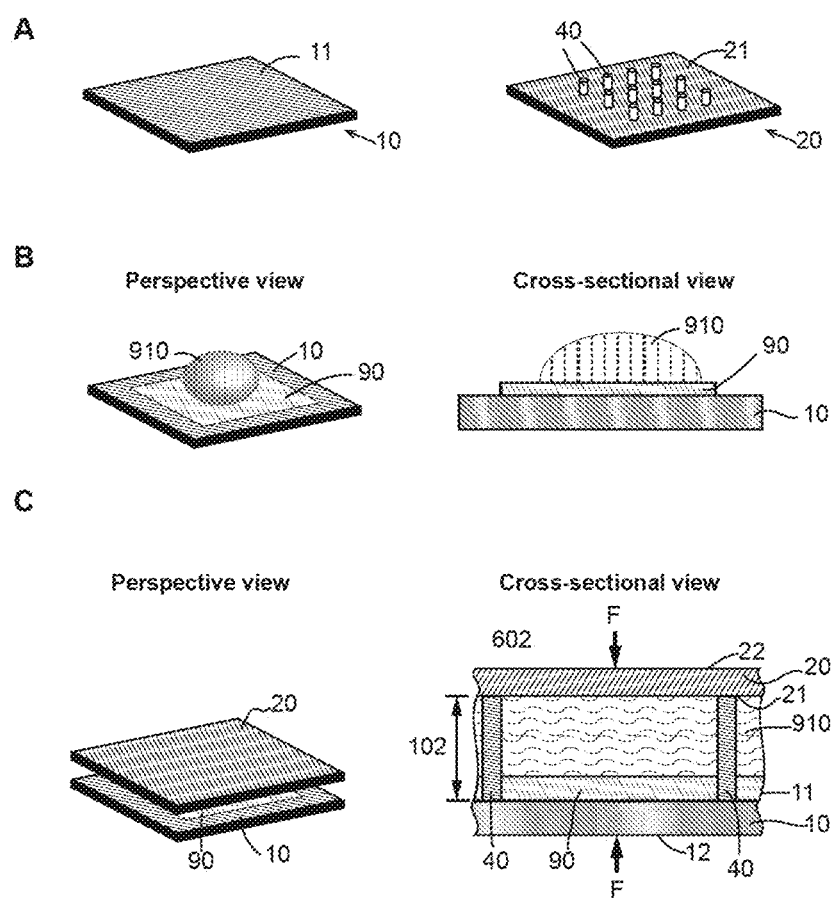
Fig. 18

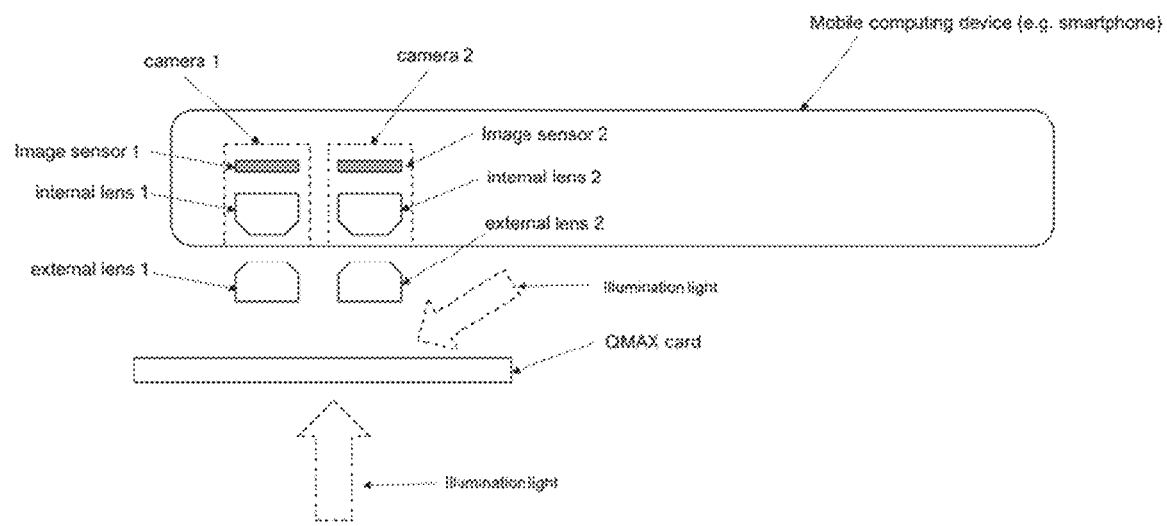
Fig. 19-A
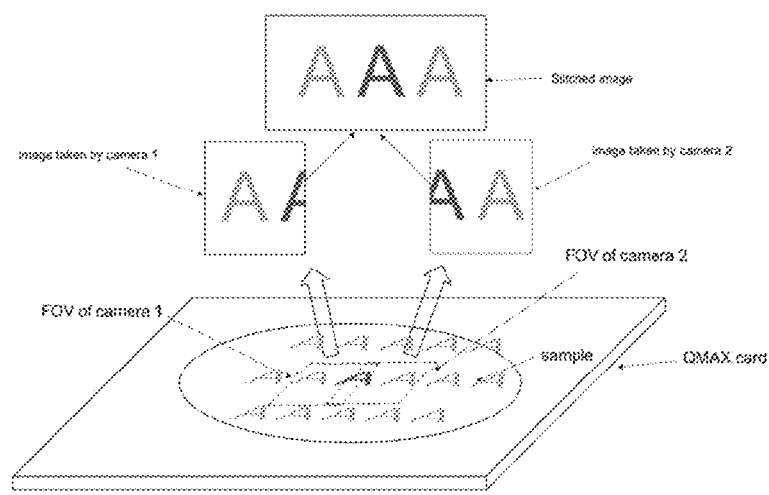
Fig. 19-B

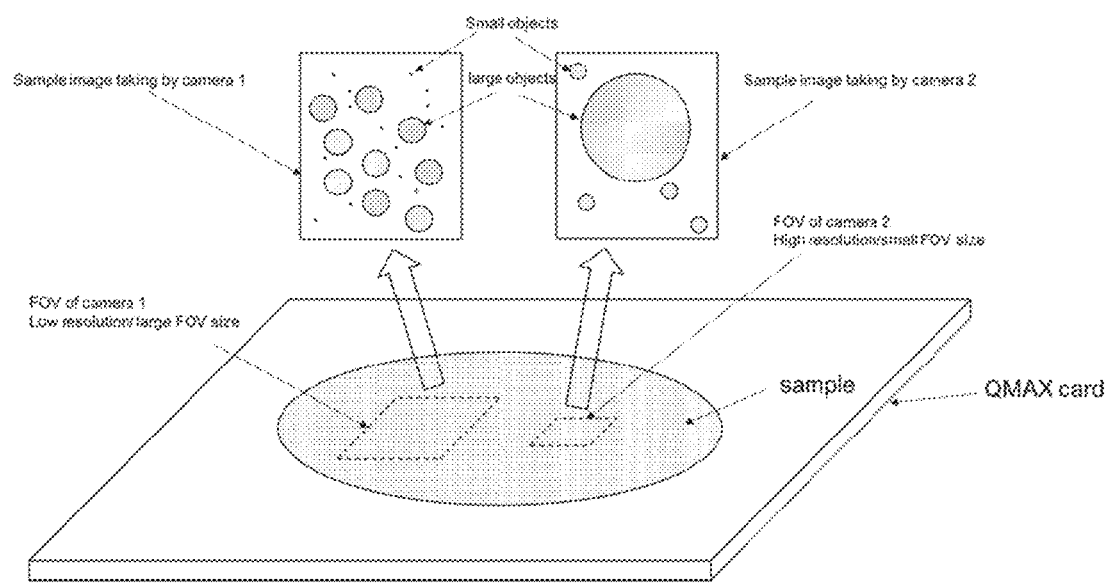
Fig. 19-C

OPTICS, DEVICE, AND SYSTEM FOR ASSAYING

CROSS-REFERENCE TO RELATED APPLICATIONS

This application is a § 371 national stage application of International Application PCT/US2018/017504 filed Feb. 8, 2018, which claims the benefit of priority to U.S. Provisional Patent Application No. 62/456,590, filed on Feb. 8, 2017, U.S. Provisional Patent Application No. 62/459,554, filed on Feb. 15, 2017, U.S. Provisional Patent Application No. 62/460,075, filed on Feb. 16, 2017, U.S. Provisional Patent Application No. 62/456,504, filed on Feb. 8, 2017, U.S. Provisional Patent Application No. 62/460,062, filed on Feb. 16, 2017 and U.S. Provisional Patent Application No. 62/457,133, filed on Feb. 9, 2017, the contents of which are relied upon and incorporated herein by reference in their entirety. The entire disclosure of any publication or patent document mentioned herein is entirely incorporated by reference.

FIELD

Among other things, the present invention is related to devices and methods of performing biological and chemical assays, and computational imaging.

BACKGROUND

In biological and chemical assays (e.g. diagnostic testing), often it needs to simple, fast, and sensitive assaying, including imaging. The present invention provides, among other thing, devices and methods for simple, fast, and sensitive assaying, including imaging.

BRIEF DESCRIPTION OF THE DRAWINGS

The skilled artisan will understand that the drawings, described below, are for illustration purposes only. The drawings are not intended to limit the scope of the present teachings in any way. The drawings are not entirely in scale. In the figures that present experimental data points, the lines that connect the data points are for guiding a viewing of the data only and have no other means.

FIGS. 1-A, 1-B and 1-C are the schematic illustration of system testing sample in fluorescent illumination mode, according to some embodiments of the present invention.

FIGS. 2-A, 2-B and 2-C are the schematic illustration of system testing sample in bright-field illumination mode, according to some embodiments of the present invention.

FIG. 5 is the schematic sectional view showing details of system testing sample in fluorescent illumination mode, and particularly of device, according to some embodiments of the present invention.

FIG. 6-A and FIG. 6-B is the schematic sectional viewing showing the design to make lever stop at the pre-defined position when being pulled outward from the device, according to some embodiments of the present invention.

FIG. 9 is the schematic illustration of how the slider indicates if QMAX device is inserted in right direction, according to some embodiments of the present invention.

FIGS. 10-A, 10-B and 10-C are the schematic illustration of system for smartphone colorimetric reader, according to some embodiments of the present invention.

FIGS. 13-A, 13-B and 13-C are the schematic illustrations of system for smartphone colorimetric reader, according to some embodiments of the present invention.

FIG. 14 is the schematic exploded view of optical adaptor device in system, according to some embodiments of the present invention.

FIGS. 15-A, 15-B and 15-C are the schematic views showing details of system reading a colorimetric card, and particularly of device, according to some embodiments of the present invention.

FIG. 16-A shows a tomography device that consists of an imaging sensor, a lens, and a QMAX structure, according to some embodiments of the present invention.

FIG. 16-B shows an example of the pillar array pattern of the letter E.

FIG. 16-C shows the thin lens model, which explains the effect of focal distance on the captured image.

FIG. 16-D shows a captured image of the example pillar array in FIG. 16-B by the imaging sensor.

FIG. 16-E shows the diagram of phase image retrieval based scheme.

FIG. 17-A shows analyte detection and localization workflow, which consists of two stages, training and prediction, according to some embodiments of the present invention.

FIG. 17-B shows the process to remove one item from an ordered list, according to some embodiments of the present invention.

FIG. 18-A shows an embodiment of a QMAX device used for cell imaging in an open configuration, according to some embodiments of the present invention.

FIG. 18-B shows an embodiment of a QMAX device used for cell imaging in an open configuration, according to some embodiments of the present invention.

FIG. 18-C shows an embodiment of a QMAX device used for cell imaging in a closed configuration, according to some embodiments of the present invention.

FIG. 19-A shows a schematic illustration of the dual camera imaging system.

FIG. 19-B shows an example of the dual camera imaging system for large FOV imaging according to some embodiments of the present invention.

FIG. 19-C shows an example of the dual camera imaging system for dual resolution imaging according to some embodiments of the present invention.

DETAILED DESCRIPTION OF EXEMPLARY EMBODIMENTS

Figure 3:
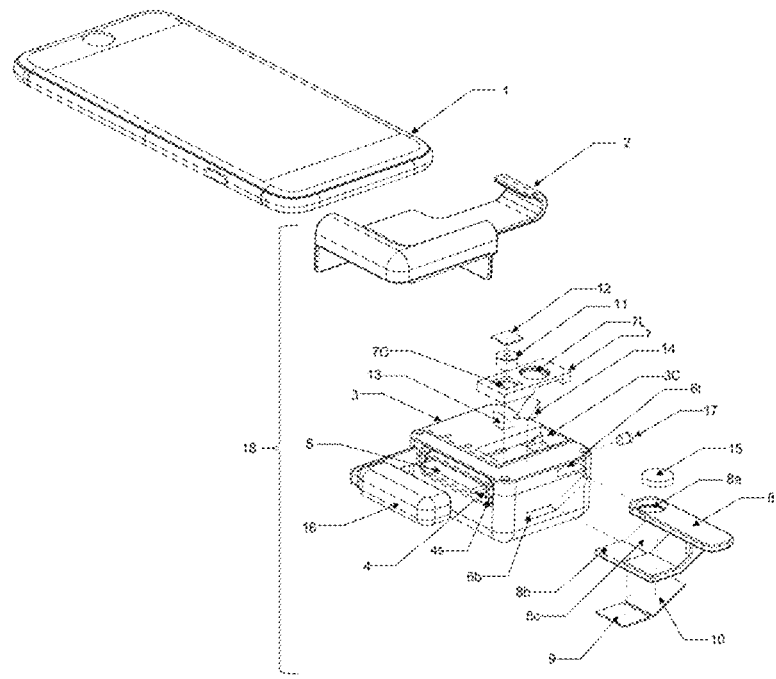
FIG. 3 is the schematic exploded view of optical adaptor device in system and system 20, according to some embodiments of the present invention.

The following detailed description illustrates some embodiments of the invention by way of example and not by way of limitation. The section headings and any subtitles used herein are for organizational purposes only and are not to be construed as limiting the subject matter described in any way. The contents under a section heading and/or subtitle are not limited to the section heading and/or subtitle, but apply to the entire description of the present invention.

The citation of any publication is for its disclosure prior to the filing date and should not be construed as an admission that the present claims are not entitled to antedate such publication by virtue of prior invention. Further, the dates of publication provided can be different from the actual publication dates which can need to be independently confirmed.

Seven exemplary embodiments are illustrated as followed: one embodiment of optical adaptor for bright-field and fluorescent microscopy imaging attached to a smartphone; one embodiment of optical adaptor for colorimetric measurement attached to a smartphone using tilted fiber end face as light source; one embodiment of optical adaptor for colorimetric measurement attached to a smartphone using side-illumination of a ring-shape fiber as light source; one embodiment of device and methods of tomography; one embodiment of machine learning assisted assay and imaging; one embodiment of device and methods of tissue staining and cell imaging; one embodiment of dual-lens imaging system.

A. Optical Adaptor for Bright-Field and Fluorescent Microscope Attachment to Smartphone Bright-field and fluorescent microscopy are very powerful techniques to let people examine some property of a sample, which have wide applications in health monitoring, disease diagnostic, science education and so on. Conventionally, the taking microscopy images requires, however, expensive microscope and experienced personnel which common people have limited access to. Even though there some recent invented accessories which can turn a smartphone into a bright-field microscope, the bright-field microscopy images only give very limited information of the sample.

The present invention that is described herein address this problem by providing a system comprising an optical adaptor and a smartphone. The optical adaptor device fits over a smartphone converting it into a microscope which can take both fluorescent and bright-field images of a sample. This system can be operated conveniently and reliably by a common person at any location. The optical adaptor takes advantage of the existing resources of the smartphone, including camera, light source, processor and display screen, which provides a low-cost solution let the user to do bright-field and fluorescent microscopy.

In this invention, the optical adaptor device comprises a holder frame fitting over the upper part of the smartphone and an optical box attached to the holder having sample receptacle slot and illumination optics. In some prior arts (U.S. Pat. Nos. 2016/029091 and U.S. Pat. No. 2011/0292198), their optical adaptor design is a whole piece including both the clip-on mechanics parts to fit over the smartphone and the functional optics elements. This design has the problem that they need to redesign the whole-piece optical adaptor for each specific model of smartphone. But in this present invention, the optical adaptor is separated into a holder frame only for fitting a smartphone and a universal optical box containing all the functional parts. For the smartphones with different dimensions, as long as the relative positions of the camera and the light source are the same, only the holder frame need to be redesigned, which will save a lot of cost of design and manufacture.

The optical box of the optical adaptor comprises: a receptacle slot which receives and position the sample in a sample slide in the field of view and focal range of the smartphone camera; a bright-field illumination optics for capturing bright-field microscopy images of a sample; a fluorescent illumination optics for capturing fluorescent microscopy images of a sample; a lever to switch between bright-field illumination optics and fluorescent illumination optics by sliding inward and outward in the optical box.

The receptacle slot has a rubber door attached to it, which can fully cover the slot to prevent the ambient light getting into the optical box to be collected by the camera. In the prior art (U.S. Pat. 2016/0290916), its sample slot is always exposed to the ambient light which won't cause too much problem because it only does bright-field microscopy. But the present invention can take the advantage of this rubber door when doing fluorescent microscopy because the ambient light would bring a lot of noise to the image sensor of the camera.

To capture good fluorescent microscopy image, it is desirable that nearly no excitation light goes into the camera and only the fluorescent emitted by the sample is collected by the camera. For all common smartphones, however, the optical filter putting in front of the camera cannot block the undesired wavelength range of the light emitted from the light source of a smartphone very well due to the large divergence angle of the beams emitted by the light source and the optical filter not working well for un-collimated beams. Collimation optics can be designed to collimated the beam emitted by the smartphone light source to address this issue, but this approach increase the size and cost of the adaptor. Instead, in this present invention, fluorescent illumination optics enables the excitation light to illuminate the sample partially from the waveguide inside the sample slide and partially from the backside of the sample side in large oblique incidence angle so that excitation light will nearly not be collected by the camera to reduce the noise signal getting into the camera.

The bright-field illumination optics in the adaptor receive and turn the beam emitted by the light source so as to back-illuminated the sample in normal incidence angle.

Typically, the optical box also comprises a lens mounted in it aligned with the camera of the smartphone, which magnifies the images captured by the camera. The images captured by the camera can be further processed by the processor of smartphone and outputs the analysis result on the screen of smartphone.

To achieve both bright-field illumination and fluorescent illumination optics in a same optical adaptor, in this present invention, a slidable lever is used. The optical elements of the fluorescent illumination optics are mounted on the lever and when the lever fully slides into the optical box, the fluorescent illumination optics elements block the optical path of bright-field illumination optics and switch the illumination optics to fluorescent illumination optics. And when the lever slides out, the fluorescent illumination optics elements mounted on the lever move out of the optical path and switch the illumination optics to bright-field illumination optics. This lever design makes the optical adaptor work in both bright-field and fluorescent illumination modes without the need for designing two different single-mode optical boxes.

The lever comprises two planes at different planes at different heights.

In some embodiments, two planes can be joined together with a vertical bar and move together in or out of the optical box. In some embodiments, two planes can be separated and each plane can move individually in or out of the optical box.

The upper lever plane comprises at least one optical element which can be, but not limited to be an optical filter. The upper lever plane moves under the light source and the preferred distance between the upper lever plane and the light source is in the range of 0 to 5 mm.

Part of the bottom lever plane is not parallel to the image plane. And the surface of the non-parallel part of the bottom lever plane has mirror finish with high reflectivity larger than 95%. The non-parallel part of the bottom lever plane moves under the light source and deflects the light emitted from the light source to back-illuminate the sample area right under the camera. The preferred tilt angle of the non-parallel part of the bottom lever plane is in the range of 45 degree to 65 degree and the tilt angle is defined as the angle between the non-parallel bottom plane and the vertical plane.

Part of the bottom lever plane is parallel to the image plane and is located under and 1 mm to 10 mm away from the sample. The surface of the parallel part of the bottom lever plane is highly light absorptive with light absorption larger than 95%. This absorptive surface is to eliminate the reflective light back-illuminating on the sample in small incidence angle.

To slide in and out to switch the illumination optics using the lever, a stopper design comprising a ball plunger and a groove on the lever is used in order to stop the lever at a pre-defined position when being pulled outward from the adaptor. This allow the user to use arbitrary force the pull lever but make the lever to stop at a fixed position where the optical adaptor's working mode is switched to bright-filed illumination.

A sample slider is mounted inside the receptacle slot to receive the QMAX device and position the sample in the QMAX device in the field of view and focal range of the smartphone camera.

The sample slider comprises a fixed track frame and a moveable arm:

The frame track is fixedly mounted in the receptacle slot of the optical box. And the track frame has a sliding track slot that fits the width and thickness of the QMAX device so that the QMAX device can slide along the track. The width and height of the track slot is carefully configured to make the QMAX device shift less than 0.5 mm in the direction perpendicular to the sliding direction in the sliding plane and shift less than less than 0.2 mm along the thickness direction of the QMAX device.

The frame track has an opened window under the field of view of the camera of smartphone to allow the light back-illuminate the sample.

A moveable arm is pre-built in the sliding track slot of the track frame and moves together with the QMAX device to guide the movement of QMAX device in the track frame.

The moveable arm equipped with a stopping mechanism with two pre-defined stop positions. For one position, the arm will make the QMAX device stop at the position where a fixed sample area on the QMAX device is right under the camera of smartphone. For the other position, the arm will make the QMAX device stop at the position where the sample area on QMAX device is out of the field of view of the smartphone and the QMAX device can be easily taken out of the track slot.

The moveable arm switches between the two stop positions by a pressing the QMAX device and the moveable arm together to the end of the track slot and then releasing.

The moveable arm can indicate if the QMAX device is inserted in correct direction. The shape of one corner of the QMAX device is configured to be different from the other three right angle corners. And the shape of the moveable arm matches the shape of the corner with the special shape so that only in correct direction can QMAX device slide to correct position in the track slot.

FIGS. 1-A, 1-B and 1-C is the schematic illustration of system 19 testing sample in fluorescent illumination mode. Particularly, FIGS. 1-B and 1-C are the exploded views of system 19, shown from the front and rear sides respectively. System 19 comprises a smartphone 1; an optical adaptor device 18 fitting over the upper part of smartphone 1; a sample slide 5, inserted into receptacle slot 4 of device 18 so that the sample on sample slide 5 is positioned within the field of view and focal range of camera module 1C in smartphone 1. A lever 8 is fully pressed into device 18 so that system 19 operates in fluorescent illumination mode. A rubber door 16 attached to device 18 covers receptacle slot 4 after sample slide 5 is in so as to prevent the ambient light getting into receptacle slot 4 to affect the test.

The software (not shown) installed in smartphone 1 analyzes the image collected by camera module 1C while light source 1L in smartphone 1 is emitting light, in order to get some property of the sample, and outputs the results to a display screen 1f in smartphone 1.

FIGS. 2-A, 2-B and 2-C is the schematic illustration of system 20 testing sample in bright-field illumination mode. Particularly, FIGS. 2-B and 2-C are the exploded views of system 20, shown from the front and rear sides respectively. System 20 comprises a smartphone 1; an optical adaptor device 18 fitting over the upper part of smartphone 1; a sample slide 5, inserted into receptacle slot 4 of device 18 so that the sample on sample slide 5 is positioned within the field of view and focal range of camera module 1C in smartphone 1. A lever 8 is pulled outward from device 18 and stopped by a stopper (not shown) at a pre-designed position in device 18 so that system 20 operates in bright-field illumination mode.

FIG. 3 is the schematic exploded view of optical adaptor device 18 in system 19 and system 20. Device 18 comprises a holder case 2 fitting over the upper part of smartphone 1; an optical box 3 attached to case 2 including a receptacle slot 4, an optics chamber 3C, track 6b and 6t allowing lever 8 to slide in, and a rubber door 16 inserted into trench 4s to cover receptacle slot 4. An optics insert 7 is fitted into the top of optics chamber 3C with an exit aperture 7L and an entrance aperture 7C in it aligning with light source 1L and camera 1C (shown in FIG. 2-B) in smartphone 1. A lens 11 is mounted in entrance aperture 7C in optics insert 7 and configured so that the sample in sample slide 5 inserted into receptacle slot 4 is located within the working distance of the camera 1C (shown in FIGS. 2-B and 1-B). Lens 11 serves to magnify the images of the sample captured by camera 1C (shown in FIGS. 2-B and 1-B). A long-pass optical filter 12 is mounted on top of lens 11 in entrance aperture 7C. A pair of right angle mirrors 13 and 14 are mounted on the bottom of optics chamber 3C and configured so that mirror 13 and mirror 14 are aligned with light source 1L and camera 1C (shown in FIGS. 2-B and 1-B) respectively. Mirror 13 and mirror 14 whose operation as bright-field illumination optics in device 18 is described below in FIG. 4. Lever 8 comprise two level bars: the upper-level bar comprises a band-pass optical filter 15 mounted in slot 8a, and the lower-level bar comprises a light absorber 9 mounted on the horizontal plane 8b and a reflective mirror 10 mounted on the tilted plane 8c. The optical filter 15, light absorber 9 and mirror 10 whose operation as fluorescent illumination optics in device 18 is described below in FIG. 5. The upper-level bar of lever 8 slides along track 6t in box 3 and lower-level bar 8b and 8c slides along track 6b in box 3. Lever 8 stops at two different positions in box 3 to switch between bright-field illumination optics and fluorescent illumination optics. Lever 8 is fully inserted into box 3 to switch device 18 to work with fluorescent illumination optics. Ball plunger 17 is mounted on the sidewall of track 6t to stop lever 8 at a pre-defined position when lever 8 being pulled outward from box 3 to switch device 18 to work with bright-field illumination optics.

Figure 4:
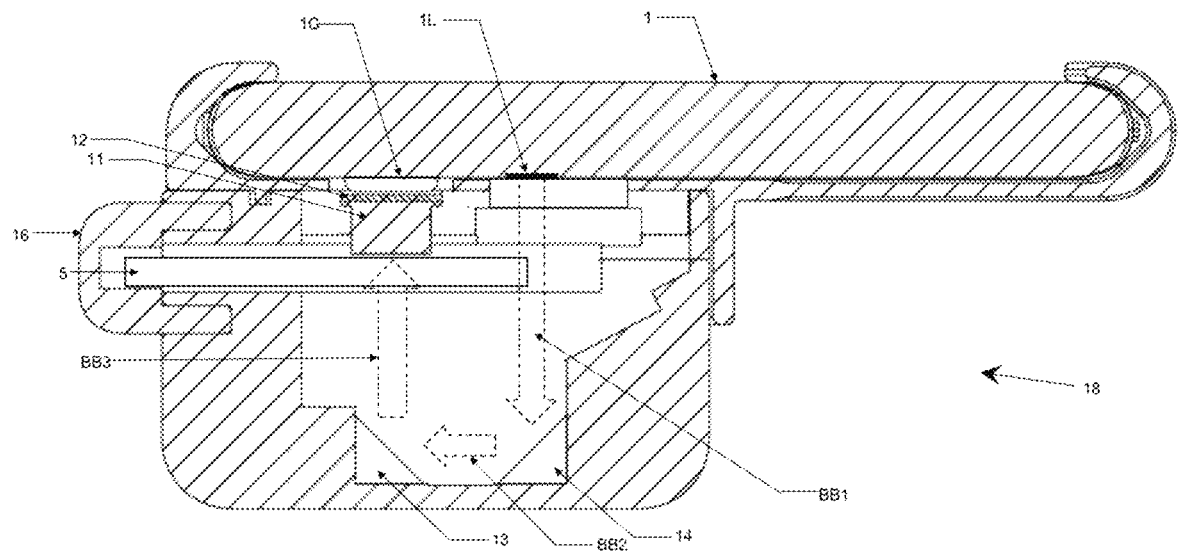
FIG. 4 is the schematic sectional view showing details of system testing sample in bright-field illumination mode, and particularly of device, according to some embodiments of the present invention.

FIG. 4 is the schematic sectional view showing details of system 20 testing sample in bright-field illumination mode, and particularly of device 18. This figure illustrates the functionality of the elements that were described above with reference to FIG. 3. Lever 8 (shown in FIG. 3) is pulled outward from device 18 and stopped by stopper 17 (shown in FIG. 3) at a pre-defined position so that mirror 13 and mirror 14 is exposed to and aligned with camera 1C and light source 1L. Light source 1L emits light beam BB1 away from smartphone 1. Beam BB1 is deflected by mirror 14 by 90 degrees to beam BB2 which is further deflected by mirror 13 by 90 degrees to beam BB3. Beam BB3 back-illuminates the sample in sample slide 5 in normal incidence angle. Lens 11 creates a magnified images of the sample on the image sensor plane of camera 1C. Smartphone 1 captures and processes the image to get some property of the sample.

FIG. 5 is the schematic sectional view showing details of system 19 testing sample in fluorescent illumination mode, and particularly of device 18. This figure illustrates the functionality of the elements that were described above with reference to FIG. 3. Lever 8 (shown in FIG. 3) is fully inserted into device 18 so that light absorber 9 and tilted mirror 10 are under the view of camera 1C and light source 1L, and block the light path between light source 1L and the pair of mirrors of 13 and 14. And band-pass optical filter 15 is right under the light source 1L. Light source 1L emits light beam BF1 away from smartphone 1. Optical filter 15 allows beam BF1 with specific wavelength range which matches the excitation wavelength of the fluorescent sample in sample slide 5 to go through. Part of beam BF1 illuminates on the edge of transparent sample slide 5 and couples to waveguide beam BF3 travelling in sample slide 5 and illuminates the sample area under the lens 11. Part of beam BF1 illuminates on mirror 10. Tilted mirror 10 deflects beam BF1 to beam BF2 and back-illuminates the sample area in sample slide 5 right under lens 11 in large oblique angle. The remaining part of beam BF1 with large divergence angle (i.e., beam BF4) illuminates on absorber 9 and get absorbed so that no reflected light of beam BF4 gets into the camera 1C in small incidence angle. The light coming from the sample area under the lens 11 goes through the lens 11 and is filtered by long-pass filter 12 so that only light in a specify wavelength range that is emitted by the fluorescent sample in sample slide 5 gets into camera 1C to form an image. Smartphone 1 captures and processes the image to get some property of the sample. Rubber door 16 is inserted into device 18 to cover sample slide 5 to prevent ambient light getting into device 18 to affect the test.

FIG. 6-A and FIG. 6-B is the schematic sectional viewing showing the design to make lever 8 stop at the pre-defined position when being pulled outward from the device 18. Ball plunger 17 is mounted in the sidewall of track slot 6t, and a groove 8g is drilled on the sidewall of lever 8 with the shape matching the shape of the ball in ball plunger 17. When lever 8 is being pulled outward from device 18 and has not reach the pre-defined position as shown in FIG. 6-A, the ball in ball plunger 17 in pressed into its body by the sidewall of lever 8 so that lever 8 can slide along the track 6t. As shown in FIG. 6-B, when the groove 8g on lever 8 reach to the position of ball plunger 17, the ball in ball plunger 17 jump into groove 8g to stop lever 8.

Figure 7:
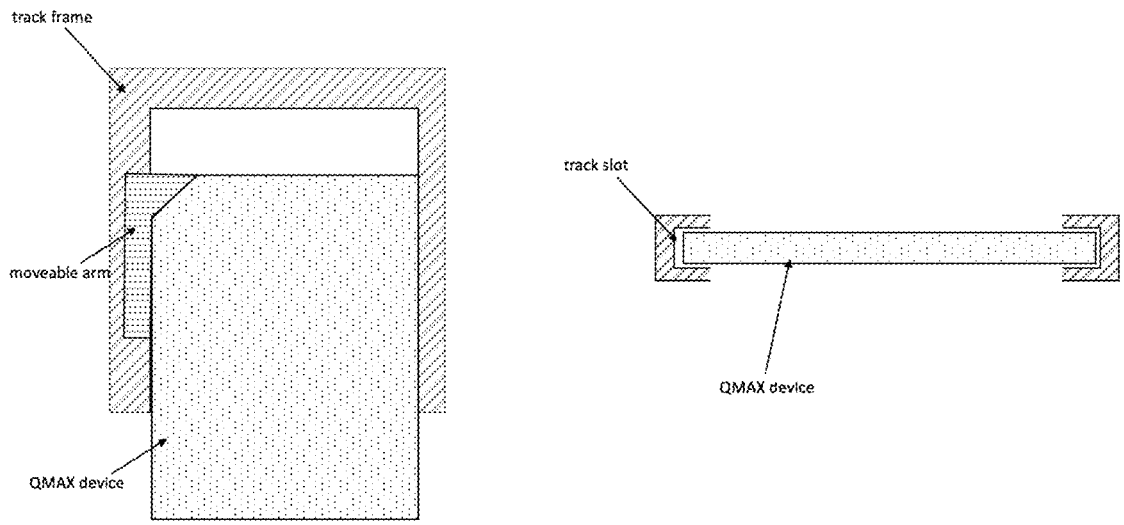
FIG. 7 is the schematic illustration of the structure of the sample slider holding the QMAX device, according to some embodiments of the present invention.

FIG. 7 is the schematic illustration of the structure of the sample slider holding the QMAX device. The sample slider comprises a track frame having a track slot to let QMAX device slide along it, a moveable arm pre-built in the track slot moving together with QMAX device to guide its movement. The moveable arm equipped with a stopping mechanism to make QMAX device stop at two pre-defined stop positions. The width and height of the track slot is carefully configured to make the QMAX device shift less than 0.5 mm in horizontal direction perpendicular to the sliding direction and shift less than less than 0.2 mm along the thickness direction of the QMAX device.

Figure 8:
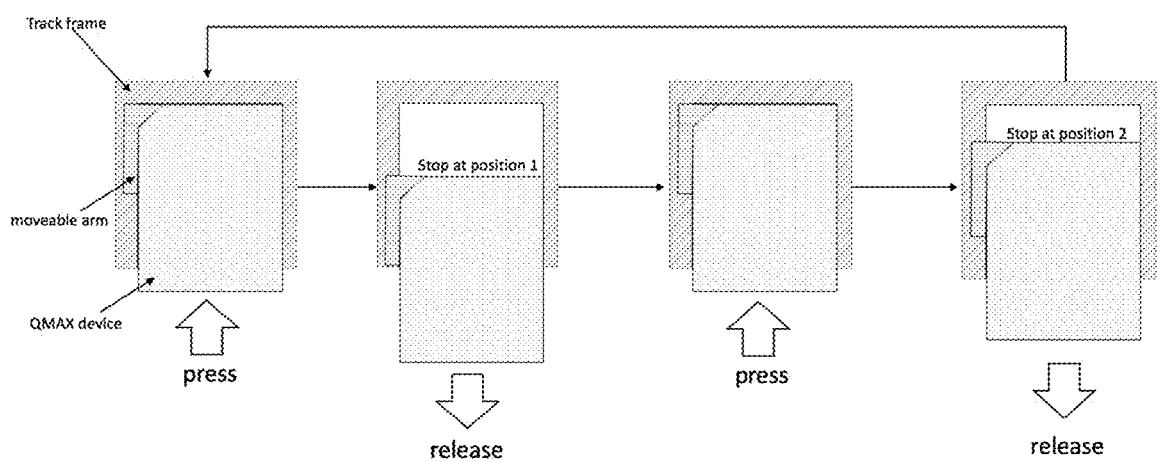
FIG. 8 is the schematic illustration of the moveable arm switching between two pre-defined stop positions, according to some embodiments of the present invention.

FIG. 8 is the schematic illustration of the moveable arm switching between two pre-defined stop positions. By pressing the QMAX device and the moveable arm together to the end of the track slot and then releasing, the QMAX card can stop at either position 1 where sample area is out of field of view of smartphone camera for easily taking out the QMAX device from the slider or position 2 where sample area is right under the field of view of smartphone camera for capturing image.

FIG. 9 is the schematic illustration of how the slider indicates if QMAX device is inserted in right direction. The shape of one corner of the QMAX device is configured to be different from the other three right angle corners. And the shape of the moveable arm matches the shape of the corner with the special shape so that only in correct direction can QMAX device slide to correct position in the track slot. If the QMAX device is flipped or inserted from the wrong side, the part of the QMAX device outside the slider is longer that when the QMAX device is correctly inserted.

When both fluorescent image and bright-field images are available, one can employ the knowledge of the fluorescent image to process the bright-field image, or employ the knowledge of the bright-field image to process the fluorescent image, or collectively process two images. The field-of-view of the fluorescent image and bright-field image can be different; thus, the two images are not spatially aligned, pixel-to-pixel.

To solve the mis-alignment between the fluorescent image and bright-field image, one can apply image registration to these two images. An image registration finds a geometric transform that relates the spatial position from one image to another. Various image registration algorithms can be used for aligning a fluorescent image and bright-field image, including but not limited to, feature-point based, cross-correlation based, Fourier alignment based, etc. The image registration outputs a geometric transform that maps the spatial position (coordinate) of one image to another.

After the fluorescent image and bright-field image are aligned, one can utilize the information from two images to refine the processing of one image, or process two images collectively.

Examples

A1. An optical adaptor, comprising: a holder frame, and an optical box removably attached to the holder frame, wherein the holder frame is configured to removably fit over a mobile device and align the optical box to a camera and an illumination source integrated in the mobile device; wherein the optical box comprises sample receptacle slot and illumination optics.

B1. An optical system, comprising: the optical adaptor of embodiment A1; and a QMAX card, which comprises a first plate and a second, wherein the first plate and the second compresses a liquid sample into a layer of uniform thickness of less than 200 um; and a slider that configured to accommodate the QMAX card and to be asserted into the optical box.

C1. The adaptor or system of any prior embodiments, wherein the mobile device is a smart phone.

C2. The adaptor or system of any prior embodiments, wherein the holder frame comprises a holder case that is configured to be replaceable with other holder cases having a different size for different mobile devices.

C3. The adaptor or system of any prior embodiments, wherein the holder frame is sized to removably fit the optical adaptor to an upper part of the mobile device.

C4. The adaptor or system of any prior embodiments, wherein the optical box of the optical adaptor comprises: a receptacle slot that is configured to receive and position the QMAX card in a sample slide in the field of view and focal range of the camera; a bright-field illumination optics that is configured to capture bright-field microscopy images of the sample; a fluorescent illumination optics that is configured to capture fluorescent microscopy images of a sample; and a lever that is configured to switch between bright-field illumination optics and fluorescent illumination optics by sliding inward and outward in the optical box.

C5. The adaptor or system of any prior embodiments, wherein the receptor slot comprises a rubber door, which can fully cover the slot to prevent the ambient light getting into the optical box to be collected by the camera.

C6. The adaptor or system of any prior embodiments, wherein the bright-field illumination optics in the adaptor is configured to receive and turn the beam emitted by the light source so as to back-illuminated the sample in normal incidence angle C7. The adaptor or system of any prior embodiments, wherein optical box further comprises a lens mounted in it and aligned with the camera of the mobile device, which magnifies the images captured by the camera.

C8. The adaptor or system of any prior embodiments, wherein the images captured by the camera are further processed by processors of mobile device and outputs the analysis result on a screen of mobile device.

C9. The adaptor or system of any prior embodiments, wherein the level is slidable and is configured to achieve both bright-field illumination and fluorescent illumination optics in the same optical adaptor.

C10. The adaptor or system of any prior embodiments, wherein optical elements of the fluorescent illumination optics are mounted on the lever and when the lever fully slides into the optical box, C11. The adaptor or system of any prior embodiments, wherein the lever with the fluorescent illumination optics elements block the optical path of bright-field illumination optics and switch the illumination optics to fluorescent illumination optics C12. The adaptor or system of any prior embodiments, wherein when the lever slides out, the fluorescent illumination optics elements mounted on the lever move out of the optical path and switch the illumination optics to bright-field illumination optics C13. The adaptor or system of any prior embodiments, wherein the lever comprises two planes at different heights.

C14. The adaptor or system of any prior embodiments, wherein the two planes are joined together with a vertical bar and move together in or out of the optical box.

C15. The adaptor or system of any prior embodiments, wherein the two planes can be separated and each plane can move individually in or out of the optical box.

C16. The adaptor or system of any prior embodiments, wherein the upper lever plane comprises at least one optical element which can be, but not limited to be an optical filter.

C17. The adaptor or system of any prior embodiments, wherein the upper lever plane moves under the light source and the preferred distance between the upper lever plane and the light source is in the range of 0 to 5 mm.

C18. The adaptor or system of any prior embodiments, wherein part of the bottom lever plane is not parallel to the image plane.

C19. The adaptor or system of any prior embodiments, wherein the surface of the non-parallel part of the bottom lever plane has mirror finish with high reflectivity larger than 95%.

C20. The adaptor or system of any prior embodiments, wherein the non-parallel part of the bottom lever plane moves under the light source and deflects the light emitted from the light source to back-illuminate the sample area right under the camera.

C21. The adaptor or system of any prior embodiments, wherein the preferred tilt angle of the non-parallel part of the bottom lever plane is in the range of 45 degree to 65 degree and the tilt angle is defined as the angle between the non-parallel bottom plane and the vertical plane.

C22. The adaptor or system of any prior embodiments, wherein part of the bottom lever plane is parallel to the image plane and is located under and 1 mm to 10 mm away from the sample.

C23. The adaptor or system of any prior embodiments, wherein the surface of the parallel part of the bottom lever plane is highly light absorptive with light absorption larger than 95%.

C24. The adaptor or system of any prior embodiments, wherein the absorptive surface is to eliminate the reflective light back-illuminating on the sample in small incidence angle.

C25. The adaptor or system of any prior embodiments, wherein the lever comprises a stopper configured to stop the lever.

C26. The adaptor or system of any prior embodiments, wherein the stopper comprises a ball plunger and a groove on the lever is used in order to stop the lever at a pre-defined position when being pulled outward from the adaptor.

C27. The adaptor or system of any prior embodiments, wherein the stopper is configured to allow the user to use arbitrary force the pull the lever but make the lever to stop at a fixed position where the optical adaptor's working mode is switched to bright-filed illumination.

C28. The adaptor or system of any prior embodiments, wherein the sample slider is mounted inside the receptacle slot to receive the QMAX device and position the sample in the QMAX device in the field of view and focal range of the smartphone camera.

C29. The adaptor or system of any prior embodiments, wherein the moveable arm switches between the two stop positions by a pressing the QMAX device and the moveable arm together to the end of the track slot and then releasing.

C30. The adaptor or system of any prior embodiments, wherein he moveable arm can indicate if the QMAX device is inserted in correct direction.

C31. The adaptor or system of any prior embodiments, wherein the shape of one corner of the QMAX device is configured to be different from the other three right angle corners.

C31. The adaptor or system of any prior embodiments, wherein the shape of the moveable arm matches the shape of the corner with the special shape so that only in correct direction can QMAX device slide to correct position in the track slot.

C32. The adaptor or system of any prior embodiments, wherein the sample slider comprises a fixed track frame and a moveable arm:

C33. The adaptor or system of any prior embodiments, wherein he frame track is fixedly mounted in the receptacle slot of the optical box; and the track frame has a sliding track slot that fits the width and thickness of the QMAX device so that the QMAX device can slide along the track. The width and height of the track slot is carefully configured to make the QMAX device shift less than 0.5 mm in the direction perpendicular to the sliding direction in the sliding plane and shift less than less than 0.2 mm along the thickness direction of the QMAX device.

C34. The adaptor or system of any prior embodiments, wherein the frame track has an opened window under the field of view of the camera of smartphone to allow the light back-illuminate the sample.

C35. The adaptor or system of any prior embodiments, wherein the moveable arm is pre-built in the sliding track slot of the track frame and moves together with the QMAX device to guide the movement of QMAX device in the track frame.

C36. The adaptor or system of any prior embodiments, wherein the moveable arm equipped with a stopping mechanism with two pre-defined stop positions.

B. Optical Adaptor for Colorimetric Reader Attachment to Smartphone (Tilted-Fiber-End Illumination)

Colorimetric assay is a very powerful technique having wide applications in health monitoring, disease diagnostic, chemical analysis and so on. The key factor to get the accurate colorimetric assay result is to accurately quantify the color change. Conventionally, the color change of a colorimetric test strip is analyzed by comparing the color change with a standard color card. But this comparison is accomplished by human's eye and can be easily influenced by the environment light condition, which limits the accuracy of quantifying the color change.

The present invention that is described herein address this problem by providing a system comprising an optical adaptor and a smartphone. The optical adaptor device fits over a smartphone converting it into a colorimetric reader which can provide a consistent and uniform illumination to illuminate the front surface of the colorimetric test card and capture the image of the sample to analyze the color change. This system can be operated conveniently and reliably by a common person at any location. The optical adaptor takes advantage of the existing resources of the smartphone, including camera, light source, processor and display screen, which provides a low-cost solution to accurately quantify the color change of a colorimetric assay.

In this invention, the optical adaptor device comprises a holder frame fitting over the upper part of the smartphone and an optical box attached to the holder having sample receptacle slot and illumination optics. In some prior arts of attachment adaptor for smartphone, their adaptor design is a whole piece including both the clip-on mechanics parts to fit over the smartphone and the functional elements. This design has the problem that they need to redesign the whole-piece adaptor for each specific model of smartphone. But in this present invention, the optical adaptor is separated into a holder frame only for fitting a smartphone and a universal optical box containing all the functional parts. For the smartphones with different dimensions, as long as the relative positions of the camera and the light source are the same, only the holder frame need to be redesigned, which will save a lot of cost of design and manufacture.

The optical box of the optical adaptor comprises: a receptacle slot which receives and position the colorimetric sample in the field of view and focal range of the smartphone camera; an illumination and imaging optics to create uniform and consistent illumination on the sample independently of any external conditions and capture the sample image.

To capture the sample image to accurately represent the color change, it is desirable that the sample area under the camera is uniformly illuminated. But for all common smartphones, there is always a distance between the light source and the camera. When the sample is placed very close to the camera of smartphone, without additional illumination optics, the area can be uniformly front-illuminated by the light source is right under the light source but not within the field of view of the camera. To solve this problem, in this present invention, a tilted large-core optical fiber is used to turn the light beam emitted from the light source to uniformly illuminate the sample area right under the camera.

And to create a more uniform illumination, it is desirable that the light beam from an area light source rather than from a LED point light source of the smartphone. A separate diffuser placed in front of the end faces of the optical fiber could be provided for this purpose, but this approach increases the elements in the optical adaptor and increase the cost. Instead, in this present invention, both end faces of the optical fiber are made to have matte finish to serve as the diffuser so that the end face towards the sample can become an area light source to generate more uniform illumination on the sample.

Typically, the optical box also comprises a lens mounted in it aligned with the camera of the smartphone, which makes the sample within the focal range of the camera. The images captured by the camera will be further processed by the processor of smartphone to analyze the color change and outputs the analysis result on the screen of smartphone.

A sample slider is mounted inside the receptacle slot to receive the QMAX device and position the sample in the QMAX device in the field of view and focal range of the smartphone camera.

The sample slider comprises a fixed track frame and a moveable arm:

The frame track is fixedly mounted in the receptacle slot of the optical box. And the track frame has a sliding track slot that fits the width and thickness of the QMAX device so that the QMAX device can slide along the track. The width and height of the track slot is carefully configured to make the QMAX device shift less than 0.5 mm in the direction perpendicular to the sliding direction in the sliding plane and shift less than less than 0.2 mm along the thickness direction of the QMAX device.

The frame track has an opened window under the field of view of the camera of smartphone to allow the light back-illuminate the sample.

A moveable arm is pre-built in the sliding track slot of the track frame and moves together with the QMAX device to guide the movement of QMAX device in the track frame.

The moveable arm equipped with a stopping mechanism with two pre-defined stop positions. For one position, the arm will make the QMAX device stop at the position where a fixed sample area on the QMAX device is right under the camera of smartphone. For the other position, the arm will make the QMAX device stop at the position where the sample area on QMAX device is out of the field of view of the smartphone and the QMAX device can be easily taken out of the track slot.

The moveable arm switches between the two stop positions by a pressing the QMAX device and the moveable arm together to the end of the track slot and then releasing.

The moveable arm can indicate if the QMAX device is inserted in correct direction. The shape of one corner of the QMAX device is configured to be different from the other three right angle corners. And the shape of the moveable arm matches the shape of the corner with the special shape so that only in correct direction can QMAX device slide to correct position in the track slot.

FIGS. 10-A, 10-B and 10-C are the schematic illustration of system 10 for smartphone colorimetric reader. Particularly, FIGS. 10-B and 10-C are the exploded views of system 10, shown from the front and rear sides respectively. System 10 comprises a smartphone 1; an optical adaptor device 13 fitting over the upper part of smartphone 1; a colorimetric test card 137, inserted into receptacle slot 136 of device 13 so that the sample area on the sample card 137 is positioned within the field of view and focal range of camera module 1C in smartphone 1. The software (not shown) installed in smartphone 1 analyzes the image collected by camera module 1C while light source 1L in smartphone 1 is emitting light, in order to analyze the color change of the colorimetric test, and outputs the results to a display screen 1f in smartphone 1.

Figure 11:
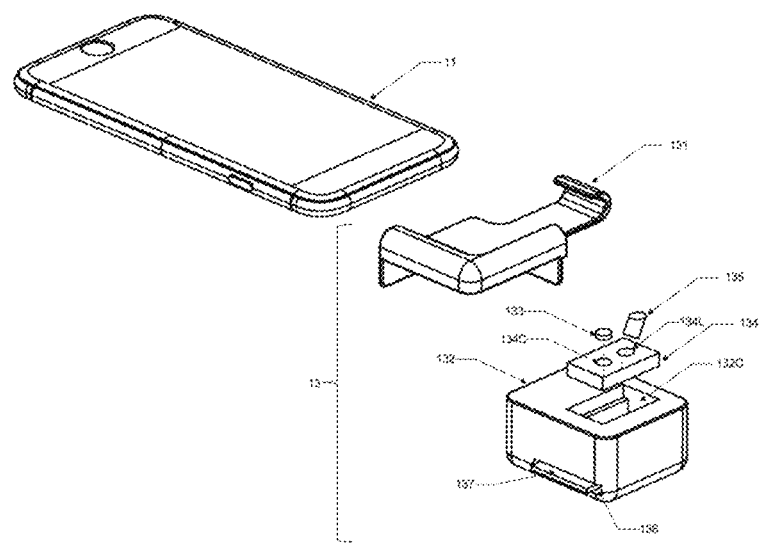
FIG. 11 is the schematic exploded view of optical adaptor device in system, according to some embodiments of the present invention.

FIG. 11 is the schematic exploded view of optical adaptor device 13 in system 10. Device 13 comprises a holder case 131 fitting over the upper part of smartphone 1; an optical box 132 attached to case 131 including a receptacle slot 136, an optics chamber 132C. An optics insert 134 is fitted into the top of optics chamber 132C with an exit aperture 134L and an entrance aperture 134C in it aligning with light source 1L and camera 1C (shown in FIG. 10-B) in smartphone 1. A lens 133 is mounted in entrance aperture 134C in optics insert 134 and configured so that the sample area on colorimetric sample card 137 inserted into receptacle slot 136 is located within the working distance of the camera 1C (shown in FIG. 10-B). A large-core optical fiber 135 is mounted in the exit aperture 134L with tilted angle. Both end faces of fiber 135 are made to have matte finish. Fiber 135 whose operation as the illumination optics in device 13 is described below in FIG. B3.

Figure 12:
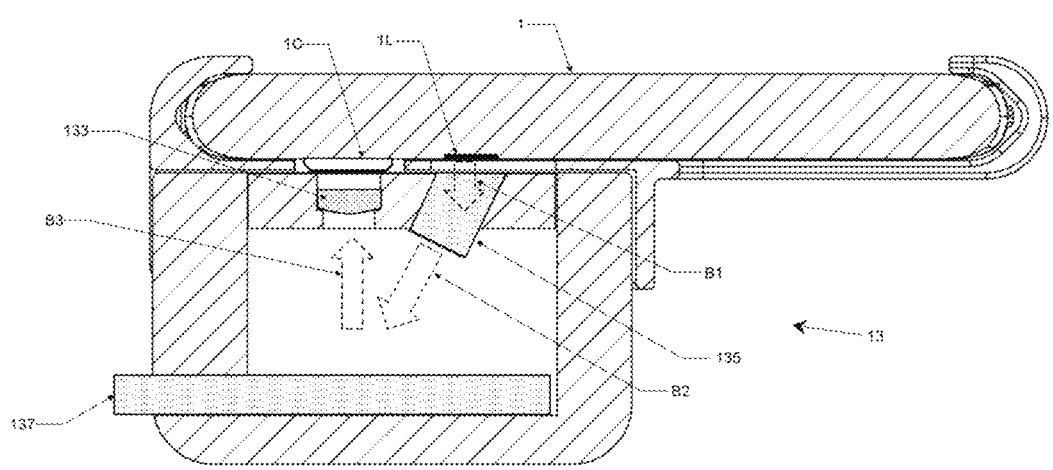
FIG. 12 is the schematic sectional view showing details of system reading a colorimetric card, and particularly of device, according to some embodiments of the present invention.

FIG. 12 is the schematic sectional view showing details of system 10 reading a colorimetric card, and particularly of device 13. This figure illustrates the functionality of the elements that were described above with reference to FIG. 11. Light source 1L emits light beam B1 away from smartphone 1. Beam B1 is coupled into the fiber 135 through the first end face and travels along the direction of fiber 135 and is emitted out from the second end face to become beam B2. Beam B2 illuminates the sample area of colorimetric sample card 137 right under the camera 1C from front side to create uniform illumination. Because the end faces of fiber 135 are made to be matte and diffusive finish, beam B2 can be regarded as emitting from an area light source, which helps to create a more uniform illumination. The tilt angle in which the fiber 135 is mounted is set to make the central tray of beam B2 illuminates on the area on the sample card 137 right under the camera. Lens 11 creates an image of the sample area on the image sensor plane of camera 1C. Smartphone 1 captures and processes the image to analyze the color information in the image to quantify the color change of the colorimetric assay.

C. Optical Adaptor for Colorimetric Reader Attachment to Smartphone (Fiber-Ring Illumination)

Colorimetric assay is a very powerful technique having wide applications in health monitoring, disease diagnostic, chemical analysis and so on. The key factor to get the accurate colorimetric assay result is to accurately quantify the color change. Conventionally, the color change of a colorimetric test strip is analyzed by comparing the color change with a standard color card. But this comparison is accomplished by human's eye and can be easily influenced by the environment light condition, which limits the accuracy of quantifying the color change.

The present invention that is described herein address this problem by providing a system comprising an optical adaptor and a smartphone. The optical adaptor device fits over a smartphone converting it into a colorimetric reader which can provide a consistent and uniform illumination to illuminate the front surface of the colorimetric test card and capture the image of the sample to analyze the color change. This system can be operated conveniently and reliably by a common person at any location. The optical adaptor takes advantage of the existing resources of the smartphone, including camera, light source, processor and display screen, which provides a low-cost solution to accurately quantify the color change of a colorimetric assay.

In this invention, the optical adaptor device comprises a holder frame fitting over the upper part of the smartphone and an optical box attached to the holder having sample receptacle slot and illumination optics. In some prior arts of attachment adaptor for smartphone, their adaptor design is a whole piece including both the clip-on mechanics parts to fit over the smartphone and the functional elements. This design has the problem that they need to redesign the whole-piece adaptor for each specific model of smartphone. But in this present invention, the optical adaptor is separated into a holder frame only for fitting a smartphone and a universal optical box containing all the functional parts. For the smartphones with different dimensions, as long as the relative positions of the camera and the light source are the same, only the holder frame need to be redesigned, which will save a lot of cost of design and manufacture.

The optical box of the optical adaptor comprises: a receptacle slot which receives and position the colorimetric sample in the field of view and focal range of the smartphone camera; an illumination and imaging optics to create uniform and consistent illumination on the sample independently of any external conditions and capture the sample image.

To capture the sample image to accurately represent the color change, it is desirable that the sample area under the camera is uniformly illuminated. But for all common smartphones, the light source is always a point source and mounted next to the camera with some distance, which means the light source is not central symmetric relative to the camera. This causes the problem that, when the sample is placed very close to the camera of smartphone, without the help of additional illumination optics, the illumination pattern on the front surface of a sample in the field of view of the camera will have a gradient intensity change in a linear direction. Hence, it is desirable to create a light source with large emitting area and central symmetric to the camera. To achieve this purpose, in this present invention, a plastic side-emitting fiber ring is put around the smartphone camera to make the fiber ring central symmetric relative to the camera. And the two end faces of the fiber ring are mounted towards the light source of the smartphone. This will convert the original single point light source to infinite number of small light sources having nearly equal luminous intensity distributed on a circle with equal distance from the smartphone camera. The light emitted from the side wall of the ring fiber further goes through a diffusive film to increase the emitting area and make the illumination more even. The sample area right under the camera is uniformly front-illuminated by the designed illumination optics based on side-emitting fiber ring.

Because how the color of a colorimetric sample is represented greatly depends on the illumination condition, it is important to control the illumination in the optical box consistent independently to any external light conditions. To solve this problem, the receptacle slot has a rubber door attached to it, which can fully cover the slot to prevent the environmental light getting into the optical box to result in change of the illumination condition.

Typically, the optical box also comprises a lens mounted in it aligned with the camera of the smartphone, which makes the sample within the focal range of the camera. The images captured by the camera will be further processed by the processor of smartphone to analyze the color change and outputs the analysis result on the screen of smartphone.

A sample slider is mounted inside the receptacle slot to receive the QMAX device and position the sample in the QMAX device in the field of view and focal range of the smartphone camera.

The sample slider comprises a fixed track frame and a moveable arm:

The frame track is fixedly mounted in the receptacle slot of the optical box. And the track frame has a sliding track slot that fits the width and thickness of the QMAX device so that the QMAX device can slide along the track. The width and height of the track slot is carefully configured to make the QMAX device shift less than 0.5 mm in the direction perpendicular to the sliding direction in the sliding plane and shift less than less than 0.2 mm along the thickness direction of the QMAX device.

The frame track has an opened window under the field of view of the camera of smartphone to allow the light back-illuminate the sample.

A moveable arm is pre-built in the sliding track slot of the track frame and moves together with the QMAX device to guide the movement of QMAX device in the track frame.

The moveable arm (also called "lever") equipped with a stopping mechanism with two pre-defined stop positions. For one position, the arm will make the QMAX device stop at the position where a fixed sample area on the QMAX device is right under the camera of smartphone. For the other position, the arm will make the QMAX device stop at the position where the sample area on QMAX device is out of the field of view of the smartphone and the QMAX device can be easily taken out of the track slot.

The moveable arm switches between the two stop positions by a pressing the QMAX device and the moveable arm together to the end of the track slot and then releasing.

The moveable arm can indicate if the QMAX device is inserted in correct direction. The shape of one corner of the QMAX device is configured to be different from the other three right angle corners. And the shape of the moveable arm matches the shape of the corner with the special shape so that only in correct direction can QMAX device slide to correct position in the track slot.

Some Embodiments

1. Fiber Ring-Illuminator

In some embodiments of optical assembly, wherein: the radius of the side illunmring fiber is 10 mm; the diameter of ring fiber can be at least 5 mm, 10 mm, 15 mm, 20 mm, 25 mm, 30 mm, 40 mm, 50 mm, 60 mm, 80 mm, or 100 mm, or in a range between any of the two values; the diameter of the cross-section of the ring fiber can be at least 0.5 mm, 1.0 mm, 1.5 mm, 2.0 mm, 2.5 mm, 3 mm, 4 mm, 5 mm, 6 mm, 8 mm, or 10 mm, or in a range between any of the two values.

In some embodiments of optical assembly, wherein the external imager lens has a diameter of 6 mm; the diameter of the imager lens can be at least 2 mm, 3 mm, 4 mm, 5 mm, 10 mm, 15 mm, 20 mm, 25 mm, 30 mm, 40 mm, or 50 mm, or in a range between any of the two values.

In some embodiments of optical assembly, wherein the ring fiber can be used in combination with micro-lens array or be replace by a micro-lens array;

In some embodiments of optical assembly, wherein the optical assembly comprises a light diffuser plate between the sample and the ring fiber, wherein the light diffusive plate has an aperture configured to aligned with the camera.

In some embodiments of optical assembly, wherein the length of one side of the diffusive plate can be at least 5 mm, 10 mm, 15 mm, 20 mm, 25 mm, 30 mm, 40 mm, 50 mm, 100 mm, 150 mm, or 200 mm, or in a range between any of the two values, wherein the thickness of the diffusive plate can be at least 2 mm, 3 mm, 4 mm, 5 mm, 10 mm, 15 mm, or 20 mm, or in a range between any of the two values.

In some embodiments of optical assembly, wherein the distance between the diffusive plate and ring fiber can be at least 1 mm, 10 mm, 15 mm, 20 mm, 25 mm, 30 mm, 40 mm, 50 mm, 100 mm, or in a range between any of the two values.

The optical assembly of claim 2, wherein the distance between the sample and ring fiber can be at least 2 mm, 10 mm, 15 mm, 20 mm, 25 mm, 30 mm, 40 mm, 50 mm, 100 mm, 150 mm, 200 mm, or in a range between any of the two values.

Lever:

1. The optical assembly of claim 3, wherein the distance between first planar plane on the moveable arm and the light source can be at least 0.5 mm, 2 mm, 4 mm, 8 mm, 10 mm, 20 mm, 50 mm, 100 mm or in a range between any of the two values.
2. The optical assembly of claim 3, wherein the distance between first planar plane and the second planar plane of the moveable arm can be at least 5 mm, 10 mm, 15 mm, 20 mm, 40 mm, 100 mm, 200 mm, or in a range between any of the two values.
3. The optical assembly of claim 5, wherein the distance that the moveable arm needs to move to switch between different positions can be at least 1 mm, 5 mm, 15 mm, 20 mm, 40 mm, 100 mm, or in a range between any of the two values.
4. The optical assembly of claim 3, wherein the second planar plane is connected to a tilted plane, wherein a mirror is mounted on the tilted plane
5. The optical assembly of claim 4, wherein the preferred tilt angle of the tilted plane can be at least 10 degree, 30 degree, 60 degree, 80 degree, or in a range between any of the two values, and the tilt angle is defined as the angle between the second planar plane and tilted plane.

FIGS. 13-A, 13-B and 13-C are the schematic illustrations of system 10 for smartphone colorimetric reader. Particularly, FIG. 13-B and FIG. 13-C are the exploded views of system 10, shown from the front and rear sides respectively. System 10 comprises a smartphone 1; an optical adaptor device 13 fitting over the upper part of smartphone 1; a colorimetric sample card 138, inserted into receptacle slot 137 of device 13 so that the sample area on the sample card 138 is positioned within the field of view and focal range of camera module 1C in smartphone 1. A rubber door 139 attached to device 18 covers receptacle slot 137 after sample card 138 is in so as to prevent the ambient light getting into optical adaptor 13 to affect the test. The software (not shown) installed in smartphone 1 analyzes the image collected by camera module 1C while light source 1L in smartphone 1 is emitting light, in order to analyze the color change of the colorimetric test, and outputs the results to a display screen 1f in smartphone 1.

FIG. 14 is the schematic exploded view of optical adaptor device 13 in system 10. Device 13 comprises a holder case 131 fitting over the upper part of smartphone 1; an optical box 132 attached to case 131 including a receptacle slot 137, an optics chamber 132C and a rubber door 139 inserted into trench 137s to cover receptacle slot 137. An optics insert 134 is fitted into the top of optics chamber 132C with an exit aperture 134L and an entrance aperture 134C in it aligning with light source 1L and camera 1C (shown in FIG. 13-B) in smartphone 1. A lens 133 is mounted in entrance aperture 134C in optics insert 134 and configured so that the sample area on colorimetric sample card 138 inserted into receptacle slot 137 is located within the working distance of the camera 1C (shown in FIG. 13-B). A side-emitting optical fiber ring 135 is mounted in optics insert 134 configured to make the camera 1C in the center of the fiber ring 135. Both end faces of optical fiber ring 135 are mounted in exit aperture 134L facing the light source 1L. A light diffuser film 136 is put under the optical fiber ring 135 and has a hole opened for the aperture of lens. Optical fiber ring 135 whose operation as the illumination optics in device 13 is described below in FIG. 15-A-c.

FIGS. 15-A, 15-B and 15-C are the schematic views showing details of system 10 reading a colorimetric card, and particularly of device 13. FIG. 15-A is the sectional view showing details of device 13. And FIG. 15-B and FIG. 15-C are the schematic views only showing the configuration of the optics elements in device 13. These figures illustrate the functionality of the elements that were described above with reference to FIG. 14. The light emitted from light source 1L is coupled into side-emitting optical fiber ring 135 from the two end faces of fiber ring 135 and travels inside along the ring. Beam B1 is emitted out from the side wall of fiber ring and go through the diffuser film 136. Beam B1 illuminates the sample area of colorimetric sample card 138 right under the camera 1C from front side to create uniform illumination. The illuminated sample area absorbs part of beam B1 and reflects the beam B1 to beam B2. Beam B2 is collected by lens 133 and gets into camera 1C Lens 133 creates an image of the sample area on the image sensor plane of camera 1C. Smartphone 1 captures and processes the image to analyze the color information in the image to quantify the color change of the colorimetric assay.

D. Device and Systems for Tomography

D-1. Tomography Device with QMAX Structure

A tomography device that reconstructs a sliceable virtual three-dimensional copy of a biological specimen with the highest resolution of nanoscale is disclosed. The device consists of an imaging sensor, a lens, and a QMAX device, as in FIG. 16-A.

The QMAX device has a periodic pillar array. A biological specimen is contained in the QMAX device. An index-matching liquid can be used to reduce the scattering of light, and reduce heterogeneities of refractive index throughout the specimen. The QMAX structure enhances the detection sensitivity of six (or more) orders of magnitude.

D-2. Calibration Based on QMAX Structure

The pillar array has a metallic disk on top of each pillar. The metallic disk provides a calibration signal for both spatial and height calibration for images captured by the imaging sensor. The shape of the metallic disk can be designed to facilitate a fast calibration. For example, the shape of the metallic disk can be like the letter E; such a pillar array is illustrated in FIG. 16-B.

When the imaging sensor capture an image on the QMAX structure, with or without a biological specimen, the captured image can be calibrated spatially and the focus distance of the camera can also be quantitively calibrated.

For spatial calibration, the captured image goes through an object detection. The object detection scheme can be a template matching, an optical character recognition, a shape detection, or other schemes that are used in the field. The object detection retrieves the orientation of the detected pattern, which in the example of FIG. 16-B is the letter E. With the orientation parameter, spatial calibration is achieved through a two-dimensional geometric transform.

We disclose a quantitative calibration of the focus distance with the pillar array. The effect of focal distance on the captured image can be explained by the thin lens model, as shown in FIG. 16-C. If the sensing device is at a distance $\delta$ from the focus plane, point Q will be projected onto a circle of diameter $k\sigma$, and its radiance will spread over this circle, with Q being defocused. The location v of the focal plane depends on the focal length of the lens, f, and the distance from the object, u. The relationship between these three variables is given by the well-known Gauss lens law or thin lens equation: $1/f=1/u+1/v$.

We measure the degree of focus on the captured image, and deduct the focus plane location. The focus degree measures the focus level either the whole image or every image pixel. A wide variety of algorithms and operators have been pro-posed in the literature to measure the focus degree, such as gradient-based, Laplacian-based, wavelet-based, statistics-based, Cosine transform/Fourier transform based, etc.

The focus degree of the pillar array captured at different focus planes can be pre-measured and stored in a look up table. When the imaging sensor captures a new image of the pillar array, for example, FIG. 16-D shows a captured image of the example pillar array in FIG. 16-B, we compute the focus degree of the newly captured image, refer the focus degree to the look up table, and find its corresponding focal plane location.

D-3. Tomography System

The goal of tomography is to reconstruct a three-dimensional volume of a biological specimen through several projections of it. An end-to-end tomography system includes light source, imaging, and three-dimensional reconstruction.

Light Source

The light captured by the imaging sensor can be refracted from the specimen, emitted from the specimen, etc.

Imaging

The imaging part captures projection on the imaging sensor. The projections can be captured at different focus distance, different angles, from different illumination, etc.

Several images can be captured at different focus distances. The lens moves towards or backward the QMAX structure at a stepsize or a multiple of stepsize. The value of the stepsize and the movement of the lens can be controlled by hardware or software through an application program interface. The image sensor records the captured image.

Several images can be captured at different angles. The specimen is rotated and optical images are captured that approximate straight-line projections through it. The specimen is rotated to a series of angular positions, and an image is captured at each orientation. The apparatus is carefully aligned to ensure that the axis of rotation is perpendicular to the optical axis, so that projection data pertaining to each plane is collected by the imaging sensor. The focal plane can be positioned halfway between the axis of rotation and the QMAX card closest to the lens. This means that every image contains both focused data from the front half of the specimen (the half closest to the lens), and out-of-focus data from the back half of the specimen. The focused data will be utilized for three-dimensional volume reconstruction, while the out-of-focus data will not be used. A band-pass filter can be equipped to select the focused data.

Optical projection tomography is performed using standard tomographic algorithms. Due to the position of the focal plane relative to the axis of rotation, two images taken 180 degrees apart from each other will be focused on different parts of the specimen. Limiting the back-projection to the region corresponding to the focused part of the specimen improves the quality of the results. As data is accumulated for the various orientations through the specimen, a semi-disc mask, which acts as a band-pass filter, can be rotated to ensure that only focused data is back-projected.

Several images can be captured at different illumination. Quantitative phase images from time-dependent interference patterns induced by the frequency shifting of a reference beam relative to the sample beam can be obtained. A galvanometer-mounted tilting mirror can be used to vary the angle of illumination. A laser beam passes through two acousto-optic modulators which shift the frequency of the laser beam. A second beam splitter recombines the specimen and reference laser beams, forming an interference pattern which is captured at the imaging sensor. Phase images are then calculated by applying phase-shifting interferometry. For near-plane wave illumination of a thin specimen with small index contrast, the phase of the transmitted field is to a good approximation equal to the line integral of the refractive index along the path of beam propagation. Therefore, the phase image can simply be interpreted as the projection of refractive index.

Besides a band-pass filter, various imaging filters can be used during image captures, for the purpose of (including but not limited to):

(1) signal selection, thereby portion of the captured image is selected;
(2) signal enhancement, thereby portion or whole of the captured image is enhanced;
(3) signal transformation, thereby portion or whole of the captured image is transformed into another representation, such as frequency representation, multi-scale representation, etc.;
(4) signal replication, thereby portion of the captured image is replaced by another portion of the captured image, or by the representation of another portion of the captured image;
(5) or any combination of (1)-(4).

Captured images can be enhanced through filtering, such as contrast enhancement, color enhancement, noise reduction, etc. It can increase the dynamic range of pixel intensities, adjust color temperature, boost the signal to noise ratio, etc.

Captured images can be transformed into another representation, which can be more suitable for the three-dimension reconstruction. It can be transformed into a different format (8 bit to 16 bit, integer to floating point, etc.), different color space (RGB to HSV, etc.), different domain (spatial domain to frequency domain, etc.), etc.

Portion of captured images can be replaced by another portion (or transformation of another portion) of captured images. It can be a spatial region, which is replaced by the transformation of another region, such as a reflective extension around the boundary, etc. It can be a frequency subband, which is replaced by the transformation of another frequency subband, such as the high frequency subband is replaced by an estimation from the low frequency subband, etc.

Three-Dimensional Reconstruction

Reconstructing a three-dimensional volume of the biological specimen from its projection is an inverse problem. The three-dimensional volume reconstruction can employ a phase image retrieval scheme, a back-projection scheme, non-linear approximation scheme, optimization scheme, etc.

When several images are captured at different focus distances, we compute the focus degrees of these images, and list these focus degrees as a vector. Then we refer the vector with the look up table, and find their corresponding focal plane distances. The corresponding can be distance based, correlation based, or other criteria to select the best match.

A diagram of phase image retrieval based scheme is shown in FIG. 16-E. It consists of four components:
Focus distance calculation
Phase image retrieval
Height estimation
Three-dimensional volume reconstruction The second component, phase retrieval is through a quantitative phase imaging technique, based on the transport of intensity (TIE) equation. The TIE equation states $$k\frac{\partial I(x, y)}{\partial z} = -\nabla \cdot [I(x, y)\nabla \varphi(x, y)]$$

where $\partial I/\partial z$ indicates the intensity gradient which can be computed from the multi-focal images, k is the wave number and $\varphi$ is the sample phase distribution.

The TIE equation could be solver using fast Fourier transform, discrete cosine transform; see for example, "Boundary-artifact-free phase retrieval with the transport of intensity equation: fast solution with use of discrete cosine transform", C. Zuo, Q. Chen, and A. Asundi, Optics Express, Vol. 22, No. 8, April 2014. The phase image $\varphi$ is retrieved from the TIE equation.

Given the phase image, we estimate the height (thickness) of the biological specimen. Recall that for a sample with a thickness of t and a refractive index of n, the corresponding optical path length Lp is $L_p = t \times n$ The height of the biological specimen can be computed, with a known refractive index.

Going further, the three-dimensional volume of the biological specimen can be reconstructed.

The back-projection algorithm is commonly used in three-dimensional reconstruction in tomography. It includes Fourier transform base algorithm, filtered back projection algorithm, back projection and filtering algorithm, and iterative algorithm.

When the position of the focal plane relative to the axis of rotation differs, two images taken 180 degrees apart from each other will be focused on different parts of the specimen. To compensate, a half-plane adjusted back projection algorithm can be employed. Thus, limiting the back-projection to the region corresponding to the focused part of the specimen will improve the quality of the results. As data is accumulated for the various orientations through the specimen, a semi-disc mask can be rotated to ensure that only focused data is back-projected.

As another embodiment of the back-projection algorithm, a procedure based on the filtered back-projection method can be applied. A discrete inverse Radon transform is applied to every x–θ slice in the beam rotation direction, with x, the coordinate in the tilt direction and θ, the relative angle of laser beam direction to the optic axis of the objective lens. To compensate for the angle between imaging and illumination directions, the x values is divided by cos θ. To reduce the effects of the missing projections, an iterative constraint method can be applied.

For the inverse problem to reconstruct a three-dimensional volume from its projection, the resulting three-dimensional volume can be blurred. A ramp filter can be used to remove or reduce the blurriness.

Beside the deblurring filter, various imaging filters can be used for three-dimensional volume reconstruction, for (including but not limited to):

(1) signal selection, where portion of the image or image volume is selected;

(2) signal enhancement, where portion or whole of the image or image volume is enhanced;

(3) signal transformation, where portion or whole of the image or image volume is transformed into another representation, such as frequency representation, multi-scale representation, etc.;

(4) signal replication, where portion of the image or image volume is replaced by another portion of the captured image, or by the representation of another portion of the captured image;

(5) or any combination of (1)-(4)

D-4. Examples of Present Invention

DA1. A device for sample imaging, comprising a QMAX device and an imager, wherein: the QMAX device comprises: a first plate, a second plate, and spacers, wherein: the plates are movable relative to each other into different configurations; one or both plates are flexible; each of the plates has, on its respective inner surface, a sample contact area for contacting a deformable sample; one or both of the plates comprise the spacers that are fixed with a respective plate; the spacers have a predetermined substantially uniform height and a predetermined inter-spacer-distance; and at least one of the spacers is inside the sample contact area; wherein one of the configurations is an open configuration, in which: the two plates are separated apart, the spacing between the plates is not regulated by the spacers, and the sample is deposited on one or both of the plates; and wherein another of the configurations is a closed configuration which is configured after the sample deposition in the open configuration; and in the closed configuration: at least part of the sample is compressed by the two plates into a layer of uniform thickness, wherein the uniform thickness of the layer is confined by the inner surfaces of the two plates and is regulated by the plates and the spacers; and the imager is configured to capture an image of signals emanating from at least part of the layer of uniform thickness.

DB1. A system for tomography, comprising a QMAX device, an imager, a holder, and a control device, wherein: the QMAX device comprises: a first plate, a second plate, and spacers, wherein: the plates are movable relative to each other into different configurations; one or both plates are flexible; each of the plates has, on its respective inner surface, a sample contact area for contacting a deformable sample; one or both of the plates comprise the spacers that are fixed with a respective plate; the spacers have a predetermined substantially uniform height and a predetermined inter-spacer-distance; and at least one of the spacers is inside the sample contact area; wherein one of the configurations is an open configuration, in which: the two plates are separated apart, the spacing between the plates is not regulated by the spacers, and the sample is deposited on one or both of the plates; and wherein another of the configurations is a closed configuration which is configured after the sample deposition in the open configuration; and in the closed configuration: at least part of the sample is compressed by the two plates into a layer of uniform thickness, wherein the uniform thickness of the layer is confined by the inner surfaces of the two plates and is regulated by the plates and the spacers; the imager comprises an image sensor and a lens, wherein: the lens is configured to focus signals emanating from at least part of the layer of uniform thickness and project the focused signals to the image sensor, and the image sensor is configured to capture images of said focused signals; the holder is configured to adjust relative position between the QMAX device and the imager; and the control device comprises hardware and software for controlling and/or deducing the position adjustment made by the holder, and receiving and reconstructing said images into a three-dimensional volume.

DBB1. A system for tomography, comprising a QMAX device, an imager, a holder, and a control device, wherein: the QMAX device comprises: a first plate, a second plate, and spacers, wherein: the plates are movable relative to each other into different configurations; one or both plates are flexible; each of the plates has, on its respective inner surface, a sample contact area for contacting a deformable sample; one or both of the plates comprise the spacers that are fixed with a respective plate; the spacers have a predetermined substantially uniform height and a predetermined inter-spacer-distance; and at least one of the spacers is inside the sample contact area; wherein one of the configurations is an open configuration, in which: the two plates are separated apart, the spacing between the plates is not regulated by the spacers, and the sample is deposited on one or both of the plates; and wherein another of the configurations is a closed configuration which is configured after the sample deposition in the open configuration; and in the closed configuration: at least part of the sample is compressed by the two plates into a layer of uniform thickness, wherein the uniform thickness of the layer is confined by the inner surfaces of the two plates and is regulated by the plates and the spacers; the imager is capable of changing the focal plane and comprises an image sensor and a lens, wherein: the lens is configured to focus signals emanating from at least part of the layer of uniform thickness and project the focused signals to the image sensor, and the image sensor is configured to capture images of said focused signals; the lens is a single lens or a compound lens consisting several lenses; at least one element lens in the lens is moveable to change the distance from the image sensor to change the focal plane of the imager; and the moveable lens can be driven by stepper motor and/or electromagnetic force, which is computerized or manually controlled. and the control device comprises hardware and software for controlling and/or deducing the position adjustment made by the holder, and receiving and reconstructing said images into a three-dimensional volume.

DC1. A method of tomography, comprising the steps of: depositing a sample onto the QMAX device of any prior device or system embodiment;
(a) after (a), using the two plates of the QMAX device to compress at least part of the sample into a layer of substantially uniform thickness that is confined by the sample contact surfaces of the plates, wherein the uniform thickness of the layer is regulated by the spacers and the plates, wherein the compressing comprises:
bringing the two plates together; and
conformable pressing, either in parallel or sequentially, an area of at least one of the plates to press the plates together to a closed configuration, wherein the conformable pressing generates a substantially uniform pressure on the plates over the at least part of the sample, and the pressing spreads the at least part of the sample laterally between the sample contact surfaces of the plates, and wherein the closed configuration is a configuration in which the spacing between the plates in the layer of uniform thickness region is regulated by the spacers;
(b) capturing an image, using the imager of any prior device or system embodiment, of signals emanating from at least part of the layer of uniform thickness;
(c) adjusting relative position between the QMAX device and imager, repeating step (c); and
(d) after a series of steps (c), reconstructing the captured images into a three-dimensional volume of said at least part of the layer,
wherein a conformable pressing is a method that makes the pressure applied over an area is substantially constant regardless the shape variation of the outer surfaces of the plates; and
wherein the parallel pressing applies the pressures on the intended area at the same time, and a sequential pressing applies the pressure on a part of the intended area and gradually move to other area.

DCC1. A method to take images at different focal planes, comprising steps of:
(a) computerized or manually controlling the moveable lens in the imager to the initial position;
(b) corresponding the moveable lens position to the position of the focal plane;
(c) capturing the image using the image sensor in the imager and record the position of focal plane;
(d) computerized or manually adding a step displacement to move the moveable lens to the next position
(e) repeat step (b) to (d)
(f) after a series of step (e), several images at different focal planes are captured.

DA21. The device of any prior embodiment, wherein QMAX device further comprises a dry reagent coated on one or both plates that stains the sample.

DA22. The device of any prior embodiment, wherein:
i. one or both plate sample contact areas comprise one or a plurality of binding sites that each binds and immobilizes a respective analyte; or
ii. one or both plate sample contact areas comprise, one or a plurality of storage sites that each stores a reagent or reagents; wherein the reagent(s) dissolve and diffuse in the sample during or after step (c), and wherein the sample contains one or plurality of analytes; or
iii. one or a plurality of amplification sites that are each capable of amplifying a signal from the analyte or a label of the analyte when the analyte or label is 500 nm from the amplification site; or
iv. any combination of i to iii.

DA23. The device of any prior embodiment, wherein the imager further comprises a light source that provides light for illumination or excitation of the layer of uniform thickness for the imaging.

DA24. The device of embodiment DA23, wherein the light source is selected from the group consisting of: LED, laser, incandescent light, and any combination thereof.

DB2. The system of embodiment DB1, wherein the signals comprise optical signals selected from the group consisting of: light reflection, light refraction, light transmission, luminescence signals, and any combination thereof.

DB3. The system of any prior embodiment, wherein the imager further comprises a light source providing light illuminating said layer of uniform thickness for the imaging, wherein the light source is selected from the group consisting of: incandescent light, LED, CFL, laser, and any combination thereof.

DB4. The system of any prior embodiment, wherein the imager further comprises a light source providing excitation light that excites fluorescence emission from said layer of uniform thickness for the imaging, wherein the light source is a LED and/or a laser.

DB5. The system of any prior embodiment, wherein the holder is capable of adjusting the relative position of the lens to the QMAX device along its optical axis to change focal plane position of the lens.

DB6. The system of any prior embodiment, wherein the holder is capable of adjusting the relative position between the lens and the QMAX device to change imaging angle, wherein the imaging angle is an angle between focal plane of the lens and the layer of uniform thickness.

DB7. The system of any prior embodiment, wherein the imager further comprises a light source providing illumination light for the imaging, and wherein the holder is capable of adjusting the relative position between the light source and the QMAX device to change angle of incidence of the illumination light, wherein the angle of incidence is the angle between the illumination light and a line perpendicular to the layer of uniform thickness.

DB8. The system of any prior embodiment, wherein the control device comprises hardware and software for sending a command that defines the position adjustment to the holder, and wherein the holder is configured to receive said command and make the adjustment with no more than 10% deviation.

DB9. The system of any prior embodiment, wherein the control device comprises hardware and software for sending a command that defines the position adjustment to the holder, and wherein the holder is configured to receive said command and make the adjustment with no more than 1% deviation.

DB10. The system of any of embodiments DB8-DB9, wherein the control device comprises hardware and software for receiving an input that defines the position adjustment and converting the input into the command for the holder to make the adjustment.

DB11. The system of any prior embodiment, wherein the system further comprises a plurality of calibration pillars, and wherein:

(1) said plurality of calibration pillars are placed between the sample contact areas of the two plates at the closed configuration, and have different heights from one another, which are all smaller than the uniform height of the spacers;

(2) said images are captured at different focal planes along a common optical axis; and (3) the control device comprises hardware and software for: (a) calculating a focus score for each of said images; and (b) deducing a focus plane position at which each of said images is captured by comparing said focus score with a look-up table, wherein the focus score is a matrix of focus degrees calculated for each pixel of a captured image, wherein the look-up table is predetermined and comprises a row of pre-determined focus plane positions along said common optical axis and a corresponding row of calibration focus scores, each of the calibration focus scores is calculated based on an image of the calibration pillars captured at the corresponding pre-determined focus plane.

DB12. The system of any prior embodiment, wherein said images are captured at different focal planes along a common optical axis, and wherein the control device comprises hardware and software for: (a) generating a phase image for a biological entity in said at least part of the layer, wherein the phase image is a phase distribution calculated based on wavelength of an illuminating light used for imaging, at least part of said images that contain signals from the biological entity, and the focus plane positions at which said images are respectively captured; and (b) estimating a thickness of the biological entity based on the phase image and a refractive index of the sample, wherein the biological entity is a part or entirety of said at least part of the layer.

DB13. The system of embodiment DB8, wherein the control device comprises hardware and software for reconstructing said at least part of the images into a three-dimensional volume of the biological entity based on the estimated thickness.

DB14. The system of any prior embodiment, wherein said images are captured at different imaging angles, wherein the control device comprises hardware and software for: (1) knowing or deducing the imaging angle for each of said images; and (2) reconstructing said images into a three-dimensional volume based on the known/deduced imaging angels using a back-projection algorithm, and wherein the imaging angle is an angle between focal plane of the lens and the layer of uniform thickness.

DB15. The system of any prior embodiment, wherein said images are captured at different angels of incidence of illumination light, wherein the control device comprises hardware and software for: (1) knowing or deducing the angle of incidence for each of said images; and (2) reconstructing said images into a three-dimensional volume based on the known/deduced angle of incidence using a back-projection algorithm, and wherein the angle of incidence of the illumination light is the angle between the illumination light and a line perpendicular to the layer of uniform thickness.

DB16. The system of any or embodiments DB14-DB15, wherein the back-projection algorithm is selected from the group consisting of: Fourier transform base algorithm, filtered back-projection algorithm, back-projection and filtering algorithm, iterative algorithm, and any combination thereof.

DB17. The system of any prior embodiment, wherein said imager is equipped with imaging filters, and wherein the captured images are filtered by the imaging filters and/or software of the control device for: (1) signal selection, thereby portion of the captured image is selected; (2) signal enhancement, thereby portion or whole of the captured image is enhanced; (3) signal transformation, thereby portion or whole of the captured image is transformed into another representation, such as frequency representation, multi-scale representation, etc.; (4) signal replication, thereby portion of the captured image is replaced by another portion of the captured image, or by the representation of another portion of the captured image; or any combination of (1)-(4).

DB18. The system of any prior embodiment, wherein the control device further comprises hardware and software for reconstructing said at least part of the images into a three-dimensional volume, wherein during three-dimensional volume reconstruction, the images and the three-dimensional volume are filtered by software for: (1) signal selection, where portion of the image or image volume is selected; (2) signal enhancement, where portion or whole of the image or image volume is enhanced; (3) signal transformation, where portion or whole of the image or image volume is transformed into another representation, such as frequency representation, multi-scale representation, etc.; (4) signal replication, where portion of the image or image volume is replaced by another portion of the captured image, or by the representation of another portion of the captured image; or any combination of (1)-(4)

DC2. The method of embodiment DC1, further comprising: before step (c), staining the sample with a dye.

DC3. The method of any prior method embodiment, wherein during the step (b), the conformable pressing is by human hand.

DC4. The method of any prior method embodiment, wherein the conformable pressing of step (d) is provided by a pressured liquid, a pressed gas, or a conformal material.

DC5. The method of any prior method embodiment, wherein the adjusting step (d) comprises adjusting the relative position of the lens to the QMAX device along its optical axis to change focal plane position of the lens.

DC6. The method of any prior method embodiment, wherein the adjusting step (d) comprises adjusting the relative position between the lens and the QMAX device to change imaging angle, wherein the imaging angle is an angle between focal plane and the layer of uniform thickness.

DC7. The method of any prior method embodiment, wherein the imager further comprises a light source providing illumination light for the imaging, and wherein the adjusting step (d) comprises adjusting the relative position of the light source to the QMAX device to change angle of incidence of the illumination light, wherein the angle of incidence is the angle between the illumination light and a line perpendicular to the layer of uniform thickness.

DC8. The method of any prior method embodiment, wherein the adjusting step (d) is performed manually.

DC9. The method of any prior method embodiment, wherein the adjusting step (d) is performed through a control device operably coupled to a holder, wherein the control device comprises hardware and software for receiving an input that defines the position adjustment and sending a command to the holder, and wherein the holder is configured to receive said command and make the adjustment with a deviation no more than 10%.

DC10. The method of any prior method embodiment, wherein the adjusting step (d) is performed through a control device operably coupled to a holder, wherein the control device comprises hardware and software for receiving an input that defines the position adjustment and sending a command to the holder, and wherein the holder is configured to receive said command and make the adjustment with a deviation no more than 1%.

DC11. The method of any prior method embodiment, wherein said images are captured at different focal planes along a common optical axis, and wherein the reconstructing step (e) comprises: (i) calculating a focus score for each of said images; and (ii) deducing a focal plane position at which each of said images is captured by comparing said focus score with a look-up table, wherein the focus score is a matrix of focus degrees calculated for each pixel of a captured image, wherein the look-up table is predetermined and comprises a row of pre-determined focal plane positions along said common optical axis and a corresponding row of calibration focus scores, each of the calibration focus scores is calculated based on an image of the calibration pillars captured at the corresponding pre-determined focal plane.

DC12. The method of any prior method embodiment, wherein said images are captured at different focal planes along a common optical axis, and wherein the reconstructing step (e) comprises: (i) generating a phase image for a biological entity in said at least part of the layer, wherein the phase image is a phase distribution calculated based on the wavelength of an illuminating light used for imaging, at least part of said images that contain signals from the biological entity, and the focal plane positions at which said images are captured; and (ii) estimating a thickness of the biological entity based on the phase image and a refractive index of the sample, wherein the biological entity is a part or entirety of said at least part of the layer.

DC13. The method of embodiment DC12, wherein the reconstructing step (e) further comprises reconstructing said at least part of the images into a three-dimensional volume of the biological entity based on the estimated thickness.

DC14. The method of any prior method embodiment, wherein said images are captured at different imaging angles, wherein the reconstructing step (e) comprises: (i) knowing or deducing the imaging angle for each of said images; and (ii) reconstructing said images into a three-dimensional volume based on the known/deduced imaging angels using a back-projection algorithm, and wherein the imaging angle is an angle between focal plane of the lens and the layer of uniform thickness.

DC15. The method of any prior method embodiment, wherein said images are captured at different angles of incidence of illumination light, wherein the reconstructing step (e) comprises: (i) knowing or deducing the angle of incidence for each of said images; and (ii) reconstructing said images into a three-dimensional volume based on the known/deduced angle of incidence using a back-projection algorithm, and wherein the angle of incidence of the illumination light is the angle between the illumination light and a line perpendicular to the layer of uniform thickness.

DC16. The method of any of embodiments DC14-DC15, wherein the back-projection algorithm is selected from the group consisting of: Fourier transform base algorithm, filtered back-projection algorithm, back-projection and filtering algorithm, iterative algorithm, and any combination thereof.

DC17. The method of any prior method embodiment, wherein the sample is a biological sample selected from the group consisting of: cells, tissues, bodily fluids, stool, and any combination thereof.

DC18. The method of any prior method embodiment, wherein the sample is an environmental sample from an environmental source selected from the group consisting of a river, lake, pond, ocean, glaciers, icebergs, rain, snow, sewage, reservoirs, tap water, drinking water, etc.; solid samples from soil, compost, sand, rocks, concrete, wood, brick, sewage, the air, underwater heat vents, industrial exhaust, vehicular exhaust and any combination thereof.

DC19. The method of any prior method embodiment, wherein the sample is a foodstuff sample selected from the group consisting of: raw ingredients, cooked food, plant and animal sources of food, preprocessed food, partially or fully processed food, and any combination thereof.

DC20. The method of any prior method embodiment, wherein the sample is blood, and the biological entity is red blood cells, white blood cells, and/or platelets.

DC21. The method of embodiment DC20, further comprising: calculating volume of red blood cells, white blood cells, and/or platelets, based on their respective reconstructed three-dimensional volumes.

DC22. The method of embodiment DC21, further comprising: based on the calculated volume, determining a blood test readout selected from the group consisting of: mean corpuscular volume (MCV), hematocrit, Red cell distribution width (RDW), mean platelet volume (MPV), platelet distribution width (PDVV), immature platelet fraction (IPF), and any combination thereof.

E. Assay and Imaging Assisted by Machine Learning

E-1. QMAX Device for Assay and Imaging

A device for biological analyte detection and localization, comprising a QMAX device, an imager, and a computing unit, is disclosed. A biological sample is suspected on the QMAX device. The count and location of an analyte contained in the sample are obtain by the disclosure.

The imager captures an image of the biological sample. The image is submitted to a computing unit. The computing unit can be physically directly connected to the imager, connected through network, or in-directly through image transfer.

E-2. Workflow

The disclosed analyte detection and localization employ machine learning deep learning. A machine learning algorithm is an algorithm that is able to learn from data. A more rigorous definition of machine learning is "A computer program is said to learn from experience E with respect to some class of tasks T and performance measure P, if its performance at tasks in T, as measured by P, improves with experience E." It explores the study and construction of algorithms that can learn from and make predictions on data—such algorithms overcome following strictly static program instructions by making data driven predictions or decisions, through building a model from sample inputs.

Deep learning is a specific kind of machine learning based on a set of algorithms that attempt to model high level abstractions in data. In a simple case, there might be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

The disclosed analyte detection and localization workflow consists of two stages, training and prediction, as in FIG. 17-A. We describe training and prediction stages in the following paragraphs.

Training

In the training stage, training data with annotation is fed into a convolutional neural network. Convolutional neural network a specialized kind of neural network for processing data that has a known, grid-like topology. Examples include time-series data, which can be thought of as a 1D grid taking samples at regular time intervals, and image data, which can be thought of as a 2D grid of pixels. Convolutional networks have been tremendously successful in practical applications. The name "convolutional neural network" indicates that the network employs a mathematical operation called convolution. Convolution is a specialized kind of linear operation. Convolutional networks are simply neural networks that use convolution in place of general matrix multiplication in at least one of their layers.

Training data are annotated for the analyte to be detect. Annotation indicates whether or not an analyte presents in a training data. Annotation can be done in the form of bounding boxes which fully contains the analyte, or center locations of analytes. In the latter case, center locations are further converted into circles covering analytes.

When the size of training data is large, it presents two challenges: annotation (which is usually done by person) is time consuming, and the training is computing expensive. To overcome these challenges, one can partition the training data into patches of small size, then annotate and train on these patches, or a portion of these patches.

Annotated training data is fed into a convolutional neural network for model training. The output is a model that can be used to make pixel-level prediction on an image. We use the Caffe library with fully convolutional network (FCN). Other convolutional neural network architecture can also be used, such as TensorFlow.

The training stage generates a model that will be used in the prediction stage. The model can be repeatedly used in the prediction stage for input images. Thus, the computing unit only needs access to the generated model. It does not need access to the training data, nor the training stage has to be run on the computing unit.

Prediction

In the predication stage, a detection component is applied to the input image, which is followed by a localization component. The output of the prediction stage is the count of analytes contained in the sample, along with the location of each analyte.

In the detection component, an input image, along with the model generated from the training stage, is fed into a convolutional neural network. The output of the detection stage is a pixel-level prediction, in the form of a heatmap. The heatmap can have the same size as the input image, or it can be a scaled down version of the input image. Each pixel in the heatmap has a value from 0 to 1, which can be considered as the probability (belief) whether a pixel belongs to an analyte. The higher the value, the bigger the chance it belongs to an analyte.

The heatmap is the input of the localization component. We disclose an algorithm to localize the analyte center. The main idea is to iteratively detect local peaks from the heatmap. After we find the peak, we calculate the local area surrounding the peak but with smaller value. We remove this region from the heatmap and find the next peak from the remaining pixels. The process is repeated only all pixels are removed from the heatmap.

One embodiment of the localization algorithm is to sort the heatmap values into a one-dimensional ordered list, from the highest value to the lowest value. Then pick the pixel with the highest value, remove the pixel from the list, along with its neighbors. Iterate the process to pick the pixel with the highest value in the list, until all pixels are removed from the list.

```
Algorithm GlobalSearch (heatmap)
Input:
        heatmap
Output:
        loci
loci ←{ }
sort(heatmap)
while (heatmap is not empty) {
    s ← pop(heatmap)
    D ← {disk center as s with radius R}
    heatmap = heatmap \ D // remove D from the heatmap
    add s to loci
}
```

After sorting, heatmap is a one-dimensional ordered list, where the heatmap value is ordered from the highest to the lowest. Each heatmap value is associated with its corresponding pixel coordinates. The first item in the heatmap is the one with the highest value, which is the output of the pop(heatmap) function. One disk is created, where the center is the pixel coordinate of the one with highest heatmap value. Then all heatmap values whose pixel coordinates resides inside the disk is removed from the heatmap. The algorithm repeatedly pops up the highest value in the current heatmap, removes the disk around it, till the items are removed from the heatmap.

In the ordered list heatmap, each item has the knowledge of the proceeding item, and the following item. When removing an item from the ordered list, we make the following changes, as illustrated in FIG. 17-B:

Assume the removing item is $x_r$, its proceeding item is $x_p$, and its following item is $x_f$.

For the proceeding item $x_p$, re-define its following item to the following item of the removing item. Thus, the following item of $x_p$ is now $x_f$.

For the removing item $x_r$, un-define its proceeding item and following item, which removes it from the ordered list.

For the following item $x_f$, re-define its proceeding item to the proceeding item of the removed item. Thus, the proceeding item of $x_f$ is now $x_p$.

After all items are removed from the ordered list, the localization algorithm is complete. The number of elements in the set loci will be the count of analytes, and location information is the pixel coordinate for each s in the set loci.

Another embodiment searches local peak, which is not necessary the one with the highest heatmap value. To detect each local peak, we start from a random starting point, and search for the local maximal value. After we find the peak, we calculate the local area surrounding the peak but with smaller value. We remove this region from the heatmap and find the next peak from the remaining pixels. The process is repeated only all pixels are removed from the heatmap.

```
Algorithm LocalSearch (s, heatmap)
Input:
    s: starting location (x, y)
    heatmap
Output:
    s: location of local peak.
We only consider pixels of value > 0.
Algorithm Cover (s, heatmap)
Input:
    s: location of local peak.
    heatmap:
Output:
    cover: a set of pixels covered by peak:
```

This is a breadth-first-search algorithm starting from s, with one altered condition of visiting points: a neighbor p of the current location q is only added to cover if heatmap[p]>0 and heatmap[p]<=heatmap[q]. Therefore, each pixel in cover has a non-descending path leading to the local peak s.

```
Algorithm Localization (heatmap)
Input:
    heatmap
Output:
    loci
loci ←{ }
pixels ←{all pixels from heatmap}
while pixels is not empty {
    s ←any pixel from pixels
    s ←LocalSearch(s, heatmap)       // s is now local peak
    probe local region of radius R surrounding s for better local peak
    r ←Cover(s, heatmap)
    pixels ← pixels \ r              // remove all pixels in cover
    add s to loci
```

E-3. Example of Present Invention

EA1. A method of deep learning for data analysis, comprising: receiving an image of a test sample, wherein the sample is loaded into a QMAX device and the image is taken by an imager connected to the QMAX device, wherein the image includes detectable signals from an analyte in the test sample; analyzing the image with a detection model and generating a 2-D data array of the image, wherein the 2-D data array includes probability data of the analyte for each location in the image, and the detection model is established through a training process that comprises: feeding an annotated data set to a convolutional neural network, wherein the annotated data set is from samples that are the same type as the test sample and for the same analyte; and training and establishing the detection model by convolution; and analyzing the 2-D data array to detect local signal peaks with: signal list process, or local searching process; and calculating the amount of the analyte based on local signal peak information.

EB1. A system for data analysis, comprising: a QMAX device, an imager, and computing unit, wherein: the QMAX device is configured to compress at least part of a test sample into a layer of highly uniform thickness; the imager is configured to produce an image of the sample at the layer of uniform thickness, wherein the image includes detectable signals from an analyte in the test sample; the computing unit is configured to: receive the image from the imager; analyze the image with a detection model and generate a 2-D data array of the image, wherein the 2-D data array includes probability data of the analyte for each location in the image, and the detection model is established through a training process that comprises: feeding an annotated data set to a convolutional neural network, wherein the annotated data set is from samples that are the same type as the test sample and for the same analyte; and training and establishing the detection model by convolution; and analyzing the 2-D data array to detect local signal peaks with signal list process, or local searching process; and calculate the amount of the analyte based on local signal peak information.

EA2. The method of embodiment EA1, wherein the signal list process comprises: establishing a signal list by iteratively detecting local peaks from the 2-D data array, calculating a local area surrounding the detected local peak, and removing the detected peak and the local area data into the signal list in order; and sequentially and repetitively removing highest signals from the signal list and signals from around the highest signal, thus detecting local signal peaks.

EA3. The method of any embodiments EA embodiments, wherein the local search process comprises:
  i. searching for a local maximal value in the 2-D data array by starting from a random point;
  ii. calculating the local area surrounding the peak but with smaller value;
  iii. removing the local maximal value and the surrounding smaller values from the 2-D data array; and
  iv. repeating steps i-iii to detect local signal peaks.

EA4. The method of any prior EA embodiments, wherein the annotated data set is partitioned before annotation.

EB2. The system of embodiment EB1, wherein the imager comprises a camera.

EB3. The system of embodiment EB2, wherein the camera is part of a mobile communication device.

EB4. The system of any prior EB embodiments, wherein the computing unit is part of a mobile communication device.

F. Devices and Methods for Tissue Staining and Cell Imaging

F-1. Example of QMAX Device for Tissue Staining and Cell Imaging

FIG. 18-A shows an embodiment of a generic QMAX device, that have or not have a hinge, and wherein Q: quantification; M: magnifying; A: adding reagents; X: acceleration; also known as compressed regulated open flow (CROF)) device. The generic QMAX device comprises a first plate 10 and a second plate 20. In particular, panel (A) shows the perspective view of a first plate 10 and a second plate 20 wherein the first plate has spacers. It should be noted, however, that the spacers also are fixed on the second plate 20 (not shown) or on both first plate 10 and second plate 20 (not shown). Panel (B) shows the perspective view and a sectional view of depositing a sample 90 on the first plate 10 at an open configuration. It should be noted, however, that the sample 90 also is deposited on the second plate 20 (not shown), or on both the first plate 10 and the second plate 20 (not shown). Panel (C) illustrates (i) using the first plate 10 and second plate 20 to spread the sample 90 (the sample flow between the inner surfaces of the plates) and reduce the sample thickness, and (ii) using the spacers and the plate to regulate the sample thickness at the closed configuration of the QMAX device. The inner surfaces of each plate have one or a plurality of binding sites and or storage sites (not shown).

In some embodiments, the spacers 40 have a predetermined uniform height and a predetermined uniform inter-spacer distance. In the closed configuration, as shown in panel (C) of FIG. 18-A, the spacing between the plates and the thus the thickness of the sample 90 is regulated by the spacers 40. In some embodiments, the uniform thickness of the sample 90 is substantially similar to the uniform height of the spacers 40. It should be noted that although FIG. 18-A shows the spacers 40 to be fixed on one of the plates, in some embodiments the spacers are not fixed. For example, in certain embodiments the spacers is mixed with the sample so that when the sample is compressed into a thin layer, the spacers, which is rigid beads or particles that have a uniform size, regulate the thickness of the sample layer.

FIG. 18-A shows an embodiment of a QMAX device used for cell imaging. As shown in the figure, the device comprises a first plate 10, a second plate 20, and spacers 40. The plates are movable relative to each other into different configurations, one or both plates are flexible. Each of the plates has, on its respective inner surface, a sample contact area (not indicated) for contacting a staining liquid 910 and/or a tissue sample 90 suspected of containing a target analyte. The second plate 20 comprises the spacers 40 that are fixed to its inner surface 21. The spacers 40 have a predetermined substantially uniform height and a predetermined inter-spacer distance, and at least one of the spacers is inside the sample contact area.

FIG. 18-A panels (A) and (B) illustrate one of the configurations, an open configuration. As shown in the figure, in the open configuration, the two plates are partially or entirely separated apart, the spacing 102 between the plates is not regulated by the spacers 40, and the staining liquid 910 and the sample 90 are deposited on the first plate 10. It should be noted, the staining liquid 910 and the sample 90 can also be deposited on the second plate 20 or both plates.

FIG. 18-A panel (C) depicts another of the configurations of the two plates, a closed configuration. The closed configuration is configured after the deposition of the staining liquid 910 and the sample 90 in the open configuration, as shown in panel (B). And in the closed configuration, at least part of the sample 90 is between the two plates and a layer of at least part of staining liquid 910 is between the at least part of the sample 90 and the second plate 20, wherein the thickness of the at least part of staining liquid layer is regulated by the plates, the sample 90, and the spacers 40, and has an average distance between the sample surface and the second plate surface is equal or less than 250 µm with a small variation.

In some embodiments, the sample can dried thereon at the open configuration, and wherein the sample comprises bodily fluid selected from the group consisting of: amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, urine, and any combination thereof.

In some embodiments, the sample contact area of one or both of the plates is configured such that the sample can dried thereon at the open configuration, and the sample comprises blood smear and is dried on one or both plates.

In some embodiments, the sample is a solid tissue section having a thickness in the range of 1-200 um, and the sample contact area of one or both of the plates is adhesive to the sample. In some embodiments, the sample is paraffin-embedded. In some embodiments, the sample is fixed.

In some embodiments, the staining liquid is a pure buffer solution that does not comprise particularly component capable of altering the properties of the sample. In some embodiments, the staining liquid comprises fixative capable of fixing the sample. In some embodiments, the staining liquid comprises blocking agents, wherein the blocking agents are configured to disable non-specific endogenous species in the sample to react with detection agents that are used to specifically label the target analyte. In some embodiments, the staining liquid comprises deparaffinizing agents capable of removing paraffin in the sample. In some embodiments, the staining liquid comprises permeabilizing agents capable of permeabilizing cells in the tissue sample that contain the target analyte. In some embodiments, the staining liquid comprises antigen retrieval agents capable of facilitating retrieval of antigen. In some embodiments, the staining liquid comprises detection agents that specifically label the target analyte in the sample. In some embodiments, the sample contact area of one or both plates comprise a storage site that contains blocking agents, wherein the blocking agents are configured to disable non-specific endogenous species in the sample to react with detection agents that are used to specifically label the target analyte. In some embodiments, the sample contact area of one or both plates comprise a storage site that contains deparaffinizing agents capable of removing paraffin in the sample. In some embodiments. the sample contact area of one or both plates comprise a storage site that contains permeabilizing agents capable of permeabilizing cells in the tissue sample that contain the target analyte. In some embodiments. the sample contact area of one or both plates comprise a storage site that contains antigen retrieval agents capable of facilitating retrieval of antigen. In some embodiments, the sample contact area of one or both plates comprise a storage site that contains detection agents that specifically label the target analyte in the sample. In some embodiments, the sample contact area of one or both of the plates comprise a binding site that contains capture agents, wherein the capture agents are configured to bind to the target analyte on the surface of cells in the sample and immobilize the cells.

In some embodiments, the detection agent comprises dyes for a stain selected from the group consisting of: Acid fuchsin, Alcian blue 8 GX, Alizarin red S, Aniline blue WS, Auramine O, Azocarmine B, Azocarmine G, Azure A, Azure B, Azure C, Basic fuchsine, Bismarck brown Y, Brilliant cresyl blue, Brilliant green, Carmine, Chlorazol black E, Congo red, C.I. Cresyl violet, Crystal violet, Darrow red, Eosin B, Eosin Y, Erythrosin, Ethyl eosin, Ethyl green, Fast green F C F, Fluorescein Isothiocyanate, Giemsa Stain, Hematoxylin, Hematoxylin & Eosin, Indigo carmine, Janus green B, Jenner stain 1899, Light green SF, Malachite green, Martius yellow, Methyl orange, Methyl violet 2B, Methylene blue, Methylene blue, Methylene violet, (Bernthsen), Neutral red, Nigrosin, Nile blue A, Nuclear fast red, Oil Red, Orange G, Orange II, Orcein, Pararosaniline, Phloxin B, Protargol S, Pyronine B, Pyronine, Resazurin, Rose Bengal, Safranine O, Sudan black B, Sudan III, Sudan IV, Tetrachrome stain (MacNeal), Thionine, Toluidine blue, Weigert, Wright stain, and any combination thereof.

In some embodiments, the detection agent comprises antibodies configured to specifically bind to protein analyte in the sample.

In some embodiments, the detection agent comprises oligonucleotide probes configured to specifically bind to DNA and/or RNA in the sample.

In some embodiments, the detection agent is labeled with a reporter molecule, wherein the reporter molecule is configured to provide a detectable signal to be read and analyzed.

In some embodiments, the signal is selected from the group consisting of:
i. luminescence selected from photoluminescence, electroluminescence, and electrochemiluminescence;
ii. light absorption, reflection, transmission, diffraction, scattering, or diffusion;
iii. surface Raman scattering;
iv. electrical impedance selected from resistance, capacitance, and inductance;
v. magnetic relaxivity; and
vi. any combination of i-v.

F-2. Immunohistochemistry

In some embodiments, the devices and methods of the present invention are useful for conducting immunohistochemistry on the sample.

In immunohistochemical (IHC) staining methods, a tissue sample is fixed (e.g., in paraformaldehyde), optionally embedding in wax, sliced into thin sections that are less then 100 um thick (e.g., 2 um to 6 um thick), and then mounted onto a support such as a glass slide. Once mounted, the tissue sections may be dehydrated using alcohol washes of increasing concentrations and cleared using a detergent such as xylene.

In most IHC methods, a primary and a secondary antibody may be used. In such methods, the primary antibody binds to antigen of interest (e.g., a biomarker) and is unlabeled. The secondary antibody binds to the primary antibody and directly conjugated either to a reporter molecule or to a linker molecule (e.g., biotin) that can recruit reporter molecule that is in solution. Alternatively, the primary antibody itself may be directly conjugated either to a reporter molecule or to a linker molecule (e.g., biotin) that can recruit reporter molecule that is in solution. Reporter molecules include fluorophores (e.g., FITC, TRITC, AMCA, fluorescein and rhodamine) and enzymes such as alkaline phosphatase (AP) and horseradish peroxidase (HRP), for which there are a variety of fluorogenic, chromogenic and chemiluminescent substrates such as DAB or BCIP/NBT.

In direct methods, the tissue section is incubated with a labeled primary antibody (e.g. an FITC-conjugated antibody) in binding buffer. The primary antibody binds directly with the antigen in the tissue section and, after the tissue section has been washed to remove any unbound primary antibody, the section is to be analyzed by microscopy.

In indirect methods, the tissue section is incubated with an unlabeled primary antibody that binds to the target antigen in the tissue. After the tissue section is washed to remove unbound primary antibody, the tissue section is incubated with a labeled secondary antibody that binds to the primary antibody.

After immunohistochemical staining of the antigen, the tissue sample may be stained with another dye, e.g., hematoxylin, Hoechst stain and DAPI, to provide contrast and/or identify other features.

The present device may be used for immunohistochemical (IHC) staining a tissue sample. In these embodiments, the device may comprise a first plate and a second plate, wherein: the plates are movable relative to each other into different configurations; one or both plates are flexible; each of the plates has, on its respective surface, a sample contact area for contacting a tissue sample or a IHC staining liquid; the sample contact area in the first plate is smooth and planner; the sample contact area in the second plate comprise spacers that are fixed on the surface and have a predetermined substantially uniform height and a predetermined constant inter-spacer distance that is in the range of 7 μm to 200 μm;

wherein one of the configurations is an open configuration, in which: the two plates are completely or partially separated apart, the spacing between the plates is not regulated by the spacers; and wherein another of the configurations is a closed configuration which is configured after a deposition of the sample and the IHC staining liquid in the open configuration; and in the closed configuration: at least part of the sample is between the two plates and a layer of at least part of staining liquid is between the at least part of the sample and the second plate, wherein the thickness of the at least part of staining liquid layer is regulated by the plates, the sample, and the spacers, and has an average distance between the sample surface and the second plate surface is equal or less than 250 μm with a small variation.

In some embodiments, the device may comprise a dry IHC staining agent coated on the sample contact area of one or both plates. In some embodiments, the device may comprise a dry IHC staining agent coated on the sample contact area of the second plate, and the IHC staining liquid comprise a liquid that dissolve the dry IHC staining agent. The device of claim 1, wherein the thickness of the sample is 2 um to 6 um.

F-3. H& E and Special Stains

In some embodiments, the devices and methods of the present invention are useful for conducting H&E stain and special stains.

Hematoxylin and eosin stain or haematoxylin and eosin stain (H&E stain or HE stain) is one of the principal stains in histology. It is the most widely used stain in medical diagnosis and is often the gold standard; for example when a pathologist looks at a biopsy of a suspected cancer, the histological section is likely to be stained with H&E and termed "H&E section", "H+E section", or "HE section". A combination of hematoxylin and eosin, it produces blues, violets, and reds.

In diagnostic pathology, the "special stain" terminology is most commonly used in the clinical environment, and simply means any technique other than the H & E method that is used to impart colors to a specimen. This also includes immunohistochemical and in situ hybridization stains. On the other hand, the H & E stain is the most popular staining method in histology and medical diagnosis laboratories.

In any embodiments, the dry binding site may comprise a capture agent such as an antibody or nucleic acid. In some embodiments, the releasable dry reagent may be a labeled reagent such as a fluorescently-labeled reagent, e.g., a fluorescently-labeled antibody or a cell stain such Romanowsky's stain, Leishman stain, May-Grunwald stain, Giemsa stain, Jenner's stain, Wright's stain, or any combination of the same (e.g., Wright-Giemsa stain). Such a stain may comprise eosin Y or eosin B with methylene blue. In certain embodiments, the stain may be an alkaline stain such as haematoxylin.

In some embodiments, the special stains include, but not limited to, Acid fuchsin, Alcian blue 8 GX, Alizarin red S, Aniline blue WS, Auramine O, Azocarmine B, Azocarmine G, Azure A, Azure B, Azure C, Basic fuchsine, Bismarck brown Y, Brilliant cresyl blue, Brilliant green, Carmine, Chlorazol black E, Congo red, C.I. Cresyl violet, Crystal violet, Darrow red, Eosin B, Eosin Y, Erythrosin, Ethyl eosin, Ethyl green, Fast green F C F, Fluorescein Isothiocyanate, Giemsa Stain, Hematoxylin, Hematoxylin & Eosin, Indigo carmine, Janus green B, Jenner stain 1899, Light green SF, Malachite green, Martius yellow, Methyl orange, Methyl violet 2B, Methylene blue, Methylene blue, Methylene violet, (Bernthsen), Neutral red, Nigrosin, Nile blue A, Nuclear fast red, Oil Red, Orange G, Orange II, Orcein, Pararosaniline, Phloxin B, Protargol S, Pyronine B, Pyronine, Resazurin, Rose Bengal, Safranine O, Sudan black B, Sudan III, Sudan IV, Tetrachrome stain (MacNeal), Thionine, Toluidine blue, Weigert, Wright stain, and any combination thereof.

F-4. In Situ Hybridization

In some embodiments, the devices and methods of the present invention are useful for conducting in situ hybridization (ISH) on histological samples.

In situ hybridization (ISH) is a type of hybridization that uses a labeled complementary DNA, RNA or modified nucleic acids strand (i.e., probe) to localize a specific DNA or RNA sequence in a portion or section of tissue (in situ), or, if the tissue is small enough (e.g., plant seeds, *Drosophila* embryos), in the entire tissue (whole mount ISH), in cells, and in circulating tumor cells (CTCs).

In situ hybridization is used to reveal the location of specific nucleic acid sequences on chromosomes or in tissues, a crucial step for understanding the organization, regulation, and function of genes. The key techniques currently in use include: in situ hybridization to mRNA with oligonucleotide and RNA probes (both radio-labelled and hapten-labelled); analysis with light and electron microscopes; whole mount in situ hybridization; double detection of RNAs and RNA plus protein; and fluorescent in situ hybridization to detect chromosomal sequences. DNA ISH can be used to determine the structure of chromosomes. Fluorescent DNA ISH (FISH) can, for example, be used in medical diagnostics to assess chromosomal integrity. RNA ISH (RNA in situ hybridization) is used to measure and localize RNAs (mRNAs, lncRNAs, and miRNAs) within tissue sections, cells, whole mounts, and circulating tumor cells (CTCs).

In some embodiments, the detection agent comprises nucleic acid probes for in situ hybridization staining. The nucleic acid probes include, but not limited to, oligonucleotide probes configured to specifically bind to DNA and/or RNA in the sample.

F-5. System and Method for Tissue Staining and Cell Imaging

Also provided is a system for rapidly staining and analyzing a tissue sample using a mobile phone comprising:
(a) sample, staining liquid, and device as described above,
(b) a mobile communication
device comprising:
i. one or a plurality of cameras for the detecting and/or imaging the sample;
ii. electronics, signal processors, hardware and software for receiving and/or processing the detected signal and/or the image of the sample and for remote communication; and
(c) a light source from either the mobile communication device or an external source.

Also provided is a method for rapidly staining and analyzing a tissue sample using a mobile phone, comprising:
(a) depositing a tissue sample and a staining liquid on the device of the system described above, and placing the two plate into a closed configuration;
(b) obtaining a mobile phone that has hardware and software of imaging, data processing, and communication;
(c) assaying by the tissue sample deposited on the CROF device by the mobile phone to generate a result; and
(d) communicating the result from the mobile phone to a location remote from the mobile phone.

Also provided is a method for staining a tissue sample, comprising:
(a) obtaining a tissue sample;
(b) obtaining a stain liquid;
(c) obtaining a first plate and a second plate, wherein:
the plates are movable relative to each other into different configurations;
one or both plates are flexible;
each of the plates has, on its respective surface, a sample contact area for contacting a tissue sample or a IHC staining liquid;
the sample contact area in the first plate is smooth 5 and planner;
the sample contact area in the second plate comprise spacers that are fixed on the surface and have a predetermined substantially uniform height and a predetermined constant inter-spacer distance that is in the range of 7 µm to 200 µm;
(c) depositing the tissue sample and the stain liquid on the plates when the plates are configured in an open configuration, wherein the open configuration is a configuration in which the two plates are either partially or completely separated apart and the spacing between the plates is not regulated by the spacers; and
(d), after (c), using the two plates to compress at least part of the tissue sample and at least part of the staining liquid into a closed configuration;
wherein in the closed configuration: at least part of the sample is between the two plates and a layer of at least part of staining liquid is between the at least part of the sample and the second plate, wherein the thickness of the at least part of staining liquid layer is regulated by the plates, the sample, and the spacers, and has an average distance between the sample surface and the second plate surface is equal or less than 250 µm with a small variation.

All of the benefits and advantages (e.g., an accelerated reaction, faster results, etc.) of other embodiments may be applied to this device, system and method.

Further, all parameters described above in the context of other embodiments (e.g., the size, spacing and shape of the spacers, the flexibility of the spacers and plates, and how the device and system can be used, etc.) can be incorporated into IHC embodiments described in this section.

For example, in some embodiments, the spacers regulating the layer of uniform thickness (i.e., the spacers that are spacing the plates away from each other in the layer) have a "filling factor" of at least 1%, e.g., at least 2% or at least 5%, wherein the filling factor is the ratio of the spacer area that is in contact with the layer of uniform thickness to the total plate area that is in contact with the layer of uniform thickness. In some embodiments, for spacers regulating the layer of uniform thickness, the Young's modulus of the spacers times the filling factor of the spacers is equal or larger than 10 MPa, e.g., at least 15 MPa or at least 20 MPa, where the filling factor is the ratio of the spacer area that is in contact with the layer of uniform thickness to the total plate area that is in contact with the layer of uniform thickness. In some embodiments, the thickness of the flexible plate times the Young's modulus of the flexible plate is in the range of 60 to 550 GPa-um, e.g., 100 to 300 GPa-um. In some embodiments, for a flexible plate, the fourth power of the inter-spacer-distance (ISD) divided by the thickness of the flexible plate (h) and the Young's modulus (E) of the flexible plate, $ISD^4/(hE)$, is equal to 5 or less than $10^6$ $um^3/GPa$, e.g., less than $10^5$ $um^3/GPa$, less than $10^4$ $um^3/GPa$ or less than $10^3$ $um^3/GPa$.

In some embodiments, one or both plates comprise a location marker either on a surface of or inside the plate, that provide information of a location of the plate, e.g., a location that is going to be analyzed or a location onto which the section should be deposited. In some cases, one or both plates may comprise a scale marker, either on a surface of or inside the plate, that provides information of a lateral dimension of a structure of the section and/or the plate. In some embodiments, one or both plates comprise an imaging marker, either on surface of or inside the plate, that assists an imaging of the sample. For example, the imaging marker could help focus the imaging device or direct the imaging device to a location on the device. In some embodiments, the spacers can function as a location marker, a scale marker, an imaging marker, or any combination of thereof.

In some embodiments, the inter-spacer distance may substantially periodic. In some cases, the spacers may be in a regular pattern and the spacing between adjacent spacers may be approximately the same. In some embodiments, the spacers are pillars with a cross-sectional shape selected from round, polygonal, circular, square, rectangular, oval, elliptical, or any combination of the same and, in some embodiments, the spacers may have a substantially flat top surface, wherein, for each spacer, the ratio of the lateral dimension of the spacer to its height is at least 1. In some cases, the minimum lateral dimension of spacer is less than or substantially equal to the minimum dimension of an analyte in the sample. The minimum lateral dimension of spacer is in the range of 0.5 um to 100 um, e.g., in the range of 2 um to 50 um or 0.5 um to 10 um.

In some embodiments, the spacers have a pillar shape and the sidewall corners of the spacers have a round shape with a radius of curverture at least 1 um, e.g., at least 1.2 um, at least 1.5 um or at least 2.0 um. The spacers may have any convenient density, e.g., a density of at least $1000/mm^2$, e.g., a density of at least $1000/mm^2$, a density of at least $2000/mm^2$, a density of at least $5,000/mm^2$ or a density of at least $10,000/mm^2$.

In this device, at least one of the plates may be transparent, thereby allowing the assay to be read optically. Likewise, in this device, at least one of the plates may be made of a flexible polymer, thereby allowing the sample to be efficiently spread by compressing the plates together. In some embodiments, the pressure that compresses the plates, the spacers are not compressible and/or, independently, only one of the plates is flexible. The flexible plate may have a thickness in the range of 20 um to 200 um, e.g., 50 um to 150 um. As noted above, in the closed position, the thickness of the layer of uniform thickness may have a small variation.

In some embodiments, the variation may be less than 10%, less than 5% or less than 2%, meaning that the thickness of the area does not exceed +/−10%, +/−5% 5 or +/−2% of the average thickness.

In some embodiments, the first and second plates are connected and the device can be changed from the open configuration to the closed configuration by folding the plates. In some embodiments, the first and second plates can be connected by a hinge and the device can be changed from the open configuration to the closed configuration by folding the plates such that the device bends along the hinge. The hinge may be a separate material that is attached to the plates or, in some cases, the plates may be integral with the plates.

In some embodiments, the device may be capable of analyzing the section very rapidly. In some cases, the analysis may be done in 60 seconds or less, in 30 seconds, in 20 seconds or 15 less or in 10 seconds or less.

In some embodiments, the system may additionally comprise (d) a housing configured to hold the sample and to be mounted to the mobile communication device. The housing may comprise optics for facilitating the imaging and/or signal processing of the sample by the mobile communication device, and a mount configured to hold the optics on the mobile communication device. In some cases, an element of the optics of the device (e.g., a lens, filter, mirror, prism or a beamsplitter, may be movable) such that the sample may be imaged in at least two channels.

In some embodiments, the mobile communication device may be configured to communicate test results to a medical professional (e.g., an MD), a medical facility (e.g., a hospital or testing lab) or an insurance company. In addition, the mobile communication device may be configured to communicate information on the subject (e.g., the subject's age, gender, weight, address, name, prior test results, prior medical history, etc.) with the medical professional, medical facility or insurance company. In certain embodiments, the mobile communication device may be configured to receive a prescription, diagnosis or a recommendation from a medical professional. For example, in some embodiments the mobile communication device may send assay results to a remote location where a medical professional gives a diagnosis. The diagnosis may be communicated to the subject via the mobile communication device.

In some embodiments, the mobile communication device may contain hardware and software that allows it to (a) capture an image of the sample; (b) analyze a test location and a control location in in image; and (c) compare a value obtained from analysis of the test location to a threshold value that characterizes the rapid diagnostic test. In some cases, the mobile communication device communicates with the remote location via a wireless or cellular network.

In any embodiment, the mobile communication device may be a mobile phone.

The system may be used in a method that comprises (a) sample on the device of the system; (b) assaying the sample deposited on the device to generate a result; and (c) communicating the result from the mobile communication device to a location remote from the mobile communication device. The method may comprise analyzing the results at the remote location to provide an analyzed result; and communicating the analyzed result from the remote location to the mobile communication device. As noted above, the analysis may be done by a medical professional at a remote location. And, in some embodiments, the mobile communication device may receive a prescription, diagnosis or a recommendation from a medical professional at a remote location.

Also provided is a method for analyzing a tissue section. In some embodiments, this method may comprise obtaining a device as described above, depositing the section onto one or both pates of the device; placing the plates in a closed configuration and applying an external force over at least part of the plates; and analyzing the sample in the layer of uniform thickness while the plates are the closed configuration.

In some embodiments, this method may comprise:
(a) obtaining a tissue section;
(b) obtaining a first and second plates that are movable relative to each other into different configurations, wherein each plate has a sample contact surface that is substantially planar, one or both plates are flexible, and one or both of the plates comprise spacers that are fixed with a respective sample contacting surface, and wherein the spacers have:

i. a predetermined substantially uniform height, ii. a shape of pillar with substantially uniform cross-section and a flat top surface;

iii. a ratio of the width to the height equal or larger than one;

iv. a predetermined constant inter-spacer distance that is in the range of 10 μm to 200 μm;

v. a filling factor of equal to 1% or larger; and (c) depositing the section on one or both of the plates when the plates are configured in an open configuration, wherein the open configuration is a configuration in which 5 the two plates are either partially or completely separated apart and the spacing between the plates is not regulated by the spacers;

(d), after (c), using the two plates to compress at least part of the section into a layer of substantially uniform thickness that is confined by the sample contact surfaces of the plates, wherein the uniform thickness of the layer is regulated by the spacers and the plates, and has an average value in the range of 1.8 μm to 3 μm with a variation of less than 10%, wherein the compressing comprises:

bringing the two plates together; and conformable pressing, either in parallel or sequentially, an area of at least one of the plates to press the plates together to a closed configuration, wherein the conformable pressing generates a substantially uniform pressure on the plates over the at least part of the sample, and the pressing spreads the at least part of the sample laterally between the sample contact surfaces of the plates, and wherein the closed configuration is a configuration in which the spacing between the plates in the layer of uniform thickness region is regulated by the spacers; and (e) analyzing the section in the layer of uniform thickness while the plates are the closed configuration;

wherein the filling factor is the ratio of the spacer contact area to the total plate area;

wherein a conformable pressing is a method that makes the pressure applied over an area is substantially constant regardless the shape variation of the outer surfaces of the plates; and wherein the parallel pressing applies the pressures on the intended area at the same time, and a sequential pressing applies the pressure on a part of the intended area and gradually move to other area.

In some embodiments, this method may comprise: removing the external force after the plates are in the closed configuration; imaging the section in the layer of uniform thickness while the plates are the closed configuration. As noted above, in these embodiments, the inter-spacer distance may in the range of 20 um to 200 um or 5 um to 20 um. In these embodiments, the product of the filling factor and the Young's modulus of the spacer is 2 MPa or larger. In some embodiments, the surface variation is less than 30 nm.

In any of these embodiments, the imaging and counting may be done by: i. illuminating the section in the layer of uniform thickness; ii. taking one or more images of the section using a CCD or CMOS sensor.

In some embodiments, the external force may be provided by human 5 hand, e.g., by pressing down using a digit such as a thumb, or pinching between a thumb and another digit such as a forefinger on the same hand.

In some embodiments, one or more of the plates may comprises a dry reagent coated on one or both plates (e.g., a binding agent, a staining agent, a detection agent or an assay reactant).

In some embodiments, the layer of uniform thickness sample may a thickness uniformity of up to +/−5%, e.g., up to +/−2% or up to +/−1%.

In some embodiments, the spacers are pillars with a cross-sectional shape selected from round, polygonal, circular, square, rectangular, oval, elliptical, or any combination of the same.

F-6. Examples of Present Invention

FA1. A device for analyzing a tissue sample, comprising: a first plate, a second plate, and spacers, wherein: the plates are movable relative to each other into different configurations; one or both plates are flexible; each of the plates has, on its respective inner surface, a sample contact area for contacting a staining liquid and/or a tissue sample suspected of containing a target analyte; one or both of the plates comprise the spacers that are fixed with a respective plate; the spacers have a predetermined substantially uniform height and a predetermined inter-spacer distance; and at least one of the spacers is inside the sample contact area; wherein one of the configurations is an open configuration, in which: the two plates are partially or entirely separated apart, the spacing between the plates is not regulated by the spacers, and the staining liquid and the sample are deposited on one or both of the plates; wherein another of the configurations is a closed configuration, which is configured after the deposition of the staining liquid and the sample in the open configuration, and in the closed configuration: at least part of the sample is between the two plates and a layer of at least part of staining liquid is between the at least part of the sample and the second plate, wherein the thickness of the at least part of staining liquid layer is regulated by the plates, the sample, and the spacers, and has an average distance between the sample surface and the second plate surface is equal or less than 250 μm with a small variation.

FAA1. A device for analyzing a tissue sample, comprising: a first plate, a second plate, and spacers, wherein: the plates are movable relative to each other into different configurations; one or both plates are flexible; each of the plates has, on its respective inner surface, a sample contact area for contacting a transfer solution and/or a tissue sample suspected of containing a target analyte; one or both of the plates comprise stain agent that is dried on the respective sample contact area and configured to, upon contacting the transfer solution, dissolve in the transfer solution and stain the tissue sample; one or both of the plates comprise the spacers that are fixed with a respective plate; the spacers have a predetermined substantially uniform height and a predetermined inter-spacer distance; and at least one of the spacers is inside the sample contact area; wherein one of the configurations is an open configuration, in which: the two plates are partially or entirely separated apart, the spacing between the plates is not regulated by the spacers, and the staining liquid and the sample are deposited on one or both of the plates; wherein another of the configurations is a closed configuration, which is configured after the deposition of the staining liquid and the sample in the open configuration, and in the closed configuration: at least part of the sample is between the two plates and a layer of at least part of transfer solution is between the at least part of the sample and the second plate, wherein the thickness of the at least part of transfer solution layer is regulated by the plates, the sample, and the spacers, and has an average distance between the sample surface and the second plate surface is equal or less than 250 μm with a small variation.

FB1. A method for analyzing a tissue sample, comprising the steps of:
(a) obtaining a tissue sample suspected of containing a target analyte and a staining liquid;
(b) obtaining a first plate, a second plate, and spacers, wherein:
  i. the plates are movable relative to each other into different configurations;
  ii. one or both plates are flexible;
  iii. each of the plates has, on its respective inner surface, a sample contact area for contacting the staining liquid and/or the tissue sample;
  iv. one or both of the plates comprise the spacers that are fixed with a respective plate;
  v. the spacers have a predetermined substantially uniform height and a predetermined inter-spacer distance; and
  vi. at least one of the spacers is inside the sample contact area;
(c) depositing the staining liquid and the tissue sample on one or both of the plates when the plates are in an open configuration,
  wherein the open configuration is a configuration in which the two plates are partially or entirely separated apart, the spacing between the two plates is not regulated by the spacers, and the sample and the staining liquid are deposited on one or both of the plates;
(d) after (c), bringing the two plates together and pressing the plates into a closed configuration,
  wherein the pressing comprises conformable pressing, either in parallel or sequentially, an area of at least one of the plates to press the plates together to the closed configuration, wherein the conformable pressing generates a substantially uniform pressure on the plates over the at least part of the sample, and the pressing spreads the at least part of the sample laterally between the inner surfaces of the plates; and
  wherein another of the configurations is the closed configuration, which is configured after the deposition of the staining liquid and the sample in the open configuration, and in the closed configuration: at least part of the sample is between the two plates and a layer of at least part of staining liquid is between the at least part of the sample and the second plate, wherein the thickness of the at least part of staining liquid layer is regulated by the plates, the sample, and the spacers, and has an average distance between the sample surface and the second plate surface is equal or less than 250 µm with a small variation; and
(e) analyzing the target analyte when the plates are in the closed configuration.

FBB1. A method for analyzing a tissue sample, comprising the steps of:
(a) obtaining a tissue sample suspected of containing a target analyte and a transfer solution;
(b) obtaining a first plate, a second plate, and spacers, wherein:
  i. the plates are movable relative to each other into different configurations;
  ii. one or both plates are flexible;
  iii. each of the plates has, on its respective inner surface, a sample contact area for contacting a staining liquid and/or a tissue sample suspected of containing a target analyte;
  iv. one or both of the plates comprise stain agents that are coated on the respective sample contact area and configured to, upon contacting a transfer solution, dissolve in the transfer solution and stain the tissue sample;
  v. one or both of the plates comprise the spacers that are fixed with a respective plate;
  vi. the spacers have a predetermined substantially uniform height and a predetermined inter-spacer distance; and
  vii. at least one of the spacers is inside the sample contact area;
(c) depositing the staining liquid and the tissue sample on one or both of the plates when the plates are in an open configuration,
  wherein the open configuration is a configuration in which the two plates are partially or entirely separated apart, the spacing between the two plates is not regulated by the spacers, and the sample and the staining liquid are deposited on one or both of the plates;
(d) after (c), bringing the two plates together and pressing the plates into a closed configuration,
  wherein the pressing comprises conformable pressing, either in parallel or sequentially, an area of at least one of the plates to press the plates together to the closed configuration, wherein the conformable pressing generates a substantially uniform pressure on the plates over the at least part of the sample, and the pressing spreads the at least part of the sample laterally between the inner surfaces of the plates; and
  wherein another of the configurations is the closed configuration, which is configured after the deposition of the staining liquid and the sample in the open configuration, and in the closed configuration: at least part of the sample is between the two plates and a layer of at least part of staining liquid is between the at least part of the sample and the second plate, wherein the thickness of the at least part of staining liquid layer is regulated by the plates, the sample, and the spacers, and has an average distance between the sample surface and the second plate surface is equal or less than 250 µm with a small variation; and
(e) analyzing the target analyte when the plates are in the closed configuration.

FA2. The device of embodiment FA1, wherein one or both of the plates is configured such that the sample can dried thereon at the open configuration, and wherein the sample comprises bodily fluid selected from the group consisting of: amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, urine, and any combination thereof.

FAA2. The device of any prior embodiment, wherein the staining liquid has a viscosity in the range of 0.1 to 3.5 mPa S.

FA3. The device of any prior embodiment, wherein the sample contact area of one or both of the plates is configured such that the sample can dried thereon at the open configuration, and wherein the sample comprises blood smear and is dried on one or both plates.

FA4. The device of any prior embodiment, wherein the sample contact area of one or both of the plates is adhesive to the sample, and wherein the sample is a tissue section having a thickness in the range of 1-200 um.

FA5. The device of embodiment FA4, wherein the sample is paraffin-embedded.

FA6. The device of any of embodiment, wherein the sample is fixed.

FA7. The device of any prior embodiment, wherein the staining liquid comprises fixative capable of fixing the sample.

FA8. The device of any prior embodiment, wherein the staining liquid comprises blocking agents, wherein the blocking agents are configured to disable non-specific endogenous species in the sample to react with detection agents that are used to specifically label the target analyte.

FA9. The device of any prior embodiment, wherein the staining liquid comprises deparaffinizing agents capable of removing paraffin in the sample.

FA10. The device of any prior embodiment, wherein the staining liquid comprises permeabilizing agents capable of permeabilizing cells in the tissue sample that contain the target analyte.

FA11. The device of any prior embodiment, wherein the staining liquid comprises antigen retrieval agents capable of facilitating retrieval of antigen.

FA12. The device of any prior embodiment, wherein the staining liquid comprises detection agents that specifically label the target analyte in the sample.

FA13. The device of any prior embodiment, wherein the sample contact area of one or both plates comprise a storage site that contains blocking agents, wherein the blocking agents are configured to disable non-specific endogenous species in the sample to react with detection agents that are used to specifically label the target analyte.

FA14. The device of any prior embodiment, wherein the sample contact area of one or both plates comprise a storage site that contains deparaffinizing agents capable of removing paraffin in the sample.

FA15. The device of any prior embodiment, wherein the sample contact area of one or both plates comprise a storage site that contains permeabilizing agents capable of permeabilizing cells in the tissue sample that contain the target analyte.

FA16. The device of any prior embodiment, wherein the sample contact area of one or both plates comprise a storage site that contains antigen retrieval agents capable of facilitating retrieval of antigen.

FA17. The device of any prior embodiment, wherein the sample contact area of one or both plates comprise a storage site that contains detection agents that specifically label the target analyte in the sample.

FA18. The device of any prior embodiment, wherein the detection agent comprises dyes for a stain selected from the group consisting of: Acid fuchsin, Alcian blue 8 GX, Alizarin red S, Aniline blue WS, Auramine O, Azocarmine B, Azocarmine G, Azure A, Azure B, Azure C, Basic fuchsine, Bismarck brown Y, Brilliant cresyl blue, Brilliant green, Carmine, Chlorazol black E, Congo red, C.I. Cresyl violet, Crystal violet, Darrow red, Eosin B, Eosin Y, Erythrosin, Ethyl eosin, Ethyl green, Fast green F C F, Fluorescein Isothiocyanate, Giemsa Stain, Hematoxylin, Hematoxylin & Eosin, Indigo carmine, Janus green B, Jenner stain 1899, Light green SF, Malachite green, Martius yellow, Methyl orange, Methyl violet 2B, Methylene blue, Methylene blue, Methylene violet, (Bernthsen), Neutral red, Nigrosin, Nile blue A, Nuclear fast red, Oil Red, Orange G, Orange II, Orcein, Pararosaniline, Phloxin B, Protargol S, Pyronine B, Pyronine, Resazurin, Rose Bengal, Safranine O, Sudan black B, Sudan III, Sudan IV, Tetrachrome stain (MacNeal), Thionine, Toluidine blue, Weigert, Wright stain, and any combination thereof.

FA19. The device of any prior embodiment, wherein the detection agent comprises antibodies configured to specifically bind to protein analyte in the sample.

FA20. The device of any prior embodiment, wherein the detection agent comprises oligonucleotide probes configured to specifically bind to DNA and/or RNA in the sample.

FA21. The device of any prior embodiment, wherein the detection agent is labeled with a reporter molecule, wherein the reporter molecule is configured to provide a detectable signal to be read and analyzed.

FA22. The device of embodiment FA21, wherein the signal is selected from the group consisting of:
i. luminescence selected from photoluminescence, electroluminescence, and electrochemiluminescence;
ii. light absorption, reflection, transmission, diffraction, scattering, or diffusion;
iii. surface Raman scattering;
iv. electrical impedance selected from resistance, capacitance, and inductance;
v. magnetic relaxivity; and
vi. any combination of i-v.

FA23. The device of any prior embodiment, wherein the sample contact area of one or both of the plates comprise a binding site that contains capture agents, wherein the capture agents are configured to bind to the target analyte on the surface of cells in the sample and immobilize the cells.

FB2. The method of embodiment F131, wherein the depositing step (c) comprises depositing and drying the sample on one or both of the plates before depositing the remaining of the staining liquid on top of the dried sample, and wherein the sample comprises bodily fluid selected from the group consisting of: amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, urine, and any combination thereof.

FBB2. The method of any prior embodiment, wherein the staining liquid has a viscosity in the range of 0.1 to 3.5 mPa S.

FB3. The method of any prior embodiment, wherein the depositing step (c) comprises depositing and drying the sample on one or both of the plates before depositing the remaining of the staining liquid on top of the dried sample, and wherein the sample comprises blood smear and is dried on one or both plates.

FB4. The method of any prior embodiment, wherein the depositing step (c) comprises depositing and attaching the sample to one or both of the plates before depositing the staining liquid on top of the sample, wherein the sample contact area of one or both of the plates is adhesive to the sample, and wherein the sample is a tissue section having a thickness in the range of 1-200 □m.

FB5. The device of embodiment FA4, wherein the sample is paraffin-embedded.

FB6. The method of any of embodiment, wherein the sample is fixed.

FB7. The method of any prior embodiment, wherein the staining liquid comprises fixative capable of fixing the sample.

FB8. The method of any prior embodiment, wherein the staining liquid comprises blocking agents, wherein the blocking agents are configured to disable non-specific endogenous species in the sample to react with detection agents that are used to specifically label the target analyte.

FB9. The method of any prior embodiment, wherein the staining liquid comprises deparaffinizing agents capable of removing paraffin in the sample.

B10. The method of any prior embodiment, wherein the staining liquid comprises permeabilizing agents capable of permeabilizing cells in the tissue sample that contain the target analyte.

FB11. The method of any prior embodiment, wherein the staining liquid comprises antigen retrieval agents capable of facilitating retrieval of antigen.

FB12. The method of any prior embodiment, wherein the staining liquid comprises detection agents that specifically label the target analyte in the sample.

FB13. The method of any prior embodiment, wherein the sample contact area of one or both plates comprise a storage site that contains blocking agents, wherein the blocking agents are configured to disable non-specific endogenous species in the sample to react with detection agents that are used to specifically label the target analyte.

FB14. The method of any prior embodiment, wherein the sample contact area of one or both plates comprise a storage site that contains deparaffinizing agents capable of removing paraffin in the sample.

FB15. The method of any prior embodiment, wherein the sample contact area of one or both plates comprise a storage site that contains permeabilizing agents capable of permeabilizing cells in the tissue sample that contain the target analyte.

FB16. The method of any prior embodiment, wherein the sample contact area of one or both plates comprise a storage site that contains antigen retrieval agents capable of facilitating retrieval of antigen.

FB17. The method of any prior embodiment, wherein the sample contact area of one or both plates comprise a storage site that contains detection agents that specifically label the target analyte in the sample.

FB18. The method of any prior embodiment, wherein the detection agent comprises dyes for a stain selected from the group consisting of: Acid fuchsin, Alcian blue 8 GX, Alizarin red S, Aniline blue WS, Auramine O, Azocarmine B, Azocarmine G, Azure A, Azure B, Azure C, Basic fuchsine, Bismarck brown Y, Brilliant cresyl blue, Brilliant green, Carmine, Chlorazol black E, Congo red, C.I. Cresyl violet, Crystal violet, Darrow red, Eosin B, Eosin Y, Erythrosin, Ethyl eosin, Ethyl green, Fast green F C F, Fluorescein Isothiocyanate, Giemsa Stain, Hematoxylin, Hematoxylin & Eosin, Indigo carmine, Janus green B, Jenner stain 1899, Light green SF, Malachite green, Martius yellow, Methyl orange, Methyl violet 2B, Methylene blue, Methylene blue, Methylene violet, (Bernthsen), Neutral red, Nigrosin, Nile blue A, Nuclear fast red, Oil Red, Orange G, Orange II, Orcein, Pararosaniline, Phloxin B, Protargol S, Pyronine B, Pyronine, Resazurin, Rose Bengal, Safranine O, Sudan black B, Sudan III, Sudan IV, Tetrachrome stain (MacNeal), Thionine, Toluidine blue, Weigert, Wright stain, and any combination thereof.

FB19. The method of any prior embodiment, wherein the detection agent comprises antibodies configured to specifically bind to protein analyte in the sample.

FB20. The method of any prior embodiment, wherein the detection agent comprises oligonucleotide probes configured to specifically bind to DNA and/or RNA in the sample.

FB21. The method of any prior embodiment, wherein the detection agent is labeled with a reporter molecule, wherein the reporter molecule is configured to provide a detectable signal to be read and analyzed.

FB22. The device of embodiment FB21, wherein the signal is selected from the group consisting of:
  i. luminescence selected from photoluminescence, electroluminescence, and electrochemiluminescence;
  ii. light absorption, reflection, transmission, diffraction, scattering, or diffusion;
  iii. surface Raman scattering;
  iv. electrical impedance selected from resistance, capacitance, and inductance;
  v. magnetic relaxivity; and
  vi. any combination of i-v.

FB23. The method of any prior embodiment, wherein the sample contact area of one or both of the plates comprise a binding site that contains capture agents, wherein the capture agents are configured to bind to the target analyte on the surface of cells in the sample and immobilize the cells.

FB24. The method of any prior embodiment, before step (e), further comprising: incubating the sample at the closed configuration for a period of time that is longer than the time it takes for the detection agent to diffuse across the layer of uniform thickness and the sample.

FB25. The method of any prior embodiment, before step (e), further comprising: incubating the sample at the closed configuration at a predetermined temperature in the range of 30-75° C.

FB26. The method of any prior embodiment, wherein the staining liquid comprises the transfer solution.

G. Dual Lens Imaging System

But nowadays dual cameras are more and more common on state-of-art smartphones, which offers more possibilities of smartphone based imaging. By using two cameras, two different areas of the sample can be imaged at the same time, which is equivalent to a much larger field of view. And what's more, each camera can be used to do microscopy imaging at a different resolution. For example, one camera can do microscopy with lower resolution but larger field of view to image large objects in sample and the other camera can do microscopy with higher resolution but smaller field of view to image small objects. This is useful when the sample for imaging has mixed small objects and large objects. Hence, it is highly desirable to provide the users the smartphone imaging system based on dual cameras.

Dual Camera Imaging System

FIG. 19-A is the schematic illustration of the dual camera imaging system. The dual camera imaging system comprises a mobile computing device (e.g. smartphone) having two built-in camera modules, two external lenses, a QMAX device and light source. Each camera module has an internal lens and an image sensor. The QMAX device is located under the two camera modules. Each external lens is placed between QMAX device and its corresponding internal lens at the appropriate height where the sample in QMAX device can be clearly focused on the image sensor. Each external lens is aligned with its corresponding internal lens. The light captured by the imaging sensor can be refracted from the specimen, emitted from the specimen, etc. The light captured by the imaging sensor covers visible wavelength and can illuminate on the sample in QMAX device from back or top side in a normal or oblique incidence angle.

Dual Camera Imaging System for Large FOV Imaging

One embodiment is that the dual camera imaging system is used for large FOV imaging. In this embodiment, the images taken by both camera have the same scale or optical magnification. To achieve this, the focal length of external lens $1f_{E1}$, the focal length of internal lens $1f_{N1}$, the focal length of external lens $2f_{E2}$ and the focal length of internal lens $2f_{N2}$ satisfy the relationship:

$$\frac{fE1}{fN1} = \frac{fE2}{fN2}.$$

The distance between two cameras is chosen to an appropriate value so that the FOVs of both cameras have overlap. As shown in FIG. 19-B, the letter "A" represents the sample, due to the overlap between the FOVs of two cameras, some part of the letter "A" exist in both the FOV of camera 1 and FOV of camera 2.

A further image processing step is used to merge the two images into one large image by matching the same feature shared by the two images taken by camera 1 and camera 2.

Dual Camera Imaging System for Dual Resolution Imaging

The lens-based imaging system has the intrinsic drawback that it has the trade-off between the size of FOV and resolution. To achieve large FOV, the resolution of the imaging system need to be sacrificed. This problem is more concerned when the sample has mixed small and large objects with significant different size scale. In order to image enough number of large objects the FOV need to be large enough, but that will lose the resolution to get the details of the small objects. To solve this problem, in this embodiment, the dual camera imaging system is used for achieve dual resolution imaging on a same sample, in which camera 1 (or 2) is used for low resolution and large FOV imaging and camera 2 (or 1) is used for high resolution and small FOV imaging.

The resolution of the imaging system depends on the optical magnification and the optical magnification is equal to the ratio of the focal length of the external lens to the focal length of the internal length. For example, in this embodiment, camera 1 is used for low resolution imaging and camera 2 is used for high resolution imaging, then the focal length of external lens $1f_{E1}$, the focal length of internal lens $1f_{N1}$, the focal length of external lens $2f_{E2}$ and the focal length of internal lens $2f_{N2}$ satisfy the relationship:

$$\frac{fE1}{fN1} < \frac{fE2}{fN2}.$$

The FOVs of both cameras can have overlap or no overlap.

As shown in FIG. 19-C, the sample image taken by camera 1 covers larger FOV and contains more objects in a single FOV but cannot resolve the detail of the small objects. And the image taken by camera 2 covers a relatively small FOV and contains fewer objects in a single FOV but has higher resolution that can resolve the details in the small objects.

Examples of Present Invention

A1. A dual lens imaging device, comprising: a first external lens, a second external lens, a housing unit, and a card unit, wherein: the housing unit is configured to accommodate the first and second external lenses and the card unit, and to connect the dual length imaging device with a mobile device; the first and the second external lenses are configured to respectively align with two internal lenses in the mobile device; and the card unit is configured to accommodate a specimen card, which contains a sample, wherein the card unit is positioned between the external lenses and the internal lenses; wherein the external lenses are configured to focus illuminating light that is refracted or emitted from the specimen card onto image sensors in the mobile device, allowing the image sensors to capture images of the sample.

B1. A dual lens imaging system, comprising: the dual lens imaging device of embodiment A1, the mobile device, which comprises hardware and software to capture and process images of the sample through the dual lens imaging device.

C1. The device or system of any prior embodiments, wherein the specimen card is a QMAX card.

C2. The device or system of any prior embodiments, wherein the mobile device is a mobile communication device.

C3. The device or system of any prior embodiments, wherein mobile device is a smart phone.

C4. The device or system of any prior embodiments, wherein the mobile device comprises a light source, which provides light to the specimen card.

C5. The device or system of any prior embodiments, wherein the two external lenses are configured to capture overlapping images that are at least partly overlapping.

C6. The device or system or embodiment C5, wherein the overlapping images have the same resolution.

C7. The device or system of embodiment C6, wherein the software is configured to process the overlapping images to generate a combined image of the sample.

C8. The device or system of embodiment C5, wherein the overlapping images have the different resolutions.

C9. The device or system of embodiment C8, wherein the software is configured to process the overlapping images illustrate specific portions of the image having lower resolution.

C10. The device or system of any prior embodiment, wherein the two external lenses are configured to image two different locations of a sample area of the Q-Card.

C11. The device or system of any prior embodiment, wherein the two external lenses are configured to have different size of FoV (field of view from each other).

C12. The device or system of any prior embodiment, wherein the two external lenses are configured to have different size of FoV (field of view from each other), and wherein the ratio of the two different of FoV is 1.1, 1.2, 1.5, 2, 5, 10, 15, 20, 30, 50, 100, 200, 1000, or in a range of any value of the two. A preferred ratio is 1.2, 1.5, 2, 5, 10, 20, or in a range of any value of the two.

C13. The device or system of any prior embodiment, wherein overlap of FoV of the two external lenses are configured to be around 1%, 5%, 10%, 20%, 50%, 60%, 70%, 80%, 90%, or a range between any two of these values.

C14. The device or system of any prior embodiment, wherein the two external lenses are optically coupled with different optical filters and/or polarizers.

Other Embodiments

An optical adaptor for imaging an sample using a handheld imaging device that has a light source, a single camera, and a computer processor, comprising: an enclosure; a cavity within the enclosure; and a lever within the cavity, wherein the lever comprises at least one optical element and is configured to be moveable between a first position and a second position, wherein (i) in the first position, said imaging device is capable of imaging a sample in a bright field mode, and (ii) in the second position, said imaging device is capable of imaging the sample in a fluorescence excitation mode.

An optical adaptor for imaging an sample using a hand-held imaging device that has a light source, a single camera, and a computer processor, comprising: an enclosure; a lens arranged to provide a field of view for the camera; a cavity within the enclosure for receiving the sample and positioning the sample within the field of view of the camera, wherein the lens is positioned to receive light refracted by or emitted by the sample when in the field of view of the camera; and a lever within the cavity, wherein the lever comprises at least one optical element and is configured to be moveable between a first position and a second position, wherein (i) in the first position, said imaging device is capable of imaging a sample in a bright field mode, and (ii) in the second position, said imaging device is capable of imaging the sample in a fluorescence excitation mode.

An optical adaptor for imaging an sample using a hand-held imaging device that has a light source, a single camera, and a computer processor, comprising: an enclosure; a cavity within the enclosure for receiving the sample and positioning the sample within a field of view of the camera; and a lever within the cavity, wherein the lever comprises at least one optical element and is configured to be moveable between a first position and a second position, wherein (i) in the first position, said imaging device is capable of imaging a sample in a bright field mode, and (ii) in the second position, said imaging device is capable of imaging the sample in a fluorescence excitation mode, and wherein the lever comprises a first planar region extending along a first plane and a second planar region laterally displaced along a first direction from the first planar region and extending along a second plane, the first plane being disposed at a different height along a second direction from the second plane, the second direction being orthogonal to the first direction.

An optical adaptor for imaging an sample using a hand-held imaging device that has a light source, a single camera, and a computer processor, comprising: an enclosure; a cavity within the enclosure for receiving the sample and positioning the sample within a field of view of the camera; and a lever within the cavity, wherein the lever comprises at least one optical element and is configured to be moveable between a first position and a second position, wherein (i) in the first position, said imaging device is capable of imaging a sample in a bright field mode, and (ii) in the second position, said imaging device is capable of imaging the sample in a fluorescence excitation mode, and wherein the lever comprises a first planar region extending along a first plane and a second planar region laterally displaced along a first direction from the first planar region and extending along a second plane, the first plane being disposed at a different height along a second direction from the second plane, the second direction being orthogonal to the first direction, and wherein the first planar region comprises at least one optical element, and the second planar region comprises at least one optical element.

An optical adaptor for imaging an sample using a hand-held imaging device that has a light source, a single camera, and a computer processor, comprising: an enclosure; a cavity within the enclosure; and a lever within the cavity, wherein the lever comprises at least one optical element and is configured to be moveable between at least three different positions, wherein (i) in a first position, said imaging device is capable of imaging a sample in a bright field mode, (ii) in a second position, said imaging device is capable of imaging the sample in a fluorescence excitation mode, and (iii) in a third position, said imaging device is capable of measuring optical absorption of the sample.

An optical adaptor for imaging an sample using a hand-held imaging device that has a light source, a single camera, and a computer processor, comprising: an enclosure; a lens configured to provide a field of view for the camera; a cavity within the enclosure for receiving the sample and positioning the sample within the field of view of the camera; an aperture within the enclosure, wherein the aperture is arranged to receive source light from the light source for illuminating the sample; and a lever within the cavity, wherein the lever comprises at least one optical element and is configured to be moveable between a first position and a second position, wherein (i) in a first position, said imaging device is capable of imaging a sample in a bright field mode, (ii) in a second position, said imaging device is capable of imaging the sample in a fluorescence excitation mode, wherein in the fluorescence excitation mode, the lens is arranged to receive light emitted by the sample when the sample is illuminated by the source light.

An optical adaptor for imaging an sample using a smart phone that has a light source, a single camera, and a computer processor, comprising: an enclosure; a lens configured to provide a field of view for the camera; a cavity within the enclosure for receiving the sample and positioning the sample within the field of view of the camera; and a lever within the cavity, wherein the lever comprises at least one optical element and is configured to be moveable between a first position and a second position, wherein (i) in a first position, said imaging device is capable of imaging a sample in a bright field mode, and (ii) in a second position, said imaging device is capable of imaging the sample in a fluorescence excitation mode.

An optical assembly attachable to a hand-held electronic device having a light source, a camera, and a computer processor, wherein the optical assembly is configured to enable microscopic imaging of a sample by the camera with illumination of the sample by light from the light source, the optical assembly comprising: an enclosure; a cavity within the enclosure; a lens configured to provide a microscopic field of view for the camera; and moveable arm within the cavity, wherein the moveable arm is configurable to switch between a first position and a second position, wherein when the moveable arm is in the first position, the optical assembly is in a bright field mode, and when the moveable arm is in the second position, the optical assembly is in a fluorescence excitation mode.

The optical assembly of any embodiments, wherein the enclosure comprises: a sample receptacle region within the cavity; and a slot on a side of the enclosure, wherein the slot is arranged to receive a sample substrate within the sample receptacle region and position the sample within the field of view of the camera.

The optical assembly of embodiments, further comprising a first set of one or more optical elements arranged to receive light entering from a first aperture in the enclosure corresponding to the light source and to redirect the light entering from the first aperture along a first pathway toward a second aperture in the enclosure corresponding to the camera to provide bright field illumination of the sample when the moveable arm is in the first position.

The optical assembly of embodiments, wherein the first set of one or more optical elements comprises a first right angle mirror and a second right angle mirror, wherein the first right angle mirror and the second right angle mirror are in the first pathway and are arranged to reflect the light from the light source to be normally incident into the camera, The optical assembly of embodiments, wherein the light source is a point source to achieve interference imaging of transparent samples via illuminating the sample by a same wavefront.

The optical assembly of embodiments, further comprising a second set of one or more optical elements mechanically coupled to the movable arm and arranged to receive light entering from the first aperture and redirect the light entering from the first aperture along a second pathway to obliquely illuminate the sample to provide fluorescence illumination of the sample when the moveable arm is in the second position, The optical assembly of embodiments, wherein the oblique angle is larger than a collecting angle of the lens configured to provide the field of view of the camera.

The optical assembly of embodiments, wherein the second set of one or more optical elements includes a mirror and an optical absorber, wherein the mirror reflects light to obliquely illuminate the sample and the optical absorber absorbs extraneous light from the first aperture that would otherwise pass through the second aperture of the enclosure and overwhelm the camera in the fluorescence excitation mode.

The optical assembly of embodiments, wherein the absorber absorbs light that is not incident on the mirror after going through the first aperture, wherein the light absorber is a thin-film light absorber.

The optical assembly of embodiments, further comprising a third set of one or more optical elements arranged to receive light entering from the first aperture and redirect the light entering into the second aperture in the movable arm and going along the first pathway toward a light diffuser on the movable arm to illuminate the sample in normal direction to measure the optical absorption of the sample.

The optical assembly of embodiments, wherein the third set of one or more optical elements includes a light diffuser, a first right angle mirror and a second right angle mirror, wherein the first right angle mirror and the second right angle mirror are in the first pathway and are arranged to reflect the light from the light source toward the light diffuser and then to be normally incident into the camera;

The optical assembly of embodiments, wherein the light diffuser is a semi-opaque diffuser with opacity in the range of 10% to 90%.

The optical assembly of embodiments, further comprising a rubber door to cover the sample receptacle to prevent ambient light from entering into the cavity.

The optical assembly of any of the preceding any embodiments, wherein the light source and the camera are positioned on the same side of the hand-held electronic device at a fixed distance to one another.

A system comprising: the optical assembly of any of the preceding any embodiments, and a mobile phone attachment comprising a first side configured to couple to the optical assembly and a second opposite side configured to couple to the hand-held electronic device, wherein the hand-held electronic device is a mobile phone.

The system of any embodiments, wherein the mobile phone attachment is exchangeable to provide attachment to different sized mobile phones.

The system of any embodiments, wherein a size of the mobile phone attachment is adjustable.

An optical assembly for a hand-held mobile electronic device, the optical assembly comprising: an enclosure; a cavity within the enclosure; a plurality of optical elements within the cavity, wherein the plurality of optical elements are arranged to receive light entering from a first aperture in the enclosure and to redirect the light entering from the first aperture along a first pathway toward a second aperture in the enclosure; a moveable arm configurable in at least two different positions within the enclosure, a moveable arm configurable in at least three different positions within the enclosure, wherein the moveable arm comprises a light reflector portion to reflect light, wherein the moveable arm comprise a light diffuser to homogenize the light and break the coherence of the light, wherein the moveable arm comprise an aperture aligned with the entrance aperture in the enclosure, wherein, when the moveable arm is in a first position within the enclosure, the light reflector portion is positioned between an entrance aperture in the enclosure and the plurality of optical elements such that the light reflector portion blocks the light entering from the first opening from being incident on the plurality of optical elements, and wherein, when the moveable arm is in a second position within the enclosure, the light entering from the first opening is incident on the plurality of optical elements, and wherein when the moveable arm is in a third position within the enclosure, the light entering from the first opening goes through an aperture on the moveable arm and then is incident on the light diffuser;

The optical assembly of any embodiments, comprising a slot on a side of the enclosure, wherein the slot is arranged to receive a sample substrate such that: when the sample substrate is fully inserted within the slot and the moveable arm is in the second position within the enclosure, the first pathway intersects the sample substrate; and when the sample substrate is fully inserted within the slot and moveable arm is in the first position within the enclosure, light reflected by the light reflector portion is redirected to the sample substrate; and when the sample substrate is fully inserted within the slot and moveable arm is in the third position within the enclosure, light goes along the first pathway toward a light diffuser and then illuminate on the sample substrate.

The optical assembly of any embodiments, wherein the moveable arm comprises a light absorber portion to absorb light that is not incident on the mirror after going through the first aperture.

The optical assembly of any embodiments, wherein the moveable arm comprises: a first receptacle positioned above the light reflector portion; and an optical filter seated in the receptacle; and a second receptacle positioned above the aperture portion; and a optical filter seated in the receptacle.

The optical assembly of any embodiments, wherein, when the moveable arm is in the first position, the optical filter seated in the receptacle is positioned to receive light entering from the first aperture in the enclosure; and when the moveable arm is in the third position, the optical filter seated in the receptacle is positioned to receive light entering from the first aperture in the enclosure.

The optical assembly of any embodiments, wherein, when the moveable arm is in the first position, the optical filter seated in the receptacle overlaps a region in which a portion of the sample substrate is located when the sample substrate is fully inserted within the slot.

A system comprising: the optical assembly of any embodiments; and a mobile phone attachment comprising a first side configured to couple to the optical assembly and comprising a second opposite side configured to couple to a mobile phone, wherein a size of the mobile phone attachment is adjustable.

An optical assembly attachable to a hand-held electronic device having a light source, a camera, and a computer processor, wherein the optical assembly is configured to enable microscopic imaging of a sample by the camera with illumination of the sample by light from the light source, the optical assembly comprising: a lens configured to provide a microscopic field of view for the camera; a receptacle for receiving the sample and positioning the sample within the microscopic field of view; and an optical fiber configured to receive the light from the light source and to illuminate the receptacle.

The optical assembly of any embodiments wherein, when the optical assembly is attached to the hand-held electronic device, the lens and the camera define an optical axis, and wherein the optical fiber circumscribes the optical axis.

The optical assembly of any embodiments wherein the optical fiber is ring-shaped.

The optical assembly of any embodiments wherein the optical fiber is a side-emitting fiber.

The optical assembly of any embodiments wherein the optical assembly comprises an enclosure defining the receptacle, wherein the ring-shaped fiber sits in a groove of the enclosure, wherein the enclosure comprises an aperture configured to align with the light source and both end faces of the ring-shape fiber to receive light from the light source.

The optical assembly of any embodiments, wherein the light emits from the side of the ring-shape fiber to illuminate the sample area right under the camera in the optical axis.

The optical assembly of any embodiments, wherein the optical assembly comprises an enclosure defining the receptacle, wherein the enclosure comprises a first aperture configured to align with the light source, and a first end face of the optical fiber is positioned in the first aperture to receive light from the light source.

The optical assembly of any embodiments wherein the enclosure comprises a second aperture configured to align with the camera, and wherein the optical fiber comprises a first end positioned in the first aperture and comprises a second end positioned in the second aperture.

The optical assembly of any embodiments wherein at least one of the first end face of the optical fiber and a second end face of the optical fiber is matted.

The optical assembly of any embodiments wherein when the optical assembly is attached to the hand-held electronic device, the optical fiber is tilted with respect to the light source, and wherein a second end face of the optical fiber is arranged to illuminate a region of the sample located directly beneath the lens.

The optical assembly of any embodiments wherein the optical assembly comprises an enclosure defining the receptacle, the enclosure comprises a groove, and the optical fiber is arranged in the groove.

An optical assembly attachable to a hand-held electronic device having a light source, a camera, and a computer processor, wherein the optical assembly is configured to enable microscopic fluorescence imaging of a sample by the camera with illumination of the sample by light from the light source, the optical assembly comprising: a lens configured to provide a microscopic field of view for the camera; a receptacle for receiving the sample and positioning the sample within the microscopic field of view; a mirror off-set from an optical axis of the lens and positioned to reflect light from the light source and illuminate the sample over a range of oblique angles with respect to the optical axis; and a wavelength filter positioned between the sample and the camera to pass fluorescence emitted by the sample in response to the oblique illumination.

The optical assembly of any embodiments wherein the lens is positioned on a front-side of the sample and the mirror is positioned to obliquely illuminate the sample from a back-side of the sample, wherein the oblique angle is larger than a collecting angle of the lens.

The optical assembly of any embodiments further comprising an optical absorber positioned on the optical axis adjacent the mirror to absorb light from the light source not reflected by the mirror.

The optical assembly of any embodiments wherein the mirror and the optical absorber are mounted on a common structure and tilted with respect to one another.

The optical assembly of any embodiments, further comprising a second wavelength filter positioned in a path of the illumination light between the light source and the mirror to select certain wavelengths for illuminating the sample.

The optical assembly of any of the preceding any embodiments, wherein the sample is supported by a sample holder comprising a planar structure, and wherein the receptacle is configured to position the planar structure to extend partially into a path of illumination light from the light source to couple illumination light into the planar structure.

The optical assembly of any embodiments 6, wherein the receptacle is configured to position the planar structure such that the path of illumination light is incident on an edge of the planar structure, wherein the edge extends along a plane that is normal to a plane comprising the field of view.

The optical assembly of any embodiments wherein the mirror is arranged to reflect the light to partially obliquely illuminate the sample from a back side of the planar structure and to partially illuminate an edge of the planar structure to couple illumination light into the planar structure.

The optical assembly of any embodiments further comprising a rubber door to cover the sample receptacle to prevent ambient light from entering the optical assembly and entering the camera. The optical assembly of any embodiments, wherein the planar structure is configured to waveguide the coupled illumination light to the sample to illuminate the sample and cause the sample to emit fluorescence.

The optical assembly of any embodiments further comprising the sample holder,

The optical assembly of any embodiments 6, wherein the sample is a liquid sample and the sample holder comprises first and second plates sandwiching the liquid sample.

The optical assembly of any of the preceding any embodiments, wherein the lens, the receptacle, the mirror, and the wavelength filter are supported in a common optical box and further comprising an exchangeable holder frame for attaching the optical box to the hand-held electronic device.

The optical assembly of any embodiments, wherein the light source and the camera are positioned on the same side of the hand-held electronic device and at fixed distance to one another.

The optical assembly of any embodiments, wherein the hand-held electronic device is a smart phone.

An apparatus comprising the optical assembly of any of the preceding any embodiments and the hand-held electronic device.

An optical assembly attachable to a hand-held electronic device having a light source, a camera, and a computer processor, the optical assembly configured to enable microscopic fluorescence imaging of a sample by the camera with illumination of the sample by light from the light source, the optical assembly comprising: a lens configured to provide a microscopic field of view for the camera; a receptacle for receiving the sample and positioning the sample within the microscopic field of view, wherein the sample is supported by a sample holder comprising a planar structure, and wherein the receptacle is configured to position the planar structure to extend partially into a path of illumination light from the light source to couple illumination light into the planar structure and cause the sample to emit fluorescence; and a wavelength filter positioned between the sample and the camera to pass fluorescence emitted by the sample in response to the illumination.

The optical assembly of any embodiments further comprising a rubber door to cover the sample receptacle to prevent ambient light entering the optical assembly through the receptacle.

The optical assembly of any embodiments wherein the planar structure is configured to waveguide the coupled illumination light to the sample to illuminate the sample and cause the sample to emit the fluorescence.

The optical assembly of any embodiments further comprising the sample holder,

The optical assembly of any embodiments wherein the sample is a liquid sample and the sample holder comprises first and second plates sandwiching the liquid sample.

The optical assembly of any embodiments, further comprising a second wavelength filter positioned in the path of the illumination light between the light source and the portion of the sample holder partially extending into the path of the light.

The optical assembly of any of the preceding any embodiments, wherein the lens, the receptacle, and the wavelength filter are supported in a common optical box and further comprising an exchangeable holder frame for attaching the optical box to the hand-held electronic device.

The optical assembly of any embodiments wherein the light source and the camera are positioned on the same side of the hand-held electronic device at a fixed distance to one another.

The optical assembly of any embodiments, wherein the hand-held electronic device is a smart phone.

An apparatus comprising the optical assembly of any of the preceding any embodiments and the hand-held electronic device.

An optical assembly attachable to a hand-held electronic device having a light source, a first camera module, a second camera module, and a computer processor, wherein the optical assembly is configured to enable microscopic imaging of a sample by the first camera and by the second camera with illumination of the sample by light from the light source, the optical assembly comprising: a first assembly lens configured to provide a first microscopic field of view for the first camera module; a second assembly lens configured to provide a second microscopic field of view for the second camera module; and a receptacle for receiving the sample and positioning the sample within the first microscopic field of view and within the second microscopic field of view.

The optical assembly of any embodiments, wherein the first camera module comprises a first internal lens and the second camera module comprises a second internal lens, wherein a first optical magnification provided by the first assembly lens and the first internal lens is the same as a second optical magnification provided by the second assembly lens and the second internal lens.

The optical assembly of any embodiments, wherein a first ratio of a focal length of the first assembly lens to a focal length of the first internal lens is equal to a second ratio of a focal length of the second assembly lens to a focal length of the second internal lens.

The optical assembly of any embodiments, wherein a first image resolution provided by the first camera module and the first assembly lens is the same as a second image resolution provided by the second camera module and the second assembly lens.

The optical assembly of any embodiments, wherein the first camera module comprises a first internal lens and the second camera module comprises a second internal lens, wherein a first optical magnification provided by the first assembly lens and the first internal lens is different from a second optical magnification provided by the second assembly lens and the second internal lens.

The optical assembly of any embodiments, wherein a first ratio of a focal length of the first assembly lens to a focal length of the first internal lens is less than a second ratio of a focal length of the second assembly lens to a focal length of the second internal lens.

The optical assembly of any embodiments, wherein a first image resolution provided by the first camera module and the first assembly lens is less than a second image resolution provided by the second camera module and the second assembly lens.

The optical assembly of any of the preceding any embodiments, wherein the first microscopic field of view overlaps with the second microscopic field of view.

The optical assembly of any embodiments, wherein an amount of overlap of the first microscopic field of view with the second microscopic field of view is between 1% and 90%.

The optical assembly of any of any embodiments, wherein the first microscopic field of view does not overlap with the second microscopic field of view.

The optical assembly of any of the preceding any embodiments, wherein each of the first assembly lens and the second assembly lens is arranged to receive light scattered by or emitted by the sample.

The optical assembly of any of the preceding any embodiments, wherein the first microscopic field of view is less than the second microscopic field of view.

The optical assembly of any of the preceding any embodiments, wherein an angular field of view of the first assembly lens is less than an angular field of view of the second assembly lens.

The optical assembly of any embodiments, wherein a ratio of the angular field of view of the first assembly lens to the angular field of the second assembly lens is between 1.1 and 1000.

The optical assembly of any of the preceding any embodiments, comprising: a first optical filter arranged in a first illumination path to or from the first assembly lens; and a second optical filter arranged in a second illumination path to or from the second assembly lens.

The optical assembly of any embodiments, wherein the first optical filter is configured to filter a first range of wavelengths, the second optical filter is configured to filter a second range of wavelengths, and the first range of wavelengths is different from the second range of wavelengths.

The optical assembly of any of the preceding any embodiments, comprising: a first polarizer arranged in a first illumination path to or from the first assembly lens; and a second polarizer arranged in a second illumination path to or from the second assembly lens.

The optical assembly of any embodiments, wherein the first polarizer and the second polarizer have different polarization dependent light transmission and blocking properties.

An apparatus comprising the optical assembly of any of the preceding any embodiments and the hand-held electronic device.

The apparatus of any embodiments, wherein the hand-held electronic device is a smart phone.

The apparatus of any embodiments, wherein the hand-held electronic device is configured to computationally merge a first image obtained from the first camera module with a second image obtained from the second camera module.

An imaging method comprising: compressing a sample between two plates, wherein the two plates are separated from one another by an array of spacers, at least one of which has a reference mark; acquiring multiple images of the sample using an imaging system comprising a camera and at least one lens, wherein each image corresponds to a different object plane within a thickness of the sample; computationally analyzing each image to determine information about the corresponding object plane based on one or more of the reference marks; and computationally constructing a three-dimensional image of the sample based on the multiple images and the information about the corresponding object planes.

The imaging method of any embodiments, wherein the determined information about the corresponding object plane comprises a depth of the object plane relative to imaging system.

The imaging method of any embodiments of any embodiments 2, wherein at least some of the spacers each have a reference mark.

The imaging method of any embodiments, wherein the determined information about the corresponding object plane comprises a depth and an orientation of the object plane relative to imaging system.

The imaging method of any of the preceding any embodiments, where the computational analyzing of each image comprises determining a degree of defocus of one or more of the reference marks.

The imaging method of any embodiments, where the computational analyzing of each image comprises determining a depth for each of multiple ones of the reference marks based on a degree of defocus for each such reference mark and determining a depth and an orientation of the corresponding object plane relative to the imaging system based on the determined depths of the reference marks.

The imaging method of any of the preceding any embodiments, wherein the references marks are not rotationally symmetric with respect to an axis perpendicular to at least one of the plates.

The imaging method of any embodiments, wherein the computational analyzing of each image comprises determining a rotational orientation of one or more of the reference marks about the axis relative to the imaging system.

The imaging method of any of the preceding any embodiments, wherein the computational analyzing of each image comprising comparing image information about the reference marks to a priori knowledge about the reference marks.

The imaging method of any embodiments, wherein the a priori knowledge about the reference marks is based on one or more of a shape of each reference mark and a location of each reference mark relative to the plates.

The imaging method of any of the preceding any embodiments, wherein the spacers are pillars.

The imaging method of any of the preceding any embodiments, wherein the acquiring of the multiple images comprises moving one or more components of the imaging system relative to the plates sandwiching the sample.

The imaging method of any of the preceding any embodiments, wherein the computational constructing of the three-dimensional image comprises processing each acquired image to remove out-of-focus features.

The imaging method of any embodiments, wherein the processing of each acquired image to remove out-of-focus features comprises using a band-pass filter.

The imaging method of any of the preceding any embodiments, where the acquired images correspond to interference images formed by combining light from the sample with reference light not directed to the sample on the camera.

An imaging apparatus comprising: an imaging system comprising a camera and at least one lens; a sample holder for supporting a sample cartridge relative to the imaging system, the sample cartridge comprising two plates are separated from one another by an array of spacers, at least one of which has a reference mark, wherein a sample to be imaged is configured to be compressed between the two plates; and a processing and control system coupled to the sample holder and the camera and configured to acquire multiple images of the sample using the imaging system, wherein each image corresponds to a different object plane within a thickness of the sample, and wherein the processing and control system is further configured to: computationally analyze each image to determine information about the corresponding object plane based on one or more of the reference marks; and computationally construct a three-dimensional image of the sample based on the multiple images and the information about the corresponding object planes.

The imaging apparatus of any embodiments, wherein the determined information about the corresponding object plane comprises a depth of the object plane relative to imaging system.

The imaging apparatus of any embodiments or, wherein at least some of the spacers each have a reference mark.

The imaging apparatus of any embodiments, wherein the determined information about the corresponding object plane comprises a depth and an orientation of the object plane relative to imaging system.

The apparatus of any of the preceding any embodiments, where the computational analyzing of each image comprises determining a degree of defocus of one or more of the reference marks.

The apparatus of any embodiments 20, wherein the computational analyzing of each image comprises determining a depth for each of multiple ones of the reference marks based on a degree of defocus for each such reference mark and determining a depth and an orientation of the corresponding object plane relative to the imaging system based on the determined depths of the reference marks.

The apparatus of any of the preceding any embodiments, wherein the references marks are not rotationally symmetric with respect to an axis perpendicular to at least one of the plates.

The apparatus of any embodiments, wherein the computational analyzing of each image comprises determining a rotational orientation of one or more of the reference marks about the axis relative to the imaging system.

The apparatus of any of the preceding any embodiments, wherein the computational analyzing of each image comprising comparing image information about the reference marks to a priori knowledge about the reference marks.

The apparatus of any embodiments, wherein the a priori knowledge about the reference marks is based on one or more of a shape of each reference mark and a location of each reference mark relative to the plates.

The apparatus of any of the preceding any embodiments, wherein the spacers are pillars.

The apparatus of any of the preceding any embodiments, wherein the control system is configured to move one or more components of the imaging system relative to the plates sandwiching the sample to acquire the multiple images.

The apparatus of any of the preceding any embodiments, wherein the computational constructing of the three-dimensional image comprises processing each acquired image to remove out-of-focus features.

The apparatus of any embodiments wherein the processing of each acquired image to remove out-of-focus features comprises using a band-pass filter.

The apparatus of any of the preceding any embodiments, wherein where the acquired images correspond to interference images formed by combining light from the sample with reference light not directed to the sample on the camera.

More Other Embodiments

The present invention includes a variety of embodiments, which can be combined in multiple ways as long as the various components do not contradict one another. The embodiments should be regarded as a single invention file: each filing has other filing as the references and is also referenced in its entirety and for all purpose, rather than as a discrete independent. These embodiments include not only the disclosures in the current file, but also the documents that are herein referenced, incorporated, or to which priority is claimed.

(1) Definitions

The terms used in describing the devices, systems, and methods herein disclosed are defined in the current application, or in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

The terms "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF card) that regulate the spacing between the plates. The term "X-plate" refers to one of the two plates in a CROF card, wherein the spacers are fixed to this plate. More descriptions of the COF Card, CROF Card, and X-plate are given in the provisional application Ser. No. 62/456,065, filed on Feb. 7, 2017, which is incorporated herein in its entirety for all purposes.

(2) Q-Card, Spacer and Uniform Sample Thickness

The devices, systems, and methods herein disclosed can include or use Q-cards, spacers, and uniform sample thickness embodiments for sample detection, analysis, and quantification. In some embodiments, the Q-card comprises spacers, which help to render at least part of the sample into a layer of high uniformity. The structure, material, function, variation and dimension of the spacers, as well as the uniformity of the spacers and the sample layer, are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

(3) Hinges, Opening Notches, Recessed Edge and Sliders

The devices, systems, and methods herein disclosed can include or use Q-cards for sample detection, analysis, and quantification. In some embodiments, the Q-card comprises hinges, notches, recesses, and sliders, which help to facilitate the manipulation of the Q card and the measurement of the samples. The structure, material, function, variation and dimension of the hinges, notches, recesses, and sliders are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

(4) Q-Card, Sliders, and Smartphone Detection System

The devices, systems, and methods herein disclosed can include or use Q-cards for sample detection, analysis, and quantification. In some embodiments, the Q-cards are used together with sliders that allow the card to be read by a smartphone detection system. The structure, material, function, variation, dimension and connection of the Q-card, the sliders, and the smartphone detection system are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

In some embodiments of QMAX, the sample contact area of one or both of the plates comprises a compressed open flow monitoring surface structures (MSS) that are configured to monitoring how much flow has occurred after COF. For examples, the MSS comprises, in some embodiments, shallow square array, which will cause friction to the components (e.g. blood cells in a blood) in a sample. By checking the distributions of some components of a sample, one can obtain information related to a flow, under a COF, of the sample and its components.

The depth of the MSS can be $1/1000$, $1/100$, $1/100$, $1/5$, $1/2$ of the spacer height or in a range of any two values, and in either protrusion or well form.

(5) Detection Methods

The devices, systems, and methods herein disclosed can include or be used in various types of detection methods. The detection methods are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

(6) Labels

The devices, systems, and methods herein disclosed can employ various types of labels that are used for analytes detection. The labels are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

(7) Analytes

The devices, systems, and methods herein disclosed can be applied to manipulation and detection of various types of analytes (including biomarkers). The analytes and are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

(8) Applications (Field and Samples)

The devices, systems, and methods herein disclosed can be used for various applications (fields and samples). The applications are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

(9) Cloud

The devices, systems, and methods herein disclosed can employ cloud technology for data transfer, storage, and/or analysis. The related cloud technologies are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

Additional Notes

Further examples of inventive subject matter according to the present disclosure are described in the following enumerated paragraphs.

It must be noted that as used herein and in the appended claims, the singular forms "a", "an", and "the" include plural referents unless the context clearly dictates otherwise, e.g., when the word "single" is used. For example, reference to "an analyte" includes a single analyte and multiple analytes, reference to "a capture agent" includes a single capture agent and multiple capture agents, reference to "a detection agent" includes a single detection agent and multiple detection agents, and reference to "an agent" includes a single agent and multiple agents.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function. Similarly, subject matter that is recited as being configured to perform a particular function may additionally or alternatively be described as being operative to perform that function.

As used herein, the phrase, "for example," the phrase, "as an example," and/or simply the terms "example" and "exemplary" when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

Where numerical ranges are mentioned herein, the invention includes embodiments in which the endpoints are included, embodiments in which both endpoints are excluded, and embodiments in which one endpoint is included and the other is excluded. It should be assumed that both endpoints are included unless indicated otherwise.

Furthermore, unless otherwise indicated or otherwise evident from the context and understanding of one of ordinary skill in the art.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

Other Embodiments

It is to be understood that while the invention has been described in conjunction with the detailed description thereof, the foregoing description is intended to illustrate and not limit the scope of the invention, which is defined by the scope of the appended claims.

The invention claimed is:

1. An optical adapter for imaging a sample using a hand-held imaging device that has a light source, a single camera, and a computer processor, comprising:
an enclosure;
a cavity within the enclosure; and
a lever within the cavity,
wherein the lever comprises at least one optical element and is configured to be moveable between a first position and a second position, wherein (i) in the first position, said imaging device is capable of imaging the sample in a bright field mode, and (ii) in the second position, said imaging device is capable of imaging the sample in a fluorescence excitation mode.

2. An optical adapter for imaging a sample using a hand-held imaging device that has a light source, a single camera, and a computer processor, comprising:
an enclosure;
a lens arranged to provide a field of view for the camera;
a cavity within the enclosure for receiving the sample and positioning the sample within the field of view of the camera, wherein the lens is positioned to receive light refracted by or emitted by the sample when in the field of view of the camera; and
a lever within the cavity,
wherein the lever comprises at least one optical element and is configured to be moveable between a first position and a second position, wherein (i) in the first position, said imaging device is capable of imaging the sample in a bright field mode, and (ii) in the second position, said imaging device is capable of imaging the sample in a fluorescence excitation mode.

3. An optical adapter for imaging a sample using a hand-held imaging device that has a light source, a single camera, and a computer processor, comprising:
an enclosure;
a cavity within the enclosure for receiving the sample and positioning the sample within a field of view of the camera; and
a lever within the cavity,
wherein the lever comprises at least one optical element and is configured to be moveable between a first position and a second position, wherein (i) in the first position, said imaging device is capable of imaging the sample in a bright field mode, and (ii) in the second position, said imaging device is capable of imaging the sample in a fluorescence excitation mode, and
wherein the lever comprises a first planar region extending along a first plane and a second planar region laterally displaced along a first direction from the first planar region and extending along a second plane, the first plane being disposed at a different height along a second direction from the second plane, the second direction being orthogonal to the first direction.

4. An optical adapter for imaging a sample using a hand-held imaging device that has a light source, a single camera, and a computer processor, comprising:
an enclosure;
a cavity within the enclosure for receiving the sample and positioning the sample within a field of view of the camera; and
a lever within the cavity,
wherein the lever comprises at least one optical element and is configured to be moveable between a first position and a second position, wherein (i) in the first position, said imaging device is capable of imaging the sample in a bright field mode, and (ii) in the second position, said imaging device is capable of imaging the sample in a fluorescence excitation mode, and
wherein the lever comprises a first planar region extending along a first plane and a second planar region laterally displaced along a first direction from the first planar region and extending along a second plane, the first plane being disposed at a different height along a second direction from the second plane, the second direction being orthogonal to the first direction, and
wherein the first planar region comprises at least one optical element, and the second planar region comprises at least one optical element.

5. An optical adapter for imaging a sample using a hand-held imaging device that has a light source, a single camera, and a computer processor, comprising:
an enclosure;
a cavity within the enclosure; and
a lever within the cavity,
wherein the lever comprises at least one optical element and is configured to be moveable between at least three different positions, wherein (i) in a first position, said imaging device is capable of imaging the sample in a bright field mode, (ii) in a second position, said imaging device is capable of imaging the sample in a fluorescence excitation mode, and (iii) in a third position, said imaging device is capable of measuring optical absorption of the sample.

6. An optical adapter for imaging a sample using a hand-held imaging device that has a light source, a single camera, and a computer processor, comprising:
an enclosure;
a lens configured to provide a field of view for the camera;
a cavity within the enclosure for receiving the sample and positioning the sample within the field of view of the camera;
an aperture within the enclosure, wherein the aperture is arranged to receive source light from the light source for illuminating the sample; and
a lever within the cavity,
wherein the lever comprises at least one optical element and is configured to be moveable between a first position and a second position, wherein (i) in a first position, said imaging device is capable of imaging the sample in a bright field mode, (ii) in a second position, said imaging device is capable of imaging the sample in a fluorescence excitation mode, wherein in the fluorescence excitation mode, the lens is arranged to receive light emitted by the sample when the sample is illuminated by the source light.

7. An optical adapter for imaging a sample using a smart phone that has a light source, a single camera, and a computer processor, comprising:
an enclosure;
a lens configured to provide a field of view for the camera;
a cavity within the enclosure for receiving the sample and positioning the sample within the field of view of the camera; and
a lever within the cavity,
wherein the lever comprises at least one optical element and is configured to be moveable between a first position and a second position, wherein (i) in a first position, said imaging device is capable of imaging the sample in a bright field mode, and (ii) in a second position, said imaging device is capable of imaging the sample in a fluorescence excitation mode.

8. An optical assembly attachable to a hand-held electronic device having a light source, a camera, and a computer processor, wherein the optical assembly is configured to enable microscopic imaging of a sample by the camera with illumination of the sample by light from the light source, the optical assembly comprising:
an enclosure;
a cavity within the enclosure;
a lens configured to provide a microscopic field of view for the camera; and
a moveable arm within the cavity, wherein the moveable arm is configurable to switch between a first position and a second position, wherein when the moveable arm is in the first position, the optical assembly is in a bright field mode, and when the moveable arm is in the second position, the optical assembly is in a fluorescence excitation mode.

9. The optical assembly of claim 2, wherein the enclosure comprises:
a sample receptacle region within the cavity; and
a slot on a side of the enclosure, wherein the slot is arranged to receive a sample substrate within the sample receptacle region and position the sample within the field of view of the camera.

10. The optical assembly of claim 8, further comprising a first set of one or more optical elements arranged to receive light entering from a first aperture in the enclosure corresponding to the light source and to redirect the light entering from the first aperture along a first pathway toward a second aperture in the enclosure corresponding to the camera to provide bright field illumination of the sample when the moveable arm is in the first position.

11. The optical assembly of claim 10, wherein the first set of one or more optical elements comprises a first right angle mirror and a second right angle mirror, wherein the first right angle mirror and the second right angle mirror are in the first pathway and are arranged to reflect the light from the light source to be normally incident into the camera.

12. The optical assembly of claim 1, wherein the light source is a point source to achieve interference imaging of transparent samples via illuminating the sample by a same wavefront.

13. The optical assembly of claim 10, further comprising a second set of one or more optical elements mechanically coupled to the movable arm and arranged to receive light entering from the first aperture and redirect the light entering from the first aperture along a second pathway to obliquely illuminate the sample to provide fluorescence illumination of the sample when the moveable arm is in the second position.

14. The optical assembly of claim 13, wherein an oblique angle formed by the oblique illumination is larger than a collecting angle of the lens that is configured to provide the field of view of the camera.

15. The optical assembly of claim 13, wherein the second set of one or more optical elements includes a mirror and an optical absorber, wherein the mirror reflects light to obliquely illuminate the sample and the optical absorber absorbs extraneous light from the first aperture that would otherwise pass through the second aperture of the enclosure and overwhelm the camera in the fluorescence excitation mode.

16. The optical assembly of claim 15, wherein the absorber absorbs light that is not incident on the mirror after going through the first aperture, wherein the light absorber is a thin-film light absorber.

17. The optical assembly of claim 13, further comprising a third set of one or more optical elements arranged to receive light entering from the first aperture and redirect the light entering into the second aperture in the movable arm and going along the first pathway toward a light diffuser on the movable arm to illuminate the sample in normal direction to measure the optical absorption of the sample.

18. The optical assembly of claim 17, wherein the third set of one or more optical elements includes a light diffuser, a first right angle mirror and a second right angle mirror, wherein the first right angle mirror and the second right angle mirror are in the first pathway and are arranged to reflect the light from the light source toward the light diffuser and then to be normally incident into the camera.

19. The optical assembly of claim 18, wherein the light diffuser is a semi-opaque diffuser with opacity in the range of 10% to 90%.

20. The optical assembly of claim 9, further comprising a rubber door to cover the sample receptacle region to prevent ambient light from entering the cavity.

21. The optical assembly of claim 1, wherein the light source and the camera are positioned on a same side of the hand-held imaging device at a fixed distance to one another.

22. A system comprising:
the optical assembly of claim 8, and
a mobile phone attachment comprising a first side configured to couple to the optical assembly and a second opposite side configured to couple to the hand-held electronic device, wherein the hand-held electronic device is a mobile phone.

23. The system of claim 22, wherein the mobile phone attachment is exchangeable to provide attachment to different sized mobile phones.

24. The system of claim 22, wherein a size of the mobile phone attachment is adjustable.

25. An optical assembly for a hand-held mobile electronic device, the optical assembly comprising:
an enclosure;
a cavity within the enclosure;
a plurality of optical elements within the cavity, wherein the plurality of optical elements are arranged to receive light entering from a first aperture in the enclosure and to redirect the light entering from the first aperture along a first pathway toward a second aperture in the enclosure;
a moveable arm configurable in at least three different positions within the enclosure, wherein the moveable arm comprises a light reflector portion to reflect light, wherein the moveable arm comprises a light diffuser to homogenize the light and break the coherence of the light, wherein the moveable arm comprises an aperture aligned with the entrance aperture in the enclosure, wherein, when the moveable arm is in a first position within the enclosure, the light reflector portion is positioned between an entrance aperture in the enclosure and the plurality of optical elements such that the light reflector portion blocks the light entering from the first opening from being incident on the plurality of optical elements, and wherein, when the moveable arm is in a second position within the enclosure, the light entering from the first opening is incident on the plurality of optical elements, and wherein when the moveable arm is in a third position within the enclosure, the light entering from the first opening goes through an aperture on the moveable arm and then is incident on the light diffuser.

26. The optical assembly of claim 25, comprising a slot on a side of the enclosure, wherein the slot is arranged to receive a sample substrate such that:

when the sample substrate is fully inserted within the slot and the moveable arm is in the second position within the enclosure, the first pathway intersects the sample substrate; and when the sample substrate is fully inserted within the slot and moveable arm is in the first position within the enclosure, light reflected by the light reflector portion is redirected to the sample substrate; and when the sample substrate is fully inserted within the slot and moveable arm is the third position within the enclosure, light goes along the first pathway toward a light diffuser and then illuminate on the sample substrate.

27. The optical assembly of claim 25, wherein the moveable arm comprises a light absorber portion to absorb light that is not incident on a mirror after going through the first aperture.

28. The optical assembly of claim 25, wherein the moveable arm comprises:

a first receptacle positioned above the light reflector portion; and an optical filter seated in the first receptacle; and a second receptacle positioned above the aperture.

29. The optical assembly of claim 28, wherein, when the moveable arm is in the first position, the optical filter seated in the first receptacle is positioned to receive light entering from the first aperture in the enclosure; and when the moveable arm is in the third position, the optical filter seated in the first receptacle is positioned to receive light entering from the first aperture in the enclosure.

30. The optical assembly of claim 28, wherein, when the moveable arm is in the first position, the optical filter seated in the first receptacle overlaps a region in which a portion of the sample substrate is located when the sample substrate is fully inserted within the slot.

31. A system comprising:

the optical assembly of claim 25; and a mobile phone attachment comprising a first side configured to couple to the optical assembly and comprising a second opposite side configured to couple to a mobile phone, wherein a size of the mobile phone attachment is adjustable.

32. An optical assembly attachable to a hand-held electronic device having a light source, a camera, and a computer processor, wherein the optical assembly is configured to enable microscopic fluorescence imaging of a sample by the camera with illumination of the sample by light from the light source, the optical assembly comprising:

a lens configured to provide a microscopic field of view for the camera;

a receptacle for receiving the sample and positioning the sample within the microscopic field of view;

a mirror off-set from an optical axis of the lens and positioned to reflect light from the light source and illuminate the sample over a range of oblique angles with respect to the optical axis; and a wavelength filter positioned between the sample and the camera to pass fluorescence emitted by the sample in response to the oblique illumination.

33. The optical assembly of claim 32, wherein the lens is positioned on a front-side of the sample and the mirror is positioned to obliquely illuminate the sample from a backside of the sample, wherein an oblique angle formed by the oblique illumination is larger than a collecting angle of the lens.

34. The optical assembly of claim 32, further comprising an optical absorber positioned on the optical axis adjacent the mirror to absorb light from the light source not reflected by the mirror.

35. The optical assembly of claim 34, wherein the mirror and the optical absorber are mounted on a common structure and tilted with respect to one another.

36. The optical assembly of claim 32, further comprising a second wavelength filter positioned in a path of illumination light between the light source and the mirror to select certain wavelengths for illuminating the sample.

37. The optical assembly of claim 32, wherein the sample is supported by a sample holder comprising a planar structure, and wherein the receptacle is configured to position the planar structure to extend partially into a path of illumination light from the light source to couple the illumination light into the planar structure.

38. The optical assembly of claim 37, wherein the receptacle is configured to position the planar structure such that the path of illumination light is incident on an edge of the planar structure, wherein the edge extends along a plane that is normal to a plane comprising the field of view.

39. The optical assembly of claim 37, wherein the mirror is arranged to reflect the light to partially obliquely illuminate the sample from a back side of the planar structure and to partially illuminate an edge of the planar structure to couple illumination light into the planar structure.

40. The optical assembly of claim 32, further comprising a door to cover the receptacle to prevent ambient light from entering the optical assembly and entering the camera.

41. The optical assembly of claim 37, wherein the planar structure is configured to waveguide the coupled illumination light to the sample to illuminate the sample and cause the sample to emit fluorescence.

42. The optical assembly of claim 32, further comprising a sample holder.

43. The optical assembly of claim 42, wherein the sample is a liquid sample and the sample holder comprises first and second plates for sandwiching the liquid sample.

44. The optical assembly of claim 32, wherein the lens, the receptacle, the mirror, and the wavelength filter are supported in a common optical box and further comprising an exchangeable holder frame for attaching the optical box to the hand-held electronic device.

45. The optical assembly of claim 32, wherein the light source and the camera are positioned on a same side of the hand-held electronic device and at fixed distance to one another.

46. The optical assembly of claim 32, wherein the hand-held electronic device is a smart phone.

47. An apparatus comprising:
the optical assembly of claim 32; and
the hand-held electronic device.

48. An optical assembly attachable to a hand-held electronic device having a light source, a first camera module, a second camera module, and a computer processor, wherein the optical assembly is configured to enable microscopic imaging of a sample by the first camera module and by the second camera module with illumination of the sample by light from the light source, the optical assembly comprising:
a first assembly lens configured to provide a first microscopic field of view for the first camera module;
a second assembly lens configured to provide a second microscopic field of view for the second camera module; and
a receptacle for receiving the sample and positioning the sample within the first microscopic field of view and within the second microscopic field of view.

49. The optical assembly of claim 48, wherein the first camera module comprises a first internal lens and the second camera module comprises a second internal lens, wherein a first optical magnification provided by the first assembly lens and the first internal lens is the same as a second optical magnification provided by the second assembly lens and the second internal lens.

50. The optical assembly of claim 49, wherein a first ratio of a focal length of the first assembly lens to a focal length of the first internal lens is equal to a second ratio of a focal length of the second assembly lens to a focal length of the second internal lens.

51. The optical assembly of claim 48, wherein a first image resolution provided by the first camera module and the first assembly lens is the same as a second image resolution provided by the second camera module and the second assembly lens.

52. The optical assembly of claim 48, wherein the first camera module comprises a first internal lens and the second camera module comprises a second internal lens, wherein a first optical magnification provided by the first assembly lens and the first internal lens is different from a second optical magnification provided by the second assembly lens and the second internal lens.

53. The optical assembly of claim 52, wherein a first ratio of a focal length of the first assembly lens to a focal length of the first internal lens is less than a second ratio of a focal length of the second assembly lens to a focal length of the second internal lens.

54. The optical assembly of claim 48, wherein a first image resolution provided by the first camera module and the first assembly lens is less than a second image resolution provided by the second camera module and the second assembly lens.

55. The optical assembly of claim 48, wherein the first microscopic field of view overlaps with the second microscopic field of view.

56. The optical assembly of claim 55, wherein an amount of overlap of the first microscopic field of view with the second microscopic field of view is between 1% and 90%.

57. The optical assembly of claim 48, wherein the first microscopic field of view does not overlap with the second microscopic field of view.

58. The optical assembly of claim 48, wherein each of the first assembly lens and the second assembly lens is arranged to receive light scattered by or emitted by the sample.

59. The optical assembly of claim 48, wherein the first microscopic field of view is less than the second microscopic field of view.

60. The optical assembly of claim 48, wherein an angular field of view of the first assembly lens is less than an angular field of view of the second assembly lens.

61. The optical assembly of claim 60, wherein a ratio of the angular field of view of the first assembly lens to the angular field of the second assembly lens is between 1.1 and 1000.

62. The optical assembly of claim 48, comprising:
a first optical filter arranged in a first illumination path to or from the first assembly lens; and
a second optical filter arranged in a second illumination path to or from the second assembly lens.

63. The optical assembly of claim 62, wherein:
the first optical filter is configured to filter a first range of wavelengths;
the second optical filter is configured to filter a second range of wavelengths; and
the first range of wavelengths is different from the second range of wavelengths.

64. The optical assembly of claim 48, comprising:
a first polarizer arranged in a first illumination path to or from the first assembly lens; and
a second polarizer arranged in a second illumination path to or from the second assembly lens.

65. The optical assembly of claim 64, wherein the first polarizer and the second polarizer have different polarization dependent light transmission and blocking properties.

66. An apparatus comprising:
the optical assembly of claim 48; and
the hand-held electronic device.

67. The apparatus of claim 48, wherein the hand-held electronic device is a smart phone.

68. The apparatus of claim 48, wherein the hand-held electronic device is configured to computationally merge a first image obtained from the first camera module with a second image obtained from the second camera module.

69. An imaging method comprising:
compressing a sample between two plates, wherein the two plates are separated from one another by an array of spacers, at least one of which has a reference mark;
acquiring multiple images of the sample using an imaging system comprising a camera and at least one lens, wherein each image corresponds to a different object plane within a thickness of the sample;
computationally analyzing each image to determine information about the corresponding object plane based on one or more of the reference marks; and
computationally constructing a three-dimensional image of the sample based on the multiple images and the information about the corresponding object planes.

70. The imaging method of claim 69, wherein the determined information about the corresponding object plane comprises a depth of the object plane relative to the imaging system.

71. The imaging method of claim 69, wherein at least some of the spacers each have the reference mark.

72. The imaging method of claim 69, wherein the determined information about the corresponding object plane comprises a depth and an orientation of the object plane relative to imaging system.

73. The imaging method of claim 69, wherein the computational analyzing of each image comprises determining a degree of defocus of one or more of the reference marks.

74. The imaging method of claim 69, wherein the computational analyzing of each image comprises determining a depth for each of multiple ones of the reference marks based on a degree of defocus for each such reference mark and determining a depth and an orientation of the corresponding object plane relative to the imaging system based on the determined depths of the reference marks.

75. The imaging method of claim 69, wherein the references marks are not rotationally symmetric with respect to an axis perpendicular to at least one of the plates.

76. The imaging method of claim 69, wherein the computational analyzing of each image comprises determining a rotational orientation of one or more of the reference marks about the axis relative to the imaging system.

77. The imaging method of claim 69, wherein the computational analyzing of each image comprising comparing image information about the reference marks to a prior knowledge about the reference marks.

78. The imaging method of claim 77, wherein the prior knowledge about the reference marks is based on one or more of a shape of each reference mark and a location of each reference mark relative to the plates.

79. The imaging method of claim 69, wherein the spacers are pillars.

80. The imaging method of claim 69, wherein the acquiring of the multiple images comprises moving one or more components of the imaging system relative to the plates.

81. The imaging method of claim 69, wherein the computational constructing of the three-dimensional image comprises processing each acquired image to remove out-of-focus features.

82. The imaging method of claim 81, wherein the processing of each acquired image to remove out-of-focus features comprises using a band-pass filter.

83. The imaging method of claim 69, wherein the acquired images correspond to interference images formed by combining light from the sample with reference light not directed to the sample on the camera.

84. An imaging apparatus comprising:
  an imaging system comprising a camera and at least one lens;
  a sample holder for supporting a sample cartridge relative to the imaging system, the sample cartridge comprising two plates are separated from one another by an array of spacers, at least one of which has a reference mark, wherein a sample to be imaged is configured to be compressed between the two plates; and
  a processing and control system coupled to the sample holder and the camera and configured to acquire multiple images of the sample using the imaging system, wherein each image corresponds to a different object plane within a thickness of the sample, and
  wherein the processing and control system is further configured to:
    computationally analyze each image to determine information about the corresponding object plane based on one or more of the reference marks; and
    computationally construct a three-dimensional image of the sample based on the multiple images and the information about the corresponding object planes.

85. The imaging apparatus of claim 84, wherein the determined information about the corresponding object plane comprises a depth of the object plane relative to imaging system.

86. The imaging apparatus of claim 84, wherein at least some of the spacers each have a reference mark.

87. The imaging apparatus of claim 84, wherein the determined information about the corresponding object plane comprises a depth and an orientation of the object plane relative to the imaging system.

88. The apparatus of claim 84, wherein the computational analyzing of each image comprises determining a degree of defocus of one or more of the reference marks.

89. The apparatus of claim 84, wherein the computational analyzing of each image comprises determining a depth for each of multiple ones of the reference marks based on a degree of defocus for each such reference mark and determining a depth and an orientation of the corresponding object plane relative to the imaging system based on the determined depths of the reference marks.

90. The apparatus of claim 84, wherein the references marks are not rotationally symmetric with respect to an axis perpendicular to at least one of the plates.

91. The apparatus of claim 84, wherein the computational analyzing of each image comprises determining a rotational orientation of one or more of the reference marks about the axis relative to the imaging system.

92. The apparatus of claim 84, wherein the computational analyzing of each image comprises comparing image information about the reference marks to a prior knowledge about the reference marks.

93. The apparatus of claim 92, wherein the knowledge about the reference marks is based on one or more of a shape of each reference mark and a location of each reference mark relative to the plates.

94. The apparatus of claim 84, wherein the spacers are pillars.

95. The apparatus of claim 84, wherein the control system is configured to move one or more components of the imaging system relative to the plates to acquire the multiple images.

96. The apparatus of claim 84, wherein the computational constructing of the three-dimensional image comprises processing each acquired image to remove out-of-focus features.

97. The apparatus of claim 96 wherein the processing of each acquired image to remove out-of-focus features comprises using a band-pass filter.

98. The apparatus of claim 84, wherein the acquired images correspond to interference images formed by combining light from the sample with reference light not directed to the sample on the camera.

* * * * *